(12) United States Patent
Baucom et al.

(10) Patent No.: US 12,012,664 B1
(45) Date of Patent: Jun. 18, 2024

(54) MEMBRANE-BASED ALKALI METAL EXTRACTION SYSTEM

(71) Applicant: Lyten, Inc., San Jose, CA (US)

(72) Inventors: Jesse Baucom, Sunnyvale, CA (US); Sanjeev Kolli, Santa Clara, CA (US)

(73) Assignee: LYTEN, INC., San Jose, CA (US)

( * ) Notice: Subject to any disclaimer, the term of this patent is extended or adjusted under 35 U.S.C. 154(b) by 0 days.

(21) Appl. No.: 18/122,581

(22) Filed: Mar. 16, 2023

(51) Int. Cl.
| *C25C 1/00* | (2006.01) |
| *B01D 61/46* | (2006.01) |
| *C25C 1/02* | (2006.01) |
| *C25C 7/02* | (2006.01) |
| *C25C 7/04* | (2006.01) |

(52) U.S. Cl.
CPC ............... *C25C 1/02* (2013.01); *B01D 61/46* (2013.01); *C25C 7/02* (2013.01); *C25C 7/04* (2013.01); *B01D 2313/345* (2013.01)

(58) Field of Classification Search
CPC .... C25C 1/02; C25C 7/02; C25C 7/04; B01D 61/46; B01D 2313/345
See application file for complete search history.

(56) References Cited

U.S. PATENT DOCUMENTS

| 4,288,419 A | 9/1981 | Copenhafer et al. |
| 4,498,706 A | 2/1985 | Ilardi et al. |
| 4,652,054 A | 3/1987 | Copenhafer et al. |
| 4,992,148 A | 2/1991 | Nicolas |
| 5,665,324 A | 9/1997 | Izawa et al. |
| 7,638,109 B2 | 12/2009 | Copenhafer |
| 8,834,816 B1 | 9/2014 | Rainer |
| 11,371,116 B2 | 6/2022 | Haynes et al. |
| 11,588,146 B2 | 2/2023 | Bodoin |
| 2005/0163700 A1 | 7/2005 | DiMascio |
| 2007/0140945 A1 | 6/2007 | Copenhafer |
| 2009/0090638 A1 | 4/2009 | Kelly et al. |
| 2012/0189516 A1 | 7/2012 | Donaldson et al. |
| 2015/0008683 A1 | 1/2015 | Grone et al. |
| 2015/0024256 A1 | 1/2015 | Anandan et al. |

(Continued)

FOREIGN PATENT DOCUMENTS

| CN | 103931049 B | 5/2017 |
| HU | 184798 B | 10/1984 |

(Continued)

OTHER PUBLICATIONS

International Search Report and Written Opinion from PCT Application No. PCT/US23/15541, dated Aug. 16, 2023, 18 pages.

(Continued)

*Primary Examiner* — Zulmariam Mendez
(74) *Attorney, Agent, or Firm* — Zilka-Kotab, P.C.

(57) ABSTRACT

The presently disclosed concepts relate to improved techniques for critical mineral extraction, purification, precipitation, ion exchange, and metal production using a solid electrolyte membrane. By using a solid electrolyte embedded in a matrix, alkali metal (such as lithium) can be more effectively separated from feed solutions. Additionally, energy used to initially extract critical minerals from a feed solution may be stored as electrochemical energy, which in turn, may be discharged when critical minerals are depleted from the electrode. This discharged energy may therefore be reclaimed and reused to extract additional critical minerals.

20 Claims, 48 Drawing Sheets

(56) References Cited

U.S. PATENT DOCUMENTS

| | | | | |
|---|---|---|---|---|
| 2015/0129433 | A1* | 5/2015 | Yoon | C25C 7/02 |
| | | | | 204/242 |
| 2015/0155551 | A1 | 6/2015 | Whitacre et al. | |
| 2018/0195184 | A1 | 7/2018 | Fleischer et al. | |
| 2019/0048483 | A1* | 2/2019 | Swonger | C25C 1/02 |
| 2020/0087803 | A1 | 3/2020 | Kitagawa et al. | |
| 2020/0232105 | A1 | 7/2020 | Snydacker et al. | |
| 2021/0246529 | A1 | 8/2021 | Jariwala et al. | |
| 2021/0277529 | A1* | 9/2021 | Bhavaraju | C01B 17/06 |
| 2022/0045369 | A1 | 2/2022 | Hiasa | |
| 2022/0069278 | A1 | 3/2022 | Bodoin | |
| 2022/0069282 | A1 | 3/2022 | Bodoin | |
| 2022/0271291 | A1 | 8/2022 | Li et al. | |
| 2022/0393173 | A1 | 12/2022 | Sadoway et al. | |
| 2022/0393234 | A1 | 12/2022 | Sadoway et al. | |

FOREIGN PATENT DOCUMENTS

| | | | |
|---|---|---|---|
| IN | 107429274 | A | 12/2017 |
| JP | 5030076 | B2 | 9/2012 |
| WO | 0139312 | A1 | 5/2001 |
| WO | 2007075469 | A2 | 7/2007 |
| WO | 2007075469 | A3 | 1/2008 |
| WO | 2021188570 | A2 | 9/2021 |
| WO | 2022046327 | A1 | 3/2022 |
| WO | 2022046328 | A1 | 3/2022 |
| WO | 2022157624 | A1 | 7/2022 |
| WO | 2022256685 | A1 | 12/2022 |
| WO | 2022256692 | A1 | 12/2022 |

OTHER PUBLICATIONS

Baucom et al., U.S. Appl. No. 18/122,590, filed Mar. 16, 2023.
Baucom et al., U.S. Appl. No. 18/122,599, filed Mar. 16, 2023.
Baucom et al., U.S. Appl. No. 18/122,603, filed Mar. 16, 2023.
Baucom et al., U.S. Appl. No. 18/122,606, filed Mar. 16, 2023.
Baucom et al., U.S. Appl. No. 18/122,621, filed Mar. 16, 2023.
Baucom et al., U.S. Appl. No. 17/948,055, filed Sep. 19, 2022.
Baucom et al., U.S. Appl. No. 17/948,030, filed Sep. 19, 2022.
Restriction Requirement from U.S. Appl. No. 17/948,030, dated Mar. 1, 2023.
Non-Final Office Action from U.S. Appl. No. 17/948,030, dated Apr. 12, 2023.
Mu et al., "Electrochemical lithium recovery from brine with high Mg2+/Li+ ratio using mesoporous ?-MnO2/LiMn2O4 modified 3D graphite felt electrodes," Desalination, vol. 511, Apr. 2021, pp. 1-10.
Wu et al. "Highly efficient and stable Li extraction device by coupling Li4Ti5O12 electrode and matching perfluoro electrolyte," Journal of Alloys and Compounds, vol. 869, 2021, pp. 1-11.
Kazemabad et al., "Crown ether containing polyelectrolyte multilayer membranes for lithium recovery," Journal of Membrane Science, vol. 595, Feb. 1, 2020.
Xu et al., "Materials for lithium recovery from salt lake brine," Journal of Materials Science, vol. 56, 2021, pp. 16-63.
Liu et al., "Study on extraction of lithium from salt lake brine by membrane electrolysis," Desalination, vol. 376, 2015, pp. 35-40.
Diaz Nieto, "Membrane electrolysis for the removal of Mg2+ and Ca2+ from lithium rich brines," Water Research, vol. 154, 2019, pp. 117-124.
Tabelin et al., "Towards a low-carbon society: A review of lithium resource availability, challenges and innovations in mining, extraction and recycling, and future perspectives," Minerals Engineering, vol. 163, 2021, pp. 1-23.
Liu et al., "Lithium Extraction from Seawater through Pulsed Electrochemical Intercalation," Joule, Jul. 15, 2020, pp. 1459-1469.
Zhang et al., "Lithium extraction from water lithium resources through green electrochemical-battery approaches: A comprehensive review," Journal of Cleaner Production, vol. 285, 2021, pp. 1-25.
Yu et al., "Ocean Mining: A Fluidic Electrochemical Route for Lithium Extraction from Seawater," ACS Materials Letters, vol. 2, 2020, pp. 1662-1668.
Yang et al., "Lithium Metal Extraction from Seawater," Joule, Sep. 19, 2018, pp. 1648-1651.
Olsson et al., "Adsorption and migration of alkali metals (Li, Na, and K) on pristine and defective graphene surfaces," Nanoscale, vol. 11, 2019, pp. 5274-5284.
Bruland et al., "6.02—Controls of Trace Metals in Seawater," Treatise on Geochemistry, vol. 6, 2003, pp. 23-47.
Meshram et al., "Extraction of lithium from primary and secondary sources by pre-treatment, leaching and separation: A comprehensive review," Hydrometallurgy, vol. 150, 2014, pp. 192-208.
Munk et al., "Lithium Brines: A Global Perspective," Society of Economic Geologists, Inc., Reviews in Economic Geology, vol. 18, 2016, pp. 339-365.
Non-Final Office Action from U.S. Appl. No. 18/122,590, dated Jun. 14, 2023.
Song et al., "Recovery of lithium from spent lithium-ion batteries using precipitation and electrodialysis techniques," Separation and Purification Technology, vol. 206, Nov. 2018, pp. 335-342.
Restriction Requirement from U.S. Appl. No. 18/122,621, dated Jun. 16, 2023.
Final Office Action from U.S. Appl. No. 18/122,590, dated Aug. 24, 2023.
Asif et al., "Ceramic membrane technology for water and wastewater treatment: A critical review of performance, full-scale applications, membrane fouling and prospects," Chemical Engineering Journal, vol. 418, 2021, pp. 1-18.
Wang et al., "Redox Flow Battery for Continuous and Energy-Effective Lithium Recovery from Aqueous Solution", ACS Energy Letters, vol. 7, 2022, pp. 3539-3544.
Non-Final Office Action from U.S. Appl. No. 18/122,621, dated Aug. 24, 2023.
Final Office Action from U.S. Appl. No. 18/122,621, dated Oct. 11, 2023.
Non-Final Office Action from U.S. Appl. No. 18/122,621, dated Jan. 18, 2024.

* cited by examiner

OVERALL REACTION: LiCl + H₂O → HCl + LiOH

OVERALL REACTION: LiCl + H₂O → HCl + LiOH

OVERALL REACTION: $Li^+ + H_2O \rightarrow H^+ + LiOH$

OVERALL REACTION: $2Li^+ + Na_2CO_3 \rightarrow Li_2CO_3(s) + 2Na^+$

EXTRACTION REACTION: $Li+$ (feed) $+ Na+$ (stored) $\rightarrow Li+$ (stored) $+ Na^+$ (waste)

RECLAMATION REACTION: $Li+$ (stored) $+ Na2CO3$ (feed) $\rightarrow Li2CO3(s) + 2Na^+$ (stored)

OVERALL REACTION: $2Li^+ + Na_2CO_3 \rightarrow Li_2CO_3(s) + 2Na^+$

3600

3700

NEUTRALIZATION REACTION: $Li_2CO_3 + 2HCl \rightarrow 2LiCl + H_2CO_3$

ELECTROLYSIS REACTION: $2LiCl + 2H_2O \rightarrow 2LiOH + H_2 + Cl_2$

DECOMPOSITION REACTION: $H_2CO_3 \rightarrow H_2O + CO_2$

OVERALL REACTION: $4LiOH \rightarrow 4Li + O_2 + 2H_2O$

4700

4702

| Species | Salton Sea Geothermal Brine | Trial 1 | Trial 2 |
|---|---|---|---|
| $Li^+$ | 29 mM | 29 mM | 100 mM |
| $Na^+$ | 2,141 mM | 2,141 mM | 100 mM |
| $K^+$ | 371 mM | 371 mM | 100 mM |
| $Mg^{2+}$ | 4.5 mM | 4.5 mM | 0 mM |
| $Cl^-$ | 4,009 mM | 1,850 mM | 125 mM |
| $[Fe(CN)_6]^{4-}$ | N/A | 100 mM | 25 mM |
| $[Fe(CN)_6]^{3-}$ | N/A | 100 mM | 25 mM |

4704

4706

MEMBRANE-BASED ALKALI METAL EXTRACTION SYSTEM

FIELD OF THE INVENTION

The present invention relates to batteries, and more particularly to redox flow electrodes for critical mineral extraction.

BACKGROUND

Current critical mineral extraction systems are often plagued by high energy requirements, low yield of high-purity materials, and strict pre-requirements (such as high concentration) in order to successfully operate. Such issues are exacerbated by current membrane systems that may be used to separate and recover critical minerals. For example, electrolyte membranes may rely on binders to hold the electrolyte membrane together. Alternatively, the electrolyte membranes may be sintered together into a desired shape. Further, soft materials may be easily processed into a membrane layer. However, each of these current solutions may result in low ionic conductivity, low durability of the membrane, low scalability, low selectivity for alkali metals, and/or high permeability to undesirable species. These results, in turn, may be directly linked to current issues for current critical mineral extraction systems (high cost, low output, etc.).

Further, various current electrode coatings pose many problems. For example, electrode coatings used for lithium-ion batteries are often expensive to manufacture due to the large initial capital costs for necessary equipment, high labor costs, and high complexity. This cost may increase the probability of manufacturing errors and render the final product economically infeasible or impractical. Additionally, they tend to be fragile and may easily delaminate when placed in extreme environments, such as within fluids with high shear rates, high/low temperatures, and high concentration of foulants/undesirable species, as is typical for the environments in which critical minerals are found in. Further, disposing or recycling of the material may also be problematic, potentially resulting in adverse environmental impacts. Alternatives may exist for such electrode coatings to overcome some of these issues but may additionally fail to efficiently extract or separate lithium from a feed source.

Additionally, conventional critical mineral extraction systems heavily consume energy (in order to separate out, for example, an alkali metal from the feed solution) and/or water (for salar evaporation). As worldwide uses of critical minerals (including alkali metals), and as worldwide uses of lithium in particular (e.g., for electric vehicle of all types), continues to increase, reliance on conventional critical mineral extraction systems will create an unsustainably increasing demand for ever more energy, as well as a strongly unwanted increase in toxic waste streams (such as lithium extraction/leaching from minerals). Moreover, the production of more and more energy as demanded by these conventional extraction systems adds to greenhouse gas emissions (e.g., by fossil fuel fired electric generation facilities).

As such, there is thus a need for addressing these and/or other issues associated with the prior art.

SUMMARY

In one embodiment, a membrane-based alkali metal extraction system is provided. In use, an alkali metal extraction system includes an anode and a cathode, where the anode is configured for oxidation and the cathode is configured for reduction. Additionally, wherein migration of a predetermined alkali metal ion through an ion-selective solid electrolyte membrane is driven by a current across the anode and the cathode, and the ion-selective solid electrolyte membrane is selectively permeable to the predetermined alkali metal ion. The alkali metal extraction system further includes at least one active material, a first solution comprising the predetermined alkali metal ion, and a second solution comprising the migrated predetermined alkali metal ion.

In various embodiments, the first solution may include an anolyte, and the second solution may include a catholyte. Additionally, an active material of each of the anolyte and the catholyte may include one or more electroactive solutes or an electrode coating immersed in each of the anolyte and the catholyte, one or more dissolved alkali metal cations (including the predetermined alkali metal ion), one or more dissolved anions, and a solvent. Alternatively, the active material may be a solid, liquid, and/or gaseous species (such as $H_2$) that is continuously fed to either the anode or cathode that may or may not dissolve into either the anolyte or catholyte, respectively.

In various embodiments, the one or more active material may include one or more of: $H_2$, $Na^+$, Li metal, LFP, LMO, NCA, NMC, graphite; Na-based active materials including Prussian Blue; and/or electroactive solutes include but are not limited to: ferricyanide, ferrocyanide, or a redox state ferricyanide or ferrocyanide ($[Fe(CN)_6]^{3-}/[Fe(CN)_6]^{4-}$); ferrocene ($Fe(C_5H_5)_2$, ferrocenium $Fe(C_5H_5)_2^+$, cobaltocene ($Co(C_5H_5)_2$, cobaltocenium $Co(C_5H_5)_2^+$, or any organic derivatives thereof; vanadium-containing ions or vanadium coordination complexes, including one or more of pervanadyl ($VO_2^+$), vanadyl ($VO^{2+}$), $V^{2+}$, $V^{3+}$; phosphotungstic acid, or a redox state of phosphotungstic acid ($[PW_{12}O_{40}]^{3-}/[P_2W_{21}O_{71}]^{6-}/[PW_{11}O_{39}]^{7-}$, etc.); phosphomolybdic acid, or a redox state of phosphomolybdic acid; silicotungstic acid, or a redox state of silicotungstic acid; and/or an ion of any common redox state of Fe, Co, Ni, or Cu, including one or more of $Fe^{2+}$, $Fe^{3+}$, $Co^{2+}$, $Co^{3+}$, $Ni^{2+}$, $Ni^{3+}$, $Cu^{2+}$, $Cu^+$, or any coordination complex thereof.

In various embodiments, a first current collector may be in contact with the first solution, and a second current collector may be in contact with the second solution. The current collector may planar, round, and/or rod-shaped; and may be dense/non-porous, meshed, and/or porous. Additionally, each of the first current collector and the second current collector may be electronically conductive, and made of at least one of aluminum, nickel, copper, titanium, stainless steel, graphite felt, or carbon fiber.

In various embodiments, the anode may have a first mean potential, and the cathode may have a second mean potential, where the first mean potential is less than or equal to the second mean potential such that the anode receives electronic charge as the predetermined alkali metal migrates from the first solution to the second solution. Additionally, the first solution may include one or more secondary ions, and/or a first concentration of the one or more secondary ions in the first solution may be greater than a second concentration of the one or more secondary ions in the second solution.

In various embodiments, the configuration of the ion-selective solid electrolyte membrane may include a solid electrolyte particle with a predetermined pore size corresponding with the predetermined metal ion. The first solution may be a geothermal brine or a salar brine. Still yet, the first solution may comprise at least one of lithium minerals, lithium-containing brines, recycled lithium batteries, or seawater.

In various embodiments, the second solution may comprise a first electroactive solute, where the reduction of the first electroactive solute coincides with the migration of the predetermined alkali metal ion. Additionally, the first solution may comprise a second electroactive solute, where oxidation of the second electroactive solute coincides with the migration of the predetermined alkali metal ion. A first concentration of at least one $H^+$ ion or at least one $Na^+$ ion may decrease in the second solution, and a second concentration of the at least one $H^+$ ion or the at least one $Na^+$ ion may increase in the first solution.

In various embodiments, the first solution may include LiOH at a first solubility, and the second solution may include an organic solution with second solubility, wherein the second solubility is lower than the first solubility. Additionally, the organic solution may comprise $H_2O$, where the $H_2O$ is configured to facilitate formation of an alkali salt.

In various embodiments, the migrated predetermined alkali metal ion may be configured to recombine with a hydroxyl group to precipitate. Additionally, input energy used to migrate the predetermined metal alkali ion may be stored and recovered, at least in part, as electrochemical energy of the migrated predetermined metal alkali ion at the cathode. Further, the input energy may correspond with an electric charging at an electrode with the predetermined metal alkali ion and the electrochemical energy may correspond with an electric discharge at the electrode of the predetermined metal alkali ion. Still yet, the recovery of the input energy may reduce a carbon footprint of a manufacturing facility.

In one embodiment, a membrane-based critical minerals purification system is provided. In use, a critical minerals purification system includes an anode and a cathode, where the anode is configured for oxidation and the cathode is configured for reduction. Additionally, migration of a predetermined alkali metal ion through an ion-selective solid electrolyte membrane is driven by a current across the anode and the cathode, and the ion-selective solid electrolyte membrane is selectively permeable to the predetermined alkali metal ion. Additionally, the critical minerals purification system includes at least one active material, a precursor solution comprising the predetermined alkali metal ion, where the precursor solution is characterized by a first purity with respect to an alkali metal salt, and a second solution comprising the migrated predetermined alkali metal ion, wherein the second solution is characterized by a second purity with respect to the alkali metal salt.

In various embodiments, the second purity may be greater than the first purity. Additionally, the at least one active material at the anode and/or the cathode includes at least one of: $H_2$, $Na^+$, Li metal, LFP, LMO, NCA, NMC, graphite; Na-based active materials including Prussian Blue; ferricyanide, ferrocyanide, or a redox state ferricyanide or ferrocyanide ($[Fe(CN)_6]^{3-}/[Fe(CN)_6]^{4-}$); ferrocene ($Fe(C_5H_5)_2$, ferrocenium $Fe(C_5H_5)_2^+$, cobaltocene ($Co(C_5H_5)_2$, cobaltocenium $Co(C_5H_5)_2^+$, or any organic derivatives thereof; vanadium-containing ions or vanadium coordination complexes, including one or more of pervanadyl ($VO_2^+$), vanadyl ($VO^{2+}$), $V^{2+}$, V 3+; phosphotungstic acid, or a redox state of phosphotungstic acid ($[PW_{12}O_{40}]^{3-}/[P_2W_{21}O_{71}]^{6-}/[PW_{11}O_{39}]^{7-}$, etc.); phosphomolybdic acid, or a redox state of phosphomolybdic acid; silicotungstic acid, or a redox state of slicotungstic acid; or an ion of any common redox state of Fe, Co, Ni, or Cu, including one or more of $Fe^{2+}$, $Fe^{3+}$, $Co^{2+}$, $Co^{3+}$, $Ni^{2+}$, $Ni^{3+}$, $Cu^{2+}$, $Cu^+$, or any coordination complex thereof.

In various embodiments, the ion-selective solid electrolyte membrane may be the at least one active material. Additionally, the second solution may include $H_2$, where the $H_2$ is an output of the reduction of the cathode. Further, the first solution may include $H_2$, where the $H_2$ is an input of the oxidation of the anode.

In various embodiments, the anode may use a first active material, the cathode may use a second active material, and the first active material may differ from the second active material. Additionally, energy lost to the output of the reduction may be regained by the input of the oxidation. Further, the precursor solution may be in contact with the anode. The precursor solution may include LiOH.

In various embodiments, the second solution may be in contact with the cathode. The second solution may include $H_2O$. Additionally, the $H_2O$ may function as a reagent and a solvent. Further, the alkali metal salt may be extracted from the second solution. The extracted alkali metal salt at the second purity may be used for battery components.

In various embodiments, a reagent may be added to the second solution, where the reagent is configured to cause the migrated predetermined alkali metal ion to combine with a hydroxyl group to form the alkali metal salt at the second purity. Additionally, the precursor solution may include at least one of lithium minerals, lithium-containing brines, recycled lithium batteries, or seawater.

In various embodiments, input energy used to migrate the predetermined metal alkali ion may be saved and recovered, at least in part, as electrochemical energy of the migrated predetermined metal alkali ion at the cathode. Additionally, the input energy may correspond with an electric charge process and the electrochemical energy may correspond with an electric discharge process. Further, the recovery of the input energy may reduce a carbon footprint of a manufacturing facility.

In one embodiment, a membrane-based alkali metal salt precipitation system is provided. In use, an alkali metal salt precipitation system includes an anode and a cathode, where the anode is configured for oxidation and the cathode is configured for reduction. Additionally, migration of a predetermined alkali metal ion through an ion-selective solid electrolyte membrane is driven by a current across the anode and the cathode, and the ion-selective solid electrolyte membrane is selectively permeable to the predetermined alkali metal ion. The alkali metal salt precipitation system further includes at least one active material, a precursor solution comprising the predetermined metal ion, where the precursor solution is at a first solubility of an alkali metal salt, and a second solution comprising the predetermined metal ion, where the second solution is at a second solubility of the alkali metal salt which causes the migrated predetermined metal ion to precipitate.

In various embodiments, the precursor solution may include at least one of LiOH, LiCL, or $Li_2CO_3$. Additionally, the LiOH may be insoluble in the second solution. Further, the first solubility may be higher than the second solubility.

In various embodiments, the precursor solution may include one or more buffers. The one or more buffers may include at least one of $HCO_3^-$ or $CO_3^{2-}$. Additionally, the one or more buffers may be used to protect the ion-selective solid electrolyte membrane. Further, the migrated predetermined metal ion may be Li+, and/or the second solution may comprise at least one LiOH precipitate. Still yet, the second solution may comprise $H_2O$, where the $H_2O$ may be configured to facilitate the LiOH precipitate formation. The $H_2O$ may function as a reagent.

In various embodiments, the second solution may comprise at least one ether. Additionally, the precursor solution may include an electroactive solute. The cathode and the anode each may include an electronically conductive substrate made of at least one of: graphite, CNO, graphene, Pt, Au, Ag, Ti, Cu, Al, or stainless steel.

In various embodiments, the at least one active material may comprise an electrode slurry casted on a current collector. The cathode may include a catalyst electrically coupled with an electrically conductive substrate of the cathode. Additionally, the anode may include a catalyst electrically coupled with an electrically conductive substrate of the anode.

In various embodiments, input energy used to migrate the predetermined metal ion may be saved and recovered, at least in part, as electrochemical energy of the migrated predetermined metal ion at the cathode. Additionally, the input energy may correspond with an electric charge process and the electrochemical energy may correspond with an electric discharge process. Further, the recovery of the input energy may reduce a carbon footprint of a manufacturing facility.

In one embodiment, a membrane-based ion exchange system is provided. In use, an ion exchange system includes an anode, and a cathode, where the anode is configured for oxidation and the cathode is configured for reduction. Additionally, migration of a predetermined alkali metal cation through an ion-selective solid electrolyte membrane is driven by a current across the anode and the cathode. Further, the ion-selective solid electrolyte membrane may be selectively permeable to the predetermined alkali metal cation. The ion exchange system further includes a first active material associated with the anode, a second active material associated with the cathode, an anolyte solution comprising the predetermined alkali metal cation and a first anion, and a catholyte solution comprising the migrated predetermined alkali metal cation and a second anion, where the migrated predetermined alkali metal cation and the second anion are configured to combine to form a dissolved salt in the catholyte solution.

In various embodiments, the catholyte solution may include $H_2O$ or HCl. Additionally, the $H_2O$ or the HCl may be added at the same rate at which the predetermined alkali metal cation passes through the ion-selective solid electrolyte membrane. The catholyte solution may comprise the $H_2O$ or the HCl as a reagent. Further, the formation may be based on a reduction of $H^+$ from $H_2O$ or HCl to LiOH.

In various embodiments, the second anion may comprise a hydroxyl group, the predetermined alkali metal cation may comprise Li+, and the first anion may differ from the second anion. Additionally, the first anion and/or the second anion may include one or more of: $CO_3^{2-}$, $HCO_3^-$, $NO_3^-$, $PO_4^{3-}$, $OH^-$, $Cl^-$, $Br^-$, or $I^-$. Further, the anolyte solution and the catholyte each independently may comprise a solvent comprising one or more of: water, alcohol, ester, ether, carbonate, or hydrocarbon.

In various embodiments, the first active material includes one or more of: $H_2$, $H_2O$, $OH^-$, $Cl^-$, $Br^-$, or $I^-$; and the second active material may include one or more of: $H^+$, $H_2O$, $O_2$, $C_{12}$, $Br_2$, or $I_2$. Further, the ion exchange system may include a buffer in one or more of the anolyte and the catholyte. Additionally, a second ion-selective solid electrolyte membrane may be configured to selectively allow passage of the migrated predetermined alkali metal cation, and a third solution may include the allowed migrated predetermined alkali metal ion.

In various embodiments, the dissolved salt may be an alkali metal salt, and a purity of the alkali metal salt in the catholyte may be less than a purity of the dissolved salt in the third solution. Additionally, the alkali metal salt may be insoluble in the third solution.

In various embodiments, input energy used to migrate the predetermined metal alkali ion may be saved and recovered, at least in part, as electrochemical energy of the migrated predetermined metal alkali ion at the cathode. Additionally, the input energy may correspond with an electric charge process and the electrochemical energy may correspond with an electric discharge process. Further, the recovery of the input energy may reduce a carbon footprint of a manufacturing facility.

In one embodiment, a membrane-based alkali metal production system is provided. In use, an alkali metal production system includes an anode, and a cathode, where the anode is configured for oxidation and the cathode is configured for reduction. Additionally, migration of a predetermined metal ion through an ion-selective solid electrolyte membrane is driven by a current across the anode and the cathode. Further, the ion-selective solid electrolyte membrane is selectively permeable to the predetermined metal ion. The alkali metal production system further includes at least one active material, a first solution comprising an aqueous electrolyte (where the aqueous electrolyte includes the predetermined metal ion), and a second solution comprising a metal atom based on the migrated predetermined metal ion, wherein the second solution is at least partially disposed in a liquid state of the metal atom.

In various embodiments, the at least one active material includes a hydroxyl group for the anode, and/or the at least one active material includes lithium metal for the cathode. Additionally, the liquid state is a molten solution of the metal atom.

In various embodiments, the anode is a carbon rod, and/or the carbon rod includes a Pt catalyst. Additionally, the cathode may comprise a carbon rod or mesh, or a metal rod or mesh. Further, the at least one active material for the anode may include at least one of: $H_2$, $OH^-$, $Cl^-$, $Br^-$, or $I^-$.

In various embodiments, the at least one active material for the cathode may include a liquid metal. The liquid metal may within the temperature range of 25° C.-250° C. Additionally, the liquid metal may be configured to form a molten alloy with lithium. The liquid metal may include one of: Ga, Ga—In, Ga—In—Sn (Galinstan) Na—K alloys, Na—K—Cs alloys, or Ga—In alloys.

In another embodiment, a system for alkali metal production is provided, which includes a first electrode, a first electrolyte comprising an alkali metal salt, where the first electrolyte is configured to be in contact with the first electrode, and a second electrode, where when a current is passed from the first electrode to the second electrode, the current causes migration of an alkali metal ion of the alkali metal salt. Additionally, an ion-selective solid electrolyte membrane is configured to selectively allow the alkali metal ion to migrate. A second solution includes an alkali metal atom based on the migrated alkali metal ion and galinstan. Additionally, the system includes a third electrode, where when a second current passed from the second electrode to the third electrode, the second current causes second migration of the alkali metal atom of the second solution. A second ion-selective solid electrolyte membrane is configured to selectively allow the alkali metal atom to migrate, and a third solution includes the second migrated alkali metal atom.

In various embodiments, the second migrated alkali metal atom may be in a molten state. Additionally, the migration may occur at ambient conditions, and/or the second migration may occur at controlled conditions, wherein the controlled conditions include at least one of: an inert environment, or Ar atmosphere.

In various embodiments, a thickness of the second ion-selective solid electrolyte membrane may be configured to increase a purity of the second migrated alkali metal atom. Additionally, the migration and the second migration may occur concurrently, and/or the migration and the second migration may occur in series or a batch configuration.

In various embodiments, the alkali metal ion may be $Li^+$, and/or the second solution may include lithiated galinstan. Further, the third solution may include only the second migrated alkali metal atom.

In one embodiment, an energy reclamation and carbon-neutral system for critical mineral extraction is provided. In use, a method for critical mineral reclamation includes driving migration of lithium ions using a current passing from an anode to cathode, where the current is driven by a redox configuration of the anode and the cathode. Additionally, the lithium ions are extracted from a first solution into a second solution through an ion-selective solid electrolyte membrane, where the ion-selective solid electrolyte membrane is configured to selectively allow the lithium ions to pass. Further, an input of energy is provided for the extraction, and after the extraction, a reclamation of the lithium ions is caused, where the reclamation recovers at least a portion of the input of energy.

In various embodiments, the reclamation may include converting the lithium ions to lithium carbonate or lithium hydroxide. Additionally, the reclamation may include purifying the lithium ions to a minimum of 99.9% lithium by mass. Further, the input of energy may be stored as electrochemical energy of the lithium ions.

In various embodiments, recovering the at least a portion of the input of energy may reduce a carbon footprint of a manufacturing facility. Additionally, the first solution may be based on at least one of lithium minerals, lithium-containing brines, recycled lithium batteries, geothermal brines, salar brines, or seawater.

In various embodiments, the ion-selective solid electrolyte membrane may be water impermeable. Additionally, the reclamation may include transporting the lithium ions from the second solution to a third solution via the ion-selective solid electrolyte membrane, and/or transporting second ions from the third solution to a fourth solution via a second ion-selective solid electrolyte membrane, wherein the transporting of the second ions from the third solution to the fourth solution coincides with the transporting of the lithium ions from the second solution to the third solution. Still yet, extracting the lithium ions from the first solution to the second solution may coincide with an uptake of second ions from a third solution to the first solution.

In various embodiments, the first solution may be a feed solution, the second solution may be an anolyte, a third solution may be a catholyte, and a second ion-selective solid electrolyte membrane may be selectively permeable to sodium. The anolyte may include a lithium electrolyte and the catholyte may include a sodium electrolyte. Additionally, at least one of the anode or the cathode may be made of stainless steel mesh. The extraction of the lithium ions from the first solution to the second solution may coincide with an extraction of sodium ions from the third solution to the first solution, and the reclamation of the lithium ions may include transporting the lithium ions from the second solution to a fourth solution which may coincide with transporting the sodium ions from the fourth solution to the third solution. Further, the transporting of the lithium ions may coincide with an electric discharge of electrochemical energy of the lithium ions.

In various embodiments, the extraction and reclamation may be performed, at least in part, using a lithium module which includes the ion-selective solid electrolyte membrane, the second solution (where the second solution includes a lithium electrolyte), and an active material electrode in direct contact with the second solution. Additionally, the extraction and reclamation may be further performed, at least in part, using a sodium module which includes a second ion-selective solid electrolyte membrane (where the second ion-selective solid electrolyte membrane is sodium selective), a third solution (where the third solution includes a sodium electrolyte), and a second active material electrode in direct contact with the third solution. Further, the lithium module and the sodium module may be configured to be part of a module array, the module array configured to have multiple lithium modules comprising the lithium module, and multiple sodium modules comprising the sodium module.

In various embodiments, the first solution may be a feed solution that flows into the module array and between each of the multiple lithium modules and each of the multiple sodium modules. Additionally, the first solution may be used for the extraction, and a fourth solution may be used for the reclamation, where the first solution differs from the fourth solution, and the fourth solution replaces the third solution after the extraction. Further, the first solution may comprise at least one of lithium minerals, lithium-containing brines, recycled lithium batteries, geothermal brines, salar brines, or seawater, and the fourth solution may comprise a $Na_2CO_3$ and $Li_2CO_3$ feed in which $Li_2CO_3$ may be saturated.

In various embodiments, the multiple lithium modules and the multiple sodium modules may be configured to be connected in, at least one of, series, parallel, or a combination of series and parallel. Further, the extraction and the reclamation may facilitate recycling of lithium ions, which in turn may reduce a carbon footprint of a manufacturing facility and may allow for sustainable reuse of lithium batteries.

DETAILED DESCRIPTION

Figure 1:
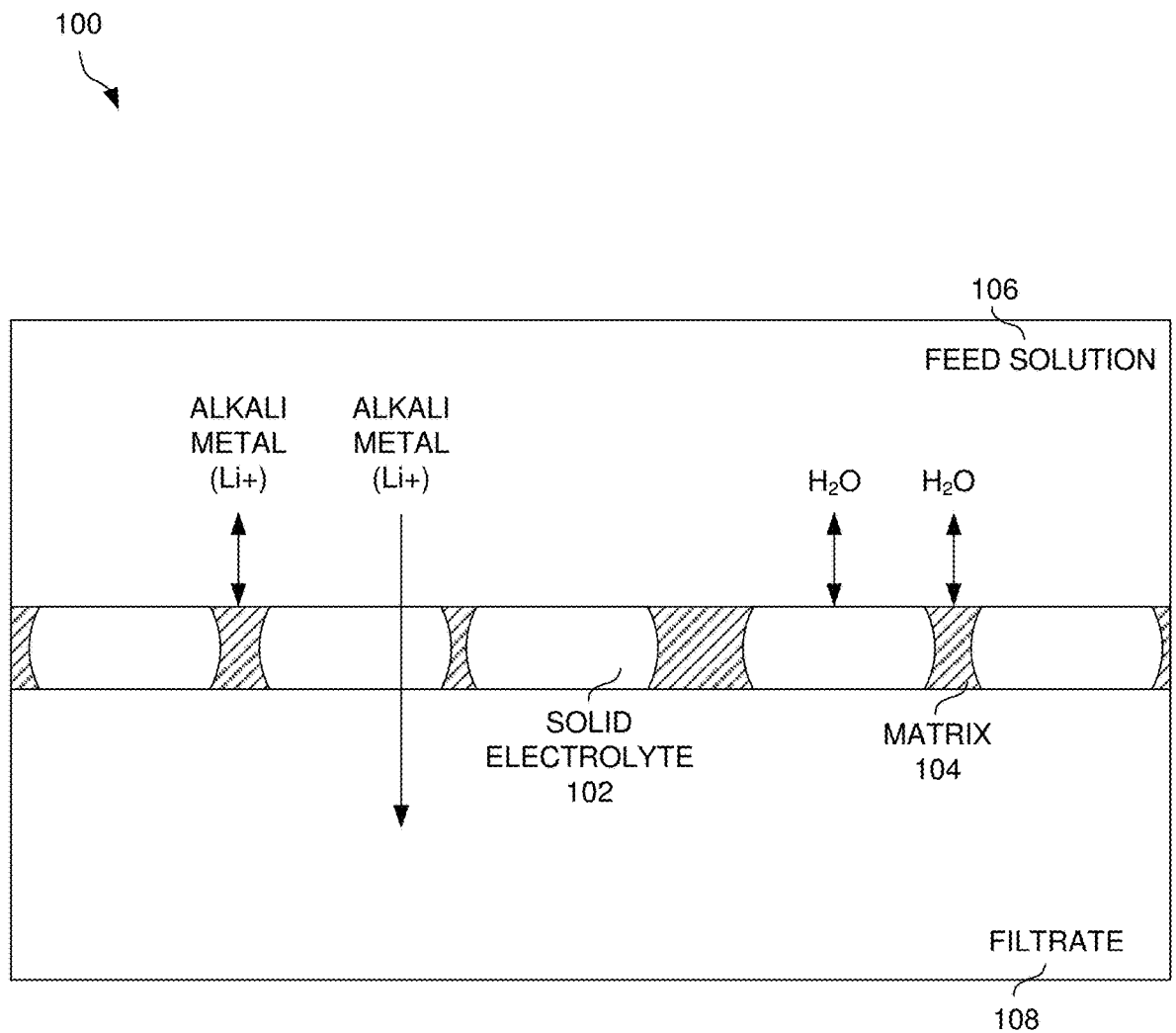
FIG. 1 illustrates a solid electrolyte membrane, in accordance with one embodiment.

Lithium has become ubiquitous in nearly all electric or electronic products, from batteries to armor plating, from to bicycle frames to glass, from lubricants to ceramics and more. Conventional systems and methods for obtaining lithium extract the lithium from raw materials such as from rocks and/or from mineral springs. It is well known that the global demand for lithium will deplete all known commercially viable sources of such raw materials. It therefore becomes imperative to recycle lithium. One source of lithium that is a candidate for recycling is from used lithium-containing batteries. However, to be sustainable, the techniques for lithium extraction must be highly energy efficient and scalable.

Lithium reclamation techniques disclosed herein may be scalable so as to be able to meet the forecasted worldwide EV battery recycling demands through this decade and into the decades to follow. To illustrate the needed scale, it is estimated that 10TWh of EV battery capacity will be demanded between now and the beginning of 2030, with over 1TWh being demanded in calendar year 2025 alone. This demand, in turn, may require around 125,000 tons (or more) of lithium for EV batteries each year. It is acknowledged that a substantial high percentage of this lithium tonnage can be reclaimed from spent batteries.

In view of this large scale, a primary challenge is reclamation efficiency. The techniques disclosed herein meet this challenge by implementing energy recycling, resulting in an extremely low demand for energy that is needed to accomplish the lithium reclamation. For example, for a single factory that reclaims 500 tons of lithium per year, using the energy reclamation techniques disclosed herein, a continuous power demand of only 44KW may be required (a number that is small enough to be provided by banks of solar panels that fit on the roof-space of an EV battery factory). As such, the disclosure herein may provide for more efficient separation of lithium from feed solution, but additionally, may provide for significant energy reclamation associated with the lithium extraction.

Additionally, known separation membranes often will crack and fail as time goes on, resulting in both time inefficiencies and fiscal losses (in having to replace the electrolyte). Further, other membranes (e.g., adsorption membranes, etc.) may have membrane fouling, which in turn, may decrease the efficiency and lifetime of the membrane. Using a solid state electrolyte membrane, in combination with a redox reaction, may assist with decreasing fouling or membrane cracking (e.g., as a consequence of volume expansion during extraction, etc.), which in turn, may increase longevity of the electrolyte and the membrane, thereby overcoming said inefficiencies and losses.

Further, the use of a solid state electrolyte membrane may allow for energy reclamation within the context of a cell design used also for alkali metal separation. For example, separating lithium may cause an electric charge which can be reclaimed for additional (or future) processing. In this manner, a near self-sufficient flow may be created (after activation energy of the reaction is initially overcome). It is to be understood that a full energy reclamation system may not be feasible (due to waste heat, impedance of the solid electrolyte membrane, etc.). However, using the systems and methods disclosed herein, a significant amount of energy may be reclaimed (thereby making the system more fiscally efficient and environmentally responsible).

DEFINITIONS AND USE OF FIGURES

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Within the context of the present description, the term "membrane" shall be understood as referring to a barrier or lining which separates a solution from a filtrate. The solution may include any feed material/solution, and the filtrate may include that which has been filtered by the membrane. Further, a solid electrolyte (which may be embedded within the membrane) may refer to a solid-form electrolyte capable of migrating ions. Additionally, a matrix may include and/or refer to, an epoxy, a polymer matrix, any polymeric binder, a multifunctional amine, and/or a multifunctional epoxide. In this manner, a matrix may provide mechanical strength required to keep a film intact over the life of its operation, including preventing cracks from forming when a membrane is removed from water (or any other feed solution), and acting as a barrier.

Within the context of the present description, the term "electrode" refers to an electric conductor. The electrode may compose an active material which may serve as a host for extracted ions (such as lithium) and store the energy input for extraction in the form of electrochemical energy.

Within the context of the present description, the term "electrolyte" refers to a substance that contains ions. For example, the substance may include a liquid, a semi-solid (e.g., gel), and/or solid (e.g., paste). Additionally, the electrolyte may allow for an electrical current to flow between an anode and a cathode (thereby allowing movement of the ions).

Within the context of the present description, an "ion selective electrolyte membrane separator" refers to separation system that selectively removes ions. For example, the ion selective electrolyte membrane separator may be used to selectively remove alkali metal ions or H+ from one solution or material to a new solution or material by applying a potential across an ion-selective electrolyte membrane.

Within the context of the present description, "ion exchange" refers to system that replaces an ion with a new ion. For example, the ion exchange may include a separation system that replaces one or more anions/cations in a solution with a new anion/cation.

Within the context of the present description, "direct lithium extraction" refers to removing lithium ions from a solution. For example, direct lithium extraction may include a separation system that removes lithium ions from a solution to a new solution.

Within the context of the present description, "salt precipitation" refers to a salt created by precipitation. For example, salt precipitation may include a separation system that enables the removal of a salt from a solution through precipitation.

Within the context of the present description, "purification" refers to increasing purity. For example, purification may include a separation system designed specifically to increase the purity of an alkali metal salt.

Within the context of the present description, "alkali metal electrolysis" refers to conversion of an alkali metal salt to its corresponding metal.

Within the context of the present description, an "active material" may include any material that takes place in a redox reaction that is used as a source/sink of electrons in the anode/cathode. Further, an "electroactive solute" may include an active material that is dissolved in the electrolyte (either anolyte or catholyte).

Within the context of the present description, a separation process using an ion-selective electrolyte membrane refers to any process to remove an ion from a solution via an ion-selective electrolyte membrane. For example, it may include a process through which an alkali metal or H+ may be selectively removed from a solution or material to a new solution or material by applying a potential across an ion-selective electrolyte membrane.

Within the context of the present description, a reclamation process refers a process where input energy is recovered. For example, the reclamation process may include alkali metal being selectively removed from a solution or material using a 2-step charge/discharge process in which the electrochemical energy input in the charge step may be at least partially recovered during the discharge step.

Within the context of the present description, a liquid metal intermediate process refers to a process where an alkali metal salt is reduced to an alkali metal with liquid metal used as an intermediate. For example, the process may include reducing an alkali metal salt to its corresponding alkali metal in which a liquid metal is used as an intermediate. In one embodiment, the intermediate may be used to prevent a feed solution from coming in contact with lithium metal and its environment.

DESCRIPTIONS OF EXEMPLARY EMBODIMENTS

FIG. 1 illustrates a solid electrolyte membrane 100, in accordance with one embodiment. In the context of the present description, the solid electrolyte membrane 100 may be used to enable the passage of Li+(or any preconfigured alkali metal) ions while preventing all other unwanted substances, such as water, from passing through the solid electrolyte, or through a substrate in which the solid electrolyte is embedded. Additionally, the structure of the solid electrolyte membrane 100 is extremely durable, enabling operation for a significant time without structural degradation or decrease in performance. Of course, it is to be appreciated that the solid electrolyte membrane 100 could be configured to allow passage of any specific ion. Further, the solid electrolyte membrane 100 may be configured for a high selectivity ratio of ions (such as Na+/Li+, Na+/K+, etc.).

The solid electrolyte membrane 100 improves and solves problems previously associated with prior selective membrane. For example, when using the solid electrolyte membrane 100 as an ion-selective membrane for electrochemical lithium extraction/recycling, it may prevent the electrode from contacting water (which may adversely react with it). Further, the ion-selective membrane may prevent the electrode active material from needing to be directly soaked in the feed solution, which would cause the electrode to dry out, which in turn may lead to cracking when removed from the solution while making the electrode material vulnerable to the contents of the feed solution. Additionally, the ion-selective membrane may resist cracking when taken out of the feed solution due to the fact that the ion-selective membrane may be held together by a densely crosslinked matrix, which may prevent a reconfiguration of the polymer structure (which may occur when a liquid with high surface tension, such as water, is removed from the ion-selective membrane, etc.).

Further, the solid electrolyte membrane 100 may be used as a polysulfide barrier, which may attenuate or remove (even near completely) the poly sulfide shuttle phenomena in Li—S batteries. Still yet, the solid electrolyte membrane 100 may protect Li metal (or any alkali metal) from air, enabling the use of Li-air batteries, which have the highest specific energy of any known chemistry for lithium-ion batteries. As such, the solid electrolyte membrane 100 may be used as a conductive barrier to air.

As shown, a solid electrolyte 102 is embedded in an matrix 104. In one embodiment, the solid electrolyte 102 may be embedded in aluminized mylar. The combination of the solid electrolyte 102 and the matrix 104 represents a membrane. In one embodiment, as illustrated, feed solution 106 may include an alkali metal (such as Lit) and a liquid (such as water, $H_2O$). The membrane may be water impermeable such that the water may be prevented from crossing the solid electrolyte 102 and the matrix 104. In contrast, the alkali metal (such as Lit) may not pass thorough the matrix 104 but may pass through the solid electrolyte 102. That which passes through the membrane may be found in the filtrate 108. Additionally, in addition to repelling water, the membrane may also repel polysulfides, air (including but not limited to oxygen, nitrogen, carbon dioxide, etc.), etc.

The membrane may be composed of solid electrolyte particles (shown as the solid electrolyte 102) within a dense matrix (shown as the matrix 104). Each individual solid electrolyte particle may completely traverse the membrane such that a Li+ ion (or any alkali metal ion) entering from one side of the membrane enters the membrane through the same solid electrolyte particle that it exits the membrane from (i.e., it does not need to pass through any solid-solid interface). In one embodiment, completely traversing the membrane as a single particle may allow for higher conductivity, as the transport pathway may be more direct (especially compared to Li+ transport pathways that go through many solid-solid interfaces which may in turn have lower Li+ conductivity).

In one embodiment, the solid electrolyte membrane 102 may also prevent water from passing through the space in between the solid electrolyte particles and the matrix 104. In one embodiment, this may be due to the fact that the matrix 104 may interact strongly with the solid electrolyte particles of the solid electrolyte 102. Additionally, the solid electrolyte particles of the solid electrolyte 102 may be functionalized to improve interactions with the matrix 104. For example, in one embodiment, if using the solid electrolyte LATP, which is rich in phosphates, acrylic acid derivatives (such as 2-(aminoethyl)methacrylate) may be used to react with the surface phosphates (via michael addition) in order to enrich the surface of the solid electrolyte 102 with amine groups. As such, the epoxide molecules from the matrix 104 may covalently bond with the solid electrolyte particles of the solid electrolyte 102.

Although the alkali metal is shown as Li+ in the solid electrolyte membrane 100, it is to be appreciated that any ion of choice can be selected. Depending on the ion that should be separated, the solid electrolyte may be replaced with the appropriate material. For example, in one embodiment, if Na+ separation is desired, then NASICON can be used in place of LiSICON as the solid electrolyte. Of course, it is to be appreciated that any other ions (such as K+, Rb+, Cs+, etc.) may be separated based on accompanying solid electrolyte materials. Further, it is to be appreciated that LiSICON is a member of the NASICON family of solids, which is composed of $ZrO_6$ octahedra and $PO_4/SiO_4$ tetrahedra that share common corners, with Na+ in the interstitial space. LiSICON may have a structural analogue with MO6 (M=Ti, Ge, Zr, Hf, Sn) octahedra and PO4 tetrahedra and Li+ in the interstitial sites. Such solid electrolytes may have high resistance to degradation and/or corrosion in water. It is to be appreciated that other materials may likewise work (that provide resistance to degradation and/or corrosion in water).

Additionally, the process can be tuned such that any desired volume fraction of solid electrolyte particles within the matrix can be achieved. For example, a slurry may be cast in which all particles are the same size and are hexagonally close packed such that the volume fraction of particles in the casted membrane is maximized. For example, maximizing the volume fraction may include maximizing the volume for a particular given particle size distribution. In other words, if all the particles are the same exact size, then hexagonally close packing may be the most efficient way to make use of the volume. However, in one embodiment, it may be possible to use an even higher volume fraction of the membrane if particles of multiple sizes and/or of different shapes are used. The volume fraction of solid electrolyte particles may then be further increased by removing an increasingly large amount of membrane (via abrasive polishing) on both sides. In this manner, any volume fraction of solid electrolyte particles can be achieved. Creating a membrane with a higher volume fraction of solid electrolyte may require polishing down the membrane film to thinner membranes, thereby removing higher fractions of the initial membrane.

Further, although the solid electrolyte membrane 100 are shown as having spherical solid electrolyte particles, it is to be appreciated that particles of the solid electrolyte 102 do not necessarily need to be spherical. For example, the particles of the solid electrolyte 102 may be donut shaped, blood-cell shaped, and/or any other specifically desired shape (which may be created based on the tuning the spray drying process, specifically the feed rate of the aqueous precursor, to shape the particles). Additionally, particles of the solid electrolyte 102 can be prepared by preparing a precursor solution and regular drying, followed by sintering, yielding non-spherical particles. Ball milling can then be used to reduce the particle size.

To maximize kinetic flow, it is recommended that an ion traverse a single particle of the solid electrolyte 102. However, the solid electrolyte membrane 100 may include multiple layers of the solid electrolyte 102, which may cause an ion to traverse or hop from one particle of the solid electrolyte 102 to another particle of the solid electrolyte 102. Having multiple layers of the solid electrolyte 102 may allow for more uniform distribution of particles within the matrix.

Additionally, multiple membranes (such as the solid electrolyte membrane 100 and another of the solid electrolyte membrane 100) can be stacked together to make a thicker membrane (which may be used for ion selectivity, kinetic flow, greater filtering capability, etc.). In such an embodiment, the individual layers of more than one membranes can be joined together with a Li+(or whatever alkali metal ion selected) conductive adhesive, such as a matrix containing polyethylene glycol diglycidyl ether (PEG-DGE) and/or Jeffamine D-230, and a lithium, salt such as LiTFSI. Of course, it is to be appreciated that other Li+ conductive adhesives may be used to enable the fabrication of a multilayered membrane.

In one embodiment, rather than using mechanical polishing, laser ablation and/or chemical etching may be used to shave down the surfaces of the solid electrolyte membrane 100 and expose the particles of the solid electrolyte 102 to the surfaces. Additionally, ion milling or focused ion beams (FIB) may be used to polish the surface.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
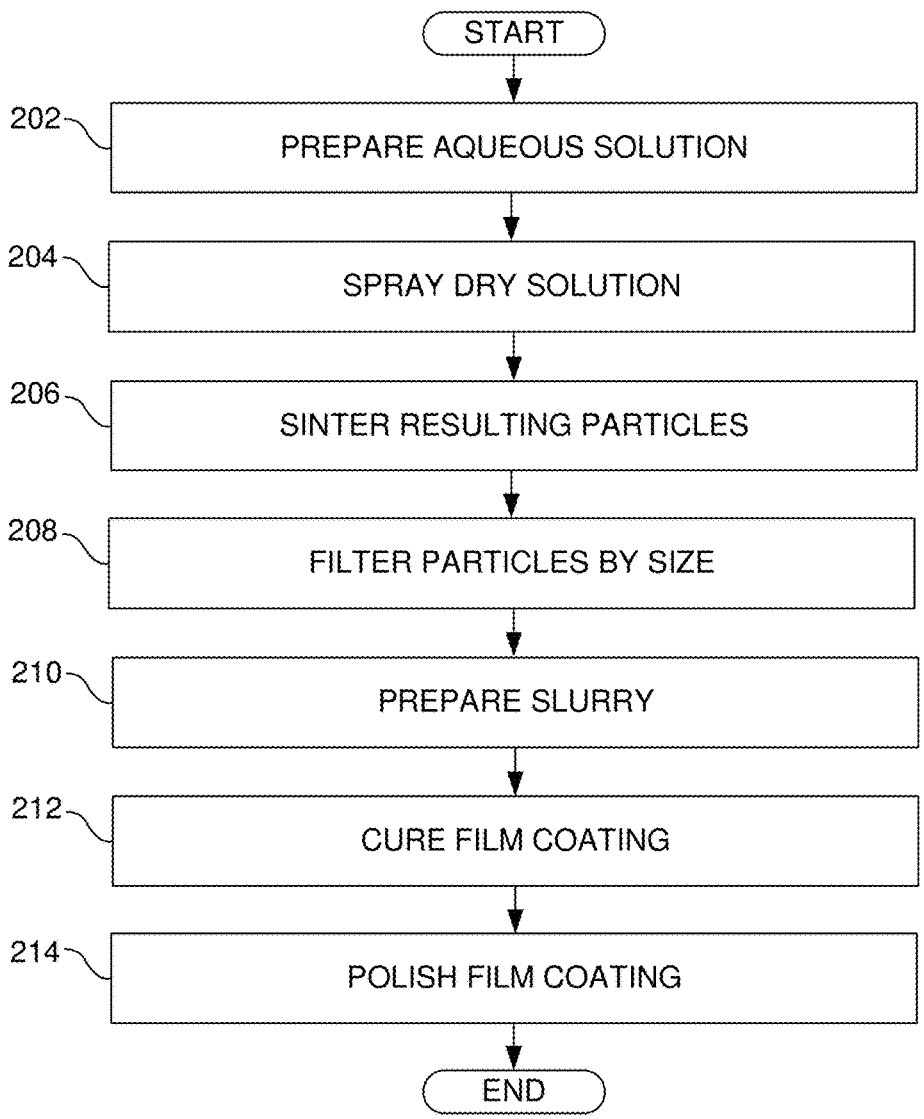
FIG. 2 illustrates a method for creating a solid electrolyte membrane, in accordance with one embodiment.

FIG. 2 illustrates a method 200 for creating a solid electrolyte membrane, in accordance with one embodiment. As an option, the method 200 may be implemented in the context of any one or more of the embodiments set forth in any previous and/or subsequent figure(s) and/or description thereof. Of course, however, the method 200 may be implemented in the context of any desired environment. Further, the aforementioned definitions may equally apply to the description below.

As shown, individual particles of the solid electrolyte of choice are prepared (step 202). In one embodiment, in the case of using LiSICON as the solid electrolyte material, an aqueous solution containing a precursor (Li2CO3, LiNO$_3$, Al2O$_3$, TiO2, GeO2, NH4H2PO4) may be spray-dried (step 204) into spherical particles 1 um-1 mm (or even smaller than 1 um) in diameter. It is to be appreciated that the precursors enumerated are not to be construed as only limited thereto. Other precursors may be used that are compatible with the desired and selected solid electrolyte material. Additionally, the particle size may directly influence the resistance for ion transport. For example, a thinner membrane may result in a lower resistance for ion transport. That being said, the membrane may be adjusted such that it is sufficiently thick to prevent any appreciable penetration of water (or a feed solution). The resulting particles are then sintered at high temperature (step 206) in order to densify the particles. The temperature and time of sintering may depend on the selected solid electrolyte material. The densified particles may result in undesired substances (such as water) being prevented from diffusing through the bulk of the aqueous solution, while also homogenizing the distribution of atoms in the particle (which increases Li+ conductivity).

The precursors solution for the solid electrolyte may be composed of salts, inorganic or organic compounds containing the elements of the solid electrolyte. The following tables show possible precursor and candidate materials to result in the solid electrolyte:

TABLE 1

Possible Precursors

| Solid Electrolyte | Precursors |
|---|---|
| LATP | LiNO$_3$, Al$_2$O$_3$, TiO$_2$, NH$_4$H$_2$PO$_4$ |
| LAGP | LiNO$_3$, Al$_2$O$_3$, GeO$_2$, NH$_4$H$_2$PO$_4$ |
| LiSICON | LiNO$_3$, Al$_2$O$_3$, GeO$_2$, TiO$_2$, NH$_4$H$_2$PO$_4$ |
| LTO | LiNO$_3$, TiO$_2$ |
| NaSICON | Na$_2$CO$_3$, Al$_2$O$_3$, GeO$_2$, TiO$_2$, NH$_4$H$_2$PO$_4$ |

TABLE 2

Candidate Materials for Solid Electrolyte

| | Alkali Metals |
|---|---|
| Li | $Li_2CO_3$, $LiNO_3$, LiOH, LiOR (R = Alkyl) |
| Na | $Na_2CO_3$, $NaNO_3$, NaOH, NaOR (R = Alkyl) |
| K | $K_2CO_3$, $LiNO_3$, KOH, KOR (R = Alkyl) |

| | Tetravalent Metals |
|---|---|
| Ti | $TiO_2$, $Ti(OR)_4$ (R = Alkyl) |
| Si | $SiO_2$, $Si(OR)_4$ (R = Alkyl) |
| Ge | $GeO_2$, $Ge(OR)_4$ (R = Alkyl) |
| Zr | $ZrO_2$, $Zr(OR)_4$ (R = Alkyl) |

| | Phosphorus |
|---|---|
| P | $H_3PO_4$, $(NH_4)_{3-x}H_xPO_4$ (x = 0, 1, 2) |

| | Trivalent Metals |
|---|---|
| Al | $Al(NO_3)_3$, $Al_2O_3$, $Al(OR)_3$ (R = Alkyl) |
| Cr | $Cr(NO_3)_3$, $Cr_2O_3$, $Cr(OR)_3$ (R = Alkyl) |
| Ga | $Ga(NO_3)_3$, $Ga_2O_3$, $Ga(OR)_3$ (R = Alkyl) |
| Fe | $Fe(NO_3)_3$, $Fe_2O_3$, $Fe(OR)_3$ (R = Alkyl) |
| Sc | $Sc(NO_3)_3$, $Sc_2O_3$, $Sc(OR)_3$ (R = Alkyl) |
| In | $In(NO_3)_3$, $In_2O_3$, $In(OR)_3$ (R = Alkyl) |
| Lu | $Lu(NO_3)_3$, $Lu_2O_3$, $Lu(OR)_3$ (R = Alkyl) |
| Y | $Y(NO_3)_3$, $Y_2O_3$, $Y(OR)_3$ (R = Alkyl) |
| La | $La(NO_3)_3$, $La_2O_3$, $La(OR)_3$ (R = Alkyl) |
| Eu | $Eu(NO_3)_3$, $Eu_2O_3$, $Eu(OR)_3$ (R = Alkyl) | where R = any alkyl substituent, including methyl, ethyl, propyl, butyl, isopropyl, isobutyl groups. Notable precursors include titanium isopropoxide (TTIP) for Ti and tetraethyl orthosilicate (TEOS) for Si.

For the lithium-selective membrane, the solid electrolyte may be composed of any NASICON-type Li+ conductor such as LATP, LAGP, LAGTP, LATP, LTASP, LLZP (L=Li if it is the first letter of the anagram, A=Al, T=Ti, G=Ge, L=La if it is not the first letter of the anagram, Z=Zr, S=Si, P=$PO_4^{3-}$). Of the aforementioned electrolytes in the NASICON-type Li+ conductors, any tetravalent metal may be partially or completely substituted with any other tetravalent metal mentioned in the table above, and any of the trivalent metals (Al) may be partially or completely substituted with any other trivalent metal mentioned in the table above. Additionally, any trivalent or tetravalent metal may be partially or completely removed. Other potential solid electrolyte materials may include lithium iron phosphate (LFP), lithium titanium oxide (LTO). Further, the precursors used may depend on the elements used in the solid electrolyte. Of course, for each element selected, a suitable precursor may be listed in the table provided herein.

Additionally, more than one membrane may be used. For example, as shown in process 800 detailed hereinbelow, a first solid electrolyte membrane may be used to selectively extract lithium from a feed solution, and a second solid electrolyte membrane may be used to transfer ions (such as sodium) from a second electrode into the feed solution (from which the lithium was extracted). In such an embodiment, the second solid electrolyte membrane, the composition may depend on the specific ion to be utilized for the second electrode. For example, in the case of sodium, the solid electrolyte may be composed of any NASICON-type conductor of the form $Na_{1+x}Zr_2Si_xP_{3-x}O_{12}$ (0<x<3). For the aforementioned NASICON-type conductor, any tetravalent metal (Zr, Si) may be partially or completely replaced by any other isovalent metal in the table provided hereinabove. Additionally, the electrolyte may be doped with any trivalent metal in the above table. In the case of potassium, the solid electrolyte can be composed of $K_2Fe_4O_7$. The precursors used may therefore depend on the elements used in the solid electrolyte, where for each element selected, a suitable precursors may be listed in the table provided herein.

Next, the particles may be preferably filtered (step 208) based on size (e.g., using a sieve) to remove the excessively small particles and/or to narrow the size distribution of the batch of particles. Suitable materials for the solid electrolyte materials may include, but not be limited to, NASICON-type Li+ conductors (also known as LiSICON), including LATP/LAGP/LAGTP, as well as lithium titanium oxides (LTO), and lithium iron phosphate (LFP). In general, any material that is water-stable, has Li+(or whatever alkali metal selected) conductivity of at least $10 \wedge^{-6}$ S/cm, and a dense crystal structure that has a high selectivity for Li+(or whatever ion is desired) over other ions, may be acceptable as a solid electrolyte material.

In one embodiment, the crystal structure of the solid electrolyte may include a tetrahedra structure (such as $ZrO_6$), and/or an octahedra structure (such as $PO_4$, $SiO_4$, etc.). Additionally, using the process disclosed herein, the microparticles may be sized as needed for efficient membrane ion transfer. For example, a microparticle for the solid electrolyte may be sized at or greater than 100 microns (μm) when used in a membrane with a thickness of 100 microns.

Next, a slurry containing the particles, and matrix (such as epoxy pre-polymers), is casted onto a substrate (step 210) to form a dense coating in which the particles may be embedded in a matrix. In one embodiment, the matrix materials (such as pre-polymers) may function also as a thickener. Additionally, the substrate may include but not be limited to: fluorinated ethylene propylene (FEP), polytetrafluoroethane (PTFE), silicone, polyethylene (PE), polypropylene, kapton, polyethylene terephthalate (PET), etc. Additionally, the substrate may also be composed of one material but coated with one of the aforementioned materials (fluorinated ethylene propylene (FEP), polytetrafluoroethane (PTFE), silicone, polyethylene (PE), polypropylene, kapton, polyethylene terephthalate (PET), etc.) to give the resulting substrate similar or same surface properties enabling delamination of the resulting coating. The film coating is then cured (step 212). As an example, the curing may occur through thermal, and/or UV curing. A result of the curing may include a densely crosslinked matrix.

In various embodiments, suitable materials for the pre-polymers for thermally crosslinked epoxies may include any multifunctional epoxide molecule (Epon828, and/or PEG-DGE, etc.) and amine crosslinkers (melamine, phenylenediamine, and/or jeffamine D-230, etc.). Suitable materials for UV-cured polymers may include multifunctional acrylates/methacrylates (e.g., PEGDMA, and/or PEGDA, Urethane dimethacrylate, bisphenyl A diglycidyl ether acrylate etc.) and photoinitiators (e.g., Darocur 1173). Thermal initiators such as AIBN or BPO may be used in place of a photoinitiator. The crosslinked matrix may have a structure that prevents the diffusion of any substance (most notably water and gases), as a result of its hydrophobic structure and densely crosslinked nature.

Lastly, the film coating is then polished (step 214), including one or both sides, using an abrasive pad. This could be done on a roll-to-roll operation in which the membrane roll with the film coating may be passed through a series of abrasive pads that rotate/slide in order to grind down the surfaces of the membrane, thereby removing the outermost regions of the membrane. After polishing, individual solid electrolyte particles embedded in the membrane may each have large areas of exposed surfaces on both sides of the membrane, providing a route for Li+ ions (or any membrane specific ion) to completely traverse the membrane without the need to travel through multiple particles.

The membrane as discussed herein can be fabricated using web coaters. With respect to scalability of production of such a membrane, as increased battery manufacturing capability comes online to meet growing demand, a single conventional roll-to-roll coater (having a footprint small enough to fit in an office cubicle) can produce enough membrane (such as the solid electrolyte membrane 100) to match each additional 2GWH of lithium battery manufacturing capacity. Additional web coaters can be added to operate in parallel (as lithium battery manufacturing capacity continues to increase with time). Moreover, these web coaters can be collocated near the battery factory. In this manner, production of the solid electrolyte is space-efficient and scalable, and can satisfy expected industry demands.

Figure 3:
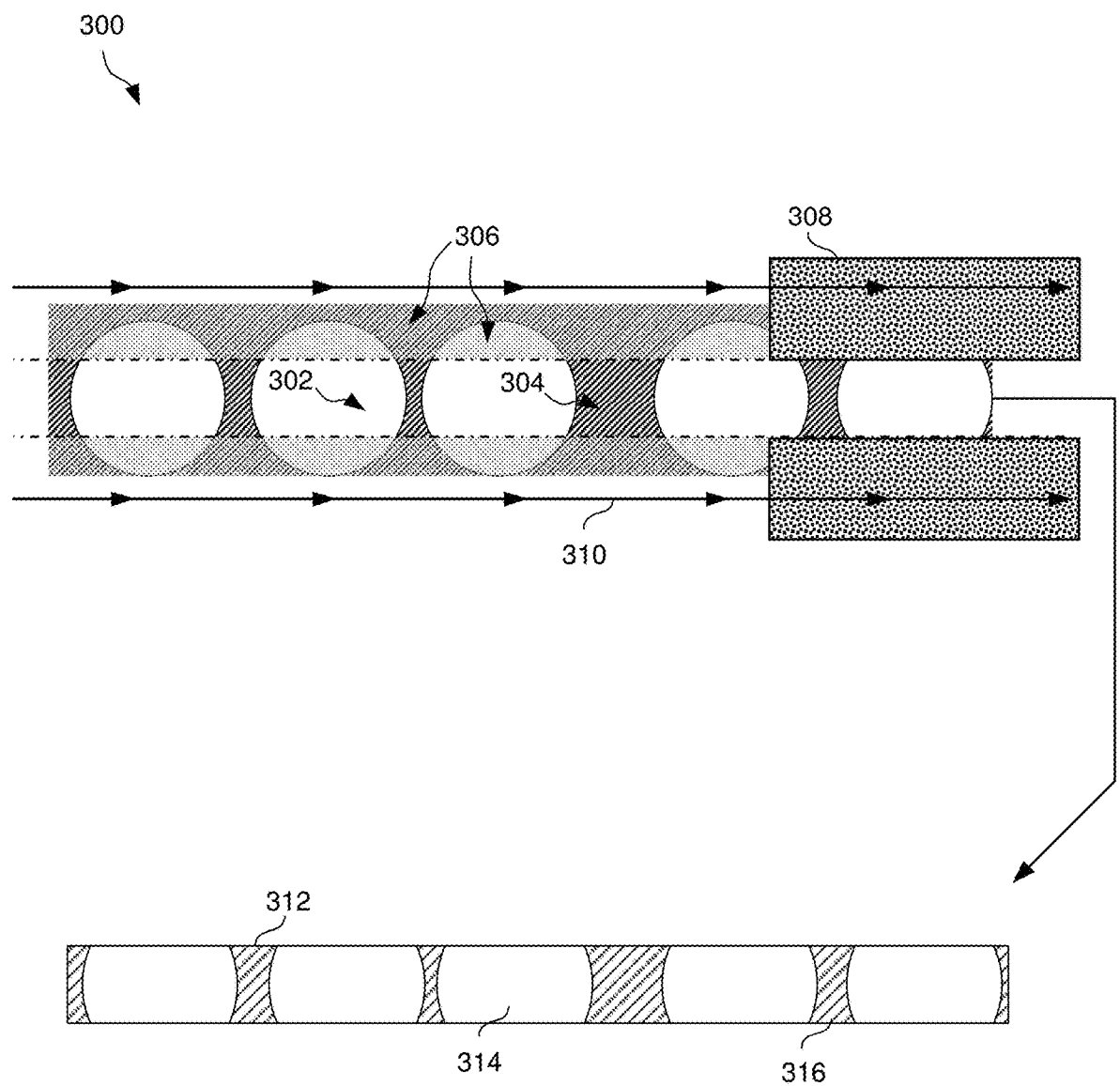
FIG. 3 illustrates a process for mechanical polishing the solid electrolyte membrane, in accordance with one embodiment.

FIG. 3 illustrates a process 300 for mechanical polishing the solid electrolyte membrane, in accordance with one embodiment. As an option, the process 300 may be implemented in the context of any one or more of the embodiments set forth in any previous and/or subsequent figure(s) and/or description thereof. Of course, however, the process 300 may be implemented in the context of any desired environment. Further, the aforementioned definitions may equally apply to the description below.

As shown, the solid electrolyte 302 is embedded within a matrix 304. Mechanical polishers 308 may be used to polish one or more surfaces of the membrane film (containing both the solid electrolyte 302 and the matrix 304). In various embodiments, the solid electrolyte 302 may extend to a surface of the membrane film. In other embodiments, the matrix 304 may extend to a surface of the membrane film. In either case, additional material 306 (either of the solid electrolyte 302 and/or the matrix 304) may be present within the membrane film. In various embodiments, the polishing may occur one side at a time (in series), or both sides simultaneously (assuming both sides polished is desired). Additionally, in one embodiment, a first side may be polished, the coating may then be removed from the release film and transferred to the surface of the electrode (active material coating), where the polished side faces the active material coating, then the resulting laminate is polished once again to expose the solid electrolyte particles on the remaining side.

The membrane film may be polished by passing 310 the membrane film through one or more series of abrasive pads that rotate/slide in order to grind down the surfaces of the membrane film, thereby removing the outermost regions of the membrane film.

After polishing one or more surfaces of the membrane film, polished membrane 312 includes a first exposed surface 314 of the solid electrolyte and a second exposed surface 316 of the matrix. As such, individual solid electrolyte particles embedded in the membrane film may each have large areas of exposed surfaces on both sides of the membrane, providing a route for Li+ ions to completely traverse the membrane without the need to travel through multiple particles.

Figure 4:
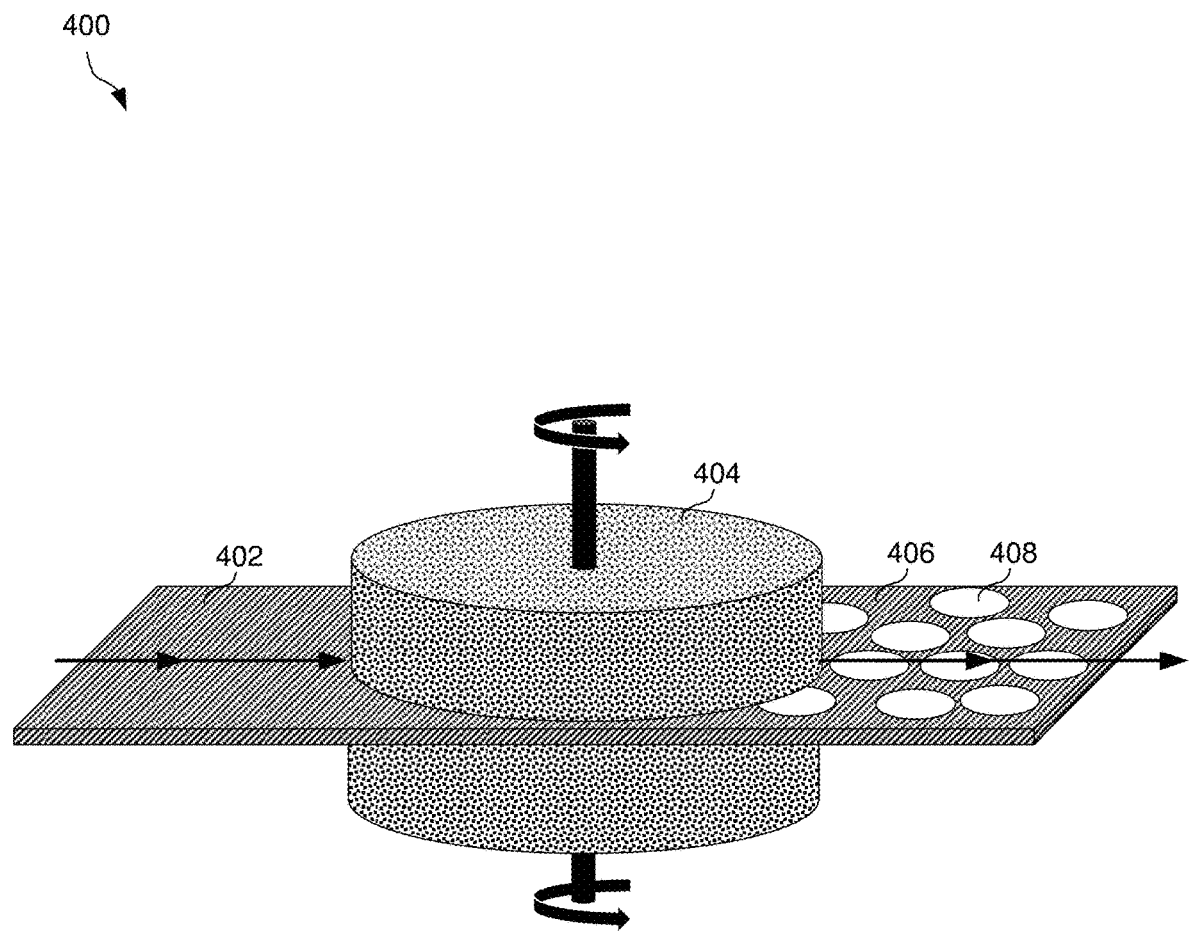
FIG. 4 illustrates a roll-to-roll process for mechanical polishing the solid electrolyte membrane, in accordance with one embodiment.

FIG. 4 illustrates a roll-to-roll process 400 for mechanical polishing the solid electrolyte membrane, in accordance with one embodiment. As an option, the roll-to-roll process 400 may be implemented in the context of any one or more of the embodiments set forth in any previous and/or subsequent figure(s) and/or description thereof. Of course, however, the roll-to-roll process 400 may be implemented in the context of any desired environment. Further, the aforementioned definitions may equally apply to the description below.

As shown, a membrane film 402 may be polished on one or more sides (shown as polishing on both sides in the roll-to-roll process 400) using a mechanical polisher 404 (such as an abrasive pad). The roll-to-roll process 400 shows a roll-to-roll operation in which the membrane film 402 roll is passed through a series of mechanical polishers 404 that rotate/slide in order to grind down the surfaces of the membrane film 402, thereby removing the outermost regions of the membrane film 402. After passing through the mechanical polishers 404, a first exposed surface of the matrix 406 and a second exposed surface of the solid electrolyte 408 may be shown.

Figure 5:
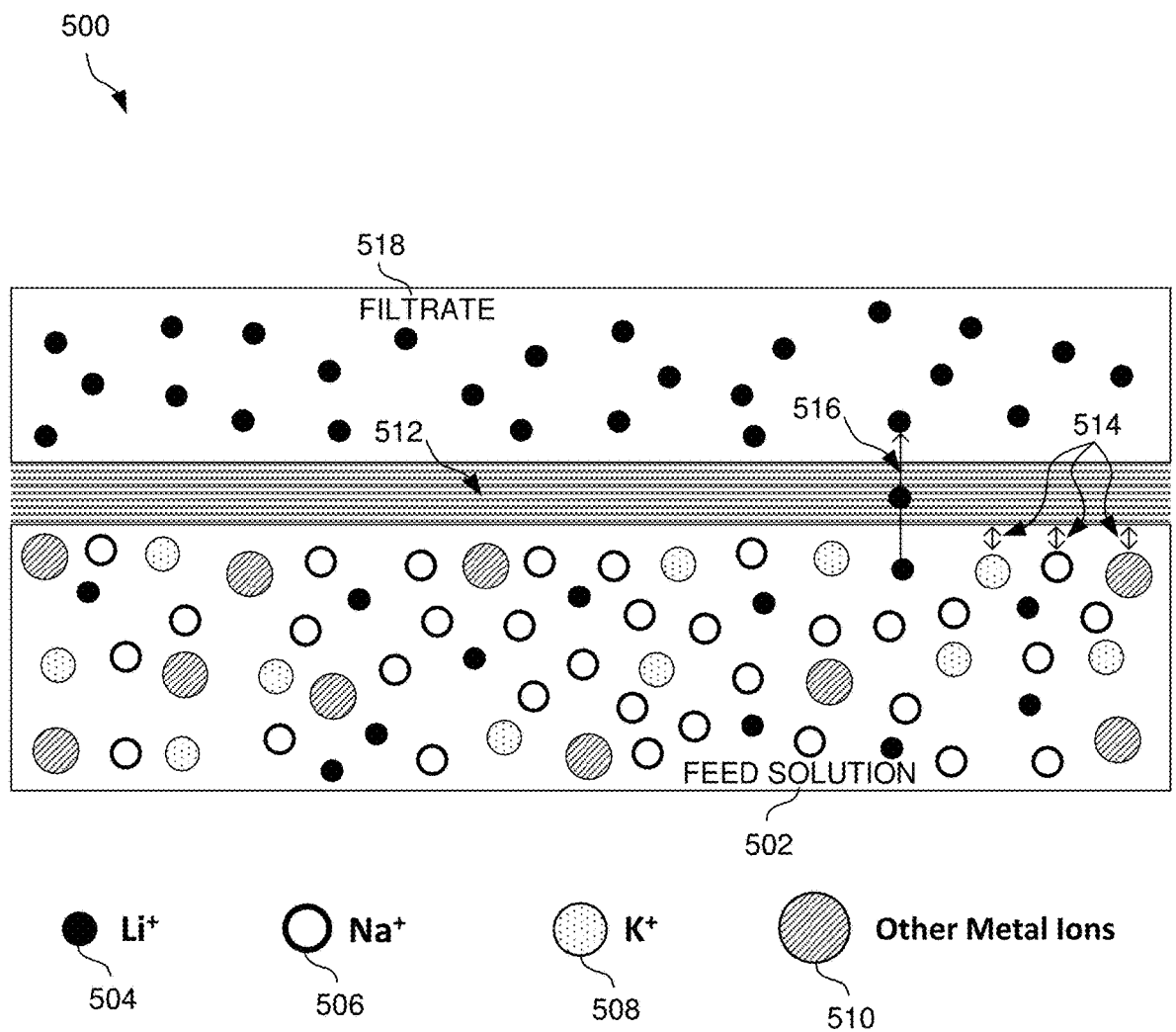
FIG. 5 illustrates an ion-selective solid electrolyte membrane, in accordance with one embodiment.

FIG. 5 illustrates an ion-selective solid electrolyte membrane 500, in accordance with one embodiment. As an option, the ion-selective solid electrolyte membrane 500 may be implemented in the context of any one or more of the embodiments set forth in any previous and/or subsequent figure(s) and/or description thereof. Of course, however, the ion-selective solid electrolyte membrane 500 may be implemented in the context of any desired environment. Further, the aforementioned definitions may equally apply to the description below.

As shown, the ion-selective solid electrolyte membrane 500 includes a feed solution 502, which may include a collection of many different types of ions, including but not limited to lithium Li+ 504, sodium Na+ 506, potassium K+, and/or other metal ions 510. The feed solution 502 may additionally include any aqueous solution containing one or more of lithium Li+ 504, sodium Na+ 506, potassium K+, and/or other metal ions 510.

Additionally, a membrane 512 may be used to selectively allow an ion, in this exemplified case, lithium Li+ 504, to pass 516 through the membrane 512. In contrast, the membrane 512 may be used to prevent other ions, in this exemplified case, sodium Na+ 506, potassium K+, and/or other metal ions 510, from passing 514 through the membrane 512. The accumulated ions that pass through the membrane 512 may be found in the filtrate 518.

It is to be appreciated that world demands for lithium continues to increase (especially as demands for electrification of vehicles increase). Using the ion-selective solid electrolyte membrane 500 may allow for extraction of lithium from lithium minerals, as well as from otherwise unused or discarded sources, including but not limited to recycled lithium batteries, and even seawater (especially as seawater contains>99% of the Earth's accessible Li supply). Current systems (such as from Li brines and/or Li minerals) fail to recover lithium (and other alkali metals) from unconventional sources, and/or are problematic (in terms of selectivity, durability, and/or scalability).

Figure 6:
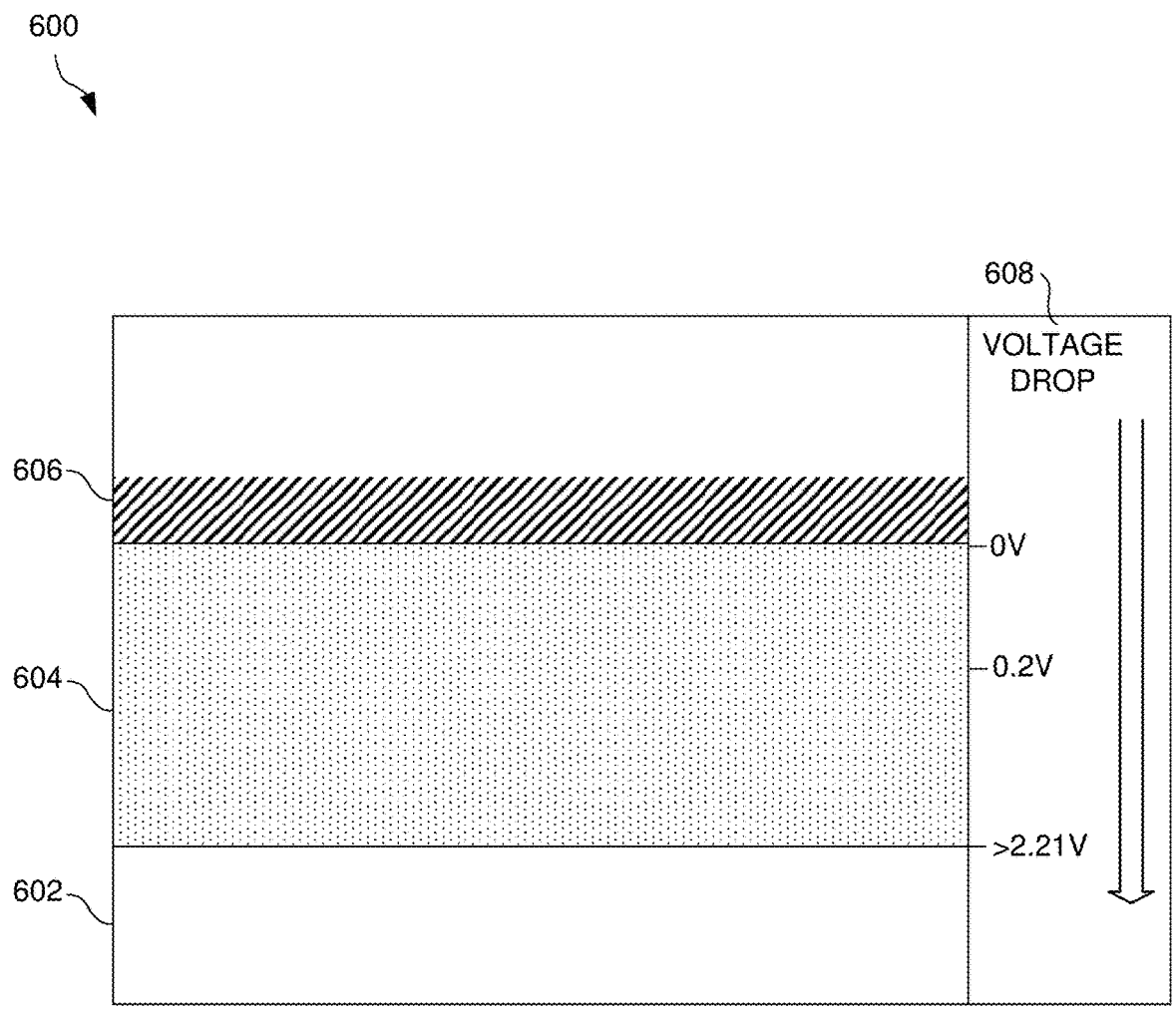
FIG. 6 illustrates a voltage drop using a carbon-based membrane, in accordance with one embodiment.

FIG. 6 illustrates voltage drop 600 using a carbon-based membrane, in accordance with one embodiment. As an option, the voltage drop 600 may be implemented in the context of any one or more of the embodiments set forth in any previous and/or subsequent figure(s) and/or description thereof. Of course, however, the voltage drop 600 may be implemented in the context of any desired environment. Further, the aforementioned definitions may equally apply to the description below.

As shown, the voltage drop 600 may occur using a membrane 604. For example, the membrane 604 may be in contact with a feed solution 602 and an electrode 606. As ions pass through the membrane 604, they may experience a voltage drop 608. In various embodiments, the membrane 604 may be carbon-based (without solid electrolyte particles). In this particular embodiment, carbon-based particles may carry lithium ions through capacitive adsorption rather than through the intrinsic crystal structure of the material (as is the case with solid electrolyte particles). It is to be understood, however, that the voltage drop 600 may occur for any type of membrane used (whether it be carbon-based or solid electrolyte particles).

In one particular embodiment (and as an alternative to the membrane 604), the separation membrane may include multiple layers of graphitic carbon. For example a capacitor-like carbon-based membrane may interface and be in contact with the feed solution 602. Additionally, a graphitic carbon membrane may be a second layer within the membrane. It is to be appreciated that any number of layers of graphitic carbon may be used. Based on interaction with the graphitic carbon, the ions that pass through the capacitor-like carbon-based membrane and the graphitic carbon membrane may accumulate as solid metal (such as metallic lithium Li). Further, ions may accumulate at the electrode 606 (which may include but not be limited to graphite). The electrode 606 may be made of low-porosity graphite, prepared via high-temperature sintering of carbonaceous precursors (e.g., polymers such as polyacrylonitrile (PAN)) over prolonged periods of time.

In one embodiment, the membrane 604 and/or the multilayer membrane of graphitic carbon may be configured to selectively extract lithium ions (and/or any preconfigured alkali metal ion) from a precursor/feed solution containing an abundance of the selected ion and other ions. This precursor/feed solution may include lithium-rich brines, an aqueous solution of ions produced upon acid leaching of lithium minerals, an aqueous solution of ions produced via dissolution (with or without acid) of a discarded/recycled battery, sea water, and/or any other aqueous solution containing the desired ions to be extracted.

With respect to the multilayer membrane of graphitic carbon, it may consist of multiple layers (such as the capacitor-like carbon-based membrane, the graphitic carbon membrane, etc.) each composed of various types of carbon.

Additionally, with respect to the graphitic carbon membrane of the multilayer membrane of graphitic carbon, it may be composed of graphitic carbons bound together with a matrix (including polymeric binders such as polyvinylidene fluoride (PVDF), epoxy) and/or compression plates. With respect to the capacitor-like carbon-based membrane, it may be another membrane layer composed of carbon particles bound together via polymeric binders or compression plates (similar to the graphitic carbon membrane).

In one embodiment, regardless of whether the membrane 604 or the multilayer membrane of graphitic carbon is used, as the alkali metal (such as lithium) travels through the membrane, the alkali metal may be electrochemically reduced to its metallic state (such as Li). Additionally, with respect to the membrane 604, the alkali metal may be reduced to its metallic state. As such, an active material (such as graphite) may be chosen with a reduction potential close to that of metallic alkali metal (such as Li), such that the membrane may be in direct electrical contact with the active material, and the current density may be high enough (or the active material may be overcharged) to initiate formation of metallic alkali metal (Li). Further, the cell design may include a separator between the active material coating and the membrane 604 to prevent direct electrical contact. Additionally, if it were desired to plate metallic Li, an electrode could be created with no active material (such that metallic Li may directly plate on the current collector or any electronically-conductive surface in the electrode), and/or the active material may be overcharged such that all available sites for Li insertion into the active material may be occupied (leading to plating of metallic Li upon further charging). It is to be understood that although reduction to a metallic state is feasible, the system may be set to prioritize energy efficiency (which in turn may require low current density demands to reduce energy loss due to ohmic resistance). As such, the system may be modified to prioritize desired outcomes (such as, but not limited to, energy efficiency, metallic reduction, etc.).

In one embodiment, the voltage drop may relate to the stability of the membrane 604 with respect to water. With respect to this particular application, the voltage drop may be either ionic or electronic in nature. Additionally, if the voltage drop were electronic, that may allow for safe operation of the membrane 604 in contact with water.

In this manner, the feed solution 602 may function as an electrolyte, and the electrode 606 may function as an anode. Such phenomenon is illustrated by voltage drop 608. The voltage drop may be due to Ohmic resistance as described by $V=IR$. The resistance R of the membrane layer(s) may be fixed based on the design, but the voltage drop V varies with the current I that is applied. Since the intercalation of lithium ions into graphite (lithiation) occurs at reduction potentials well below the reduction potential of water, a voltage drop may be necessary in order to prevent the current from reducing water (which would significantly reduce the efficiency of the design). Since the difference in reduction potential of lithium metal and water is 2.21 V (but preferably higher to provide an adequate electrochemical buffer), in one embodiment, the membrane may operate at a current I such that the electrons experience a voltage drop of at least 2.21 V as to not reduce water.

As shown later (in FIG. 7), individual sheets of graphene within the carbon particles (of either or both of the capacitor-like carbon-based membrane and the graphitic carbon membrane of the multilayer membrane of graphitic carbon) may be covalently adhered to one another (as opposed to van der Waals forces). This covalent bond may significantly increase the amount of energy required to push apart the lattices (e.g., it is intolerable to strain). Thus, the sizing of the distance between the sheets of graphene may be tuned to the particular size ion that should pass through the membrane.

In operation, the graphitic carbon particles of the multilayer membrane of graphitic carbon (in either or both of the capacitor-like carbon-based membrane and the graphitic carbon membrane) may extract ions from the feed solution 602 via electrochemical intercalation/adsorption. Since electrochemical intercalation of Li requires the lowest strain (10 vol %) among all ions that are likely to be found in the feed solution 602, the selectivity of Li will be highest. Additionally, by increasing the degree of covalent C—C bonds between adjacent sheets of graphene, the selectivity of Li over other ions is even further enhanced, as a substantial amount of strain would be required for other ions to intercalate. In this manner, an effective voltage drop may occur as the selected ion (such as $Li_+$) passes through the capacitor-like membrane and the graphitic carbon membrane of the multilayer membrane of graphitic carbon. In similar manner, as the selected ion (such as $Li_+$) passes through the membrane 604, it may also experience an effective volage drop.

In one embodiment, the carbon particles contained in the capacitor-like carbon-based membrane of the multilayer membrane of graphitic carbon may serve multiple purposes. For example, they may serve as an electrical buffer layer between the graphitic carbon membrane and the feed solution 602 (which is likely to be an aqueous solution). Additionally, the carbon particles may extract ions from the feed solution 602 and transport such ions to the graphitic carbon membrane of the multilayer membrane of graphitic carbon.

Additionally, the electrochemical buffering effect may be achieved via the hydrophobic nature of the materials (such as carbon) in the capacitor-like carbon-based membrane, and by a large electrochemical voltage drop across the capacitor-like carbon-based membrane. Such voltage drop 608 may prevent the reduction of water at the interface between the feed solution 602 and the capacitor-like carbon-based membrane of the multilayer membrane of graphitic carbon. This voltage drop is achieved by tuning the thickness and resistivity of the membrane, as governed by Ohm's law (V=IR, where R=(resistivity)*(thickness/area).

As such, alkali metal ions may be extracted via electrochemical and capacitive adsorption of ions on the surface of the carbon particles. By tuning the porosity and surface area of the carbon particles, the kinetics of ion transport can be tuned. Though all ions are possible to adsorb onto the carbon particles, lighter ions and monovalent ions (e.g., alkali metal ions) can move much more rapidly through the membrane 604 (to the electrode 606).

In various embodiments, the design of the membrane 604 can be modified such that the alkali ion (such as lithium) does not fully reduce all the way to its metallic state (such as metallic Li) and/or plate on the surface of the electrode 606.

In one embodiment, reducing the alkali ion to its metallic stage may be limited by making the graphitic carbon membrane substantially larger (in terms of thickness of layer) such that the alkali metal (such as lithium) extracted may be completely contained within the graphitic carbon membrane (and subsequently removed).

In like manner, using the membrane 604 may allow for recovery of the electrical energy used to drive this reaction, reducing the net energy requirement and therefore cost of the material. In other words, energy used to drive the displacement of alkali metals (from a feed solution) to an electrode may, in turn, be stored in the form of electrochemical energy, which may discharged at a later time.

Figure 7:
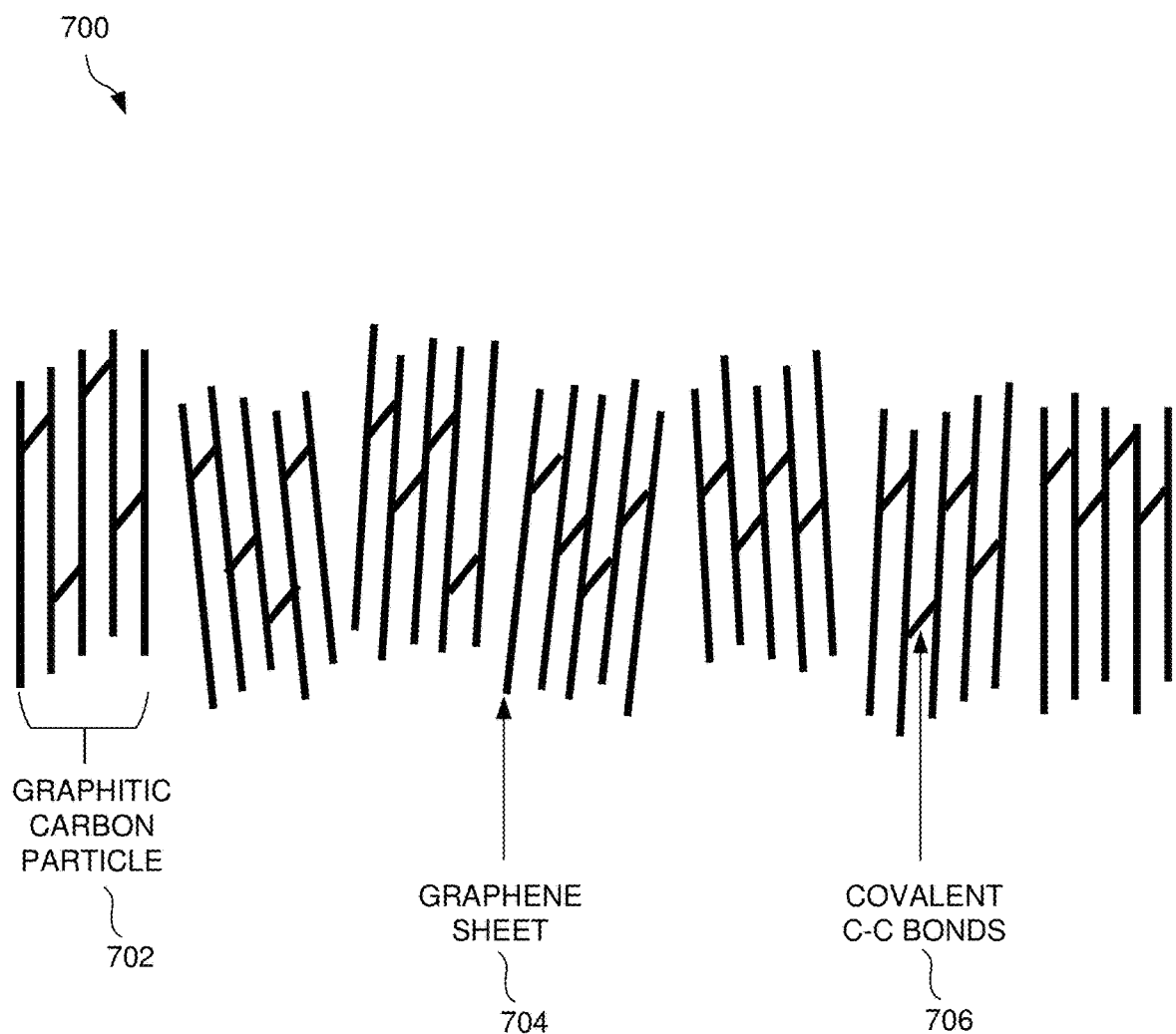
FIG. 7 illustrates a close-up diagram of graphitic carbon, in accordance with one embodiment.

FIG. 7 illustrates a close-up diagram 700 of graphitic carbon, in accordance with one embodiment. As an option, the close-up diagram 700 may be implemented in the context of any one or more of the embodiments set forth in any previous and/or subsequent figure(s) and/or description thereof. Of course, however, the close-up diagram 700 may be implemented in the context of any desired environment. Further, the aforementioned definitions may equally apply to the description below.

As shown, the close up diagram 700 of graphitic carbon includes a graphitic carbon particle 702. Additionally, such graphitic carbon particle 702 (collectively) may include individual graphene sheets 704, where a covalent carbon-carbon bond 706 links the individual graphene sheets 704 together.

In one embodiment, the graphitic carbon membrane 606 described hereinabove may be tuned such that the surface area (of the graphitic carbon particle 702) may be minimized, and the interplanar fusion (e.g., covalent C—C bonds between adjacent sheets of graphene in the lattices) may be maximized.

By decreasing the surface area of the graphitic carbon particle 702, the amount of ions that can be held on the surface of the carbon particles may be greatly decreased, minimizing the amount of undesired ions extracted from the membrane.

Figure 8:
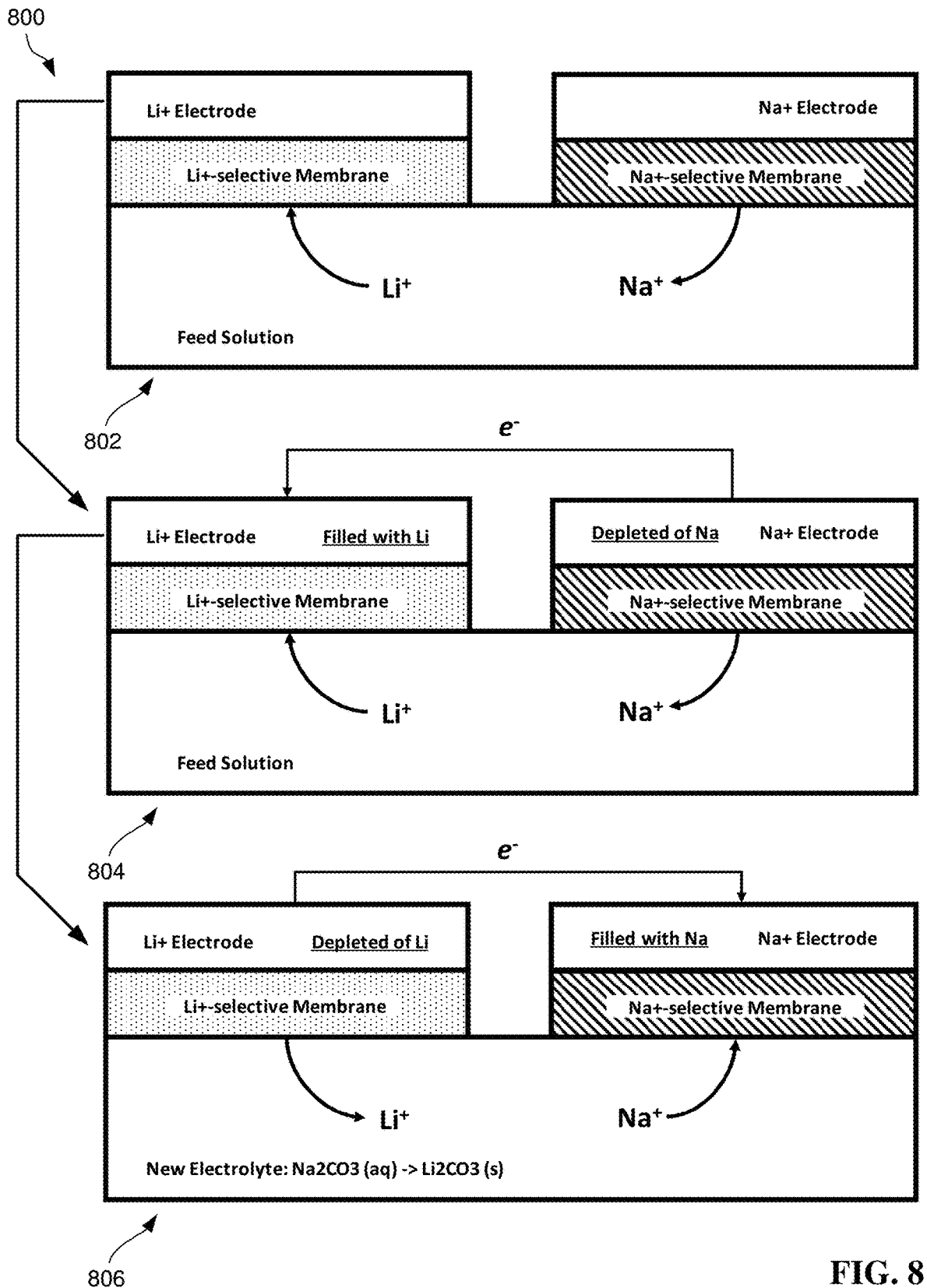
FIG. 8 illustrates a process for recovering energy from lithium extraction, in accordance with one embodiment.

FIG. 8 illustrates a process 800 for recovering energy from lithium extraction, in accordance with one embodiment. As an option, the process 800 may be implemented in the context of any one or more of the embodiments set forth in any previous and/or subsequent figure(s) and/or description thereof. Of course, however, the process 800 may be implemented in the context of any desired environment. Further, the aforementioned definitions may equally apply to the description below.

As shown, step 802 shows lithium present in a feed solution. Two membranes may be interfaced with the feed solution, a first membrane as a lithium selective membrane (consistent with use of the solid electrolyte 102 embedded in the matrix 104 disclosed herein), and a second membrane as a sodium selective membrane. In one embodiment, the sodium selective membrane may use a solid electrolyte embedded in a matrix (similar to the first membrane), but tuned to the particular ion (such as sodium). The first membrane may interface with an electrode, and the second membrane may interface with a second electrode (in other words, a separate electrode for each of the lithium ions and the sodium ions). It is to be appreciated that although lithium and sodium are used in the context of the process 800, the solid electrolyte may be tuned for separation of any particular ion, as disclosed hereinabove. Further, although sodium is shown, any ion which is less reducing than lithium (or the ion to be extracted) may be used.

At step 804, a voltage is applied to the process 800 which, in turn, may cause the lithium ions to transfer from the feed solution to the lithium electrode via the lithium selective membrane. As lithium is removed from the feed solution, sodium ions may be depleted from the sodium electrode (and transfer to the feed solution). Once the lithium ions are stored in the lithium electrode, the energy inputted (to cause the lithium ions to transfer to the lithium electrode) may be stored in the form of electrochemical energy.

At step 806, the feed solution may be changed to a new electrolyte (to such as Na2CO3), and lithium ions stored at the lithium electrode may transfer back to the new electrolyte (which in turn may then form Li2CO3). Sodium ions that were in the new electrolyte may transfer from the new electrolyte to the sodium electrode (via the sodium selective membrane).

The electrochemical energy (stored via the lithium ions on the lithium electrode) may be released with the transfer of the lithium ions from the lithium electrode to the new feed solution (the new electrolyte). In one embodiment, the energy released through the transfer may be stored via any conventional system (such as an external battery, etc.). Such released energy may then be used to drive the process 800 again to extract the ions, which after extraction, the energy may be reclaimed (to drive future extraction of lithium ions). In this manner, once the process 800 is initially established (such that the initial extraction is achieved), energy may be reclaimed, and in turn, used to drive future extraction/separation.

By way of greater detail, the energy required for extraction of lithium from the feed solution into the lithium electrode and for expulsion of lithium from the lithium electrode to the new electrolyte (the final solution) may be dependent on the current density, where a higher current density corresponds with a higher energy need to overcome energy dissipation through ohmic resistance, and the difference in reduction potentials of the electrodes used for the two electrodes (shown as the lithium electrode and the sodium electrode). If the active material for the lithium electrode has a lower reduction potential than the active material for the opposite electrode (shown as the sodium electrode), an input of energy may be required to extract lithium ions from the feed solution (corresponding to the expulsion of the second ion from the opposite electrode, again, shown as the sodium ion from the sodium electrode), which can be recovered when subsequently expelling the lithium from the lithium electrode to the new electrolyte, which may correspond with the extraction of the second ion (shown as sodium) from the new electrolyte to the sodium electrode. If the active material for the lithium electrode has a higher reduction potential than the active material for the opposite electrode (shown as sodium electrode), an input of energy may be required to expel lithium ions from the feed solution (corresponding to the expulsion of the second ion from the opposite electrode), which can be recovered when subsequently extracting lithium from the lithium electrode.

Figure 9:
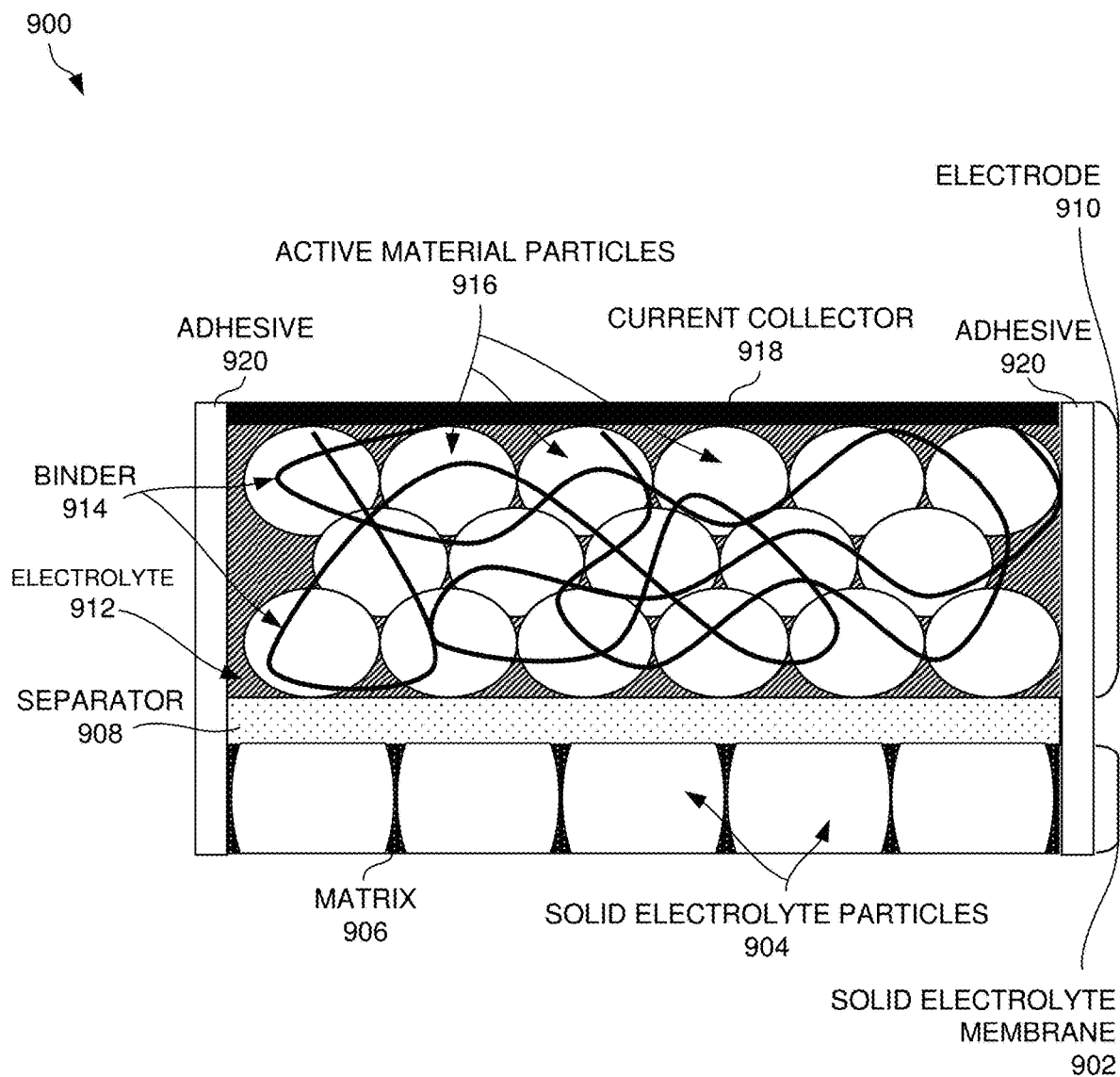
FIG. 9 illustrates a cell architecture, in accordance with one embodiment.

FIG. 9 illustrates a cell architecture 900, in accordance with one embodiment. As an option, the cell architecture 900 may be implemented in the context of any one or more of the embodiments set forth in any previous and/or subsequent figure(s) and/or description thereof. Of course, however, the cell architecture 900 may be implemented in the context of any desired environment. Further, the aforementioned definitions may equally apply to the description below.

As shown, the cell architecture 900 may include a solid electrolyte membrane 902, which in turn, may comprise solid electrolyte particles 904 embedded in a matrix 906. The solid electrolyte membrane 902 may be separated from the electrode 910 via the separator 908. The electrode 910 may comprise an electrolyte 912, a binder(s) 914, active material particles 916, and a current collector 918. An adhesive 920 may line the entirety (on both sides) of the solid electrolyte membrane 902, the separator 908, and the electrode 910.

With respect to the electrode 910, the current collector 918 may serve as an electronically conductive substrate for transferring electricity on which the active material coating is bound on. Additionally, the current collector may be one of the following (but not limited thereto): copper, aluminum, stainless steel, nickel, titanium, graphene.

The active material particles 916 may be the location where alkali metal ions and electrochemical energy are stored. Additionally, the active material particles 916 may serve as a host for the extracted lithium ions and store the energy input for extraction in the form of electrochemical energy.

In various embodiments, suitable electrode materials for a lithium electrode may include, but not be limited to, carbon-based materials (graphite, carbon nanotubes (CNT), graphene, carbon nano onions (CNO), hard carbons), lithium intercalation materials such as lithium titanium oxide (LTO), lithium manganese oxide (LMO), lithium iron phosphate (LFP), lithium manganese phosphate, lithium cobalt phosphate, lithium cobalt oxide (LCO), lithium nickel oxide, lithium nickel manganese cobalt oxide (NMC), lithium nickel cobalt aluminum oxide (NCA), lithium titanium sulfide, lithium vanadium phosphate (LVP), lithium iron sulfate fluoride (LFPF), lithium conversion materials such as halides of the form MXx, where M can be Fe, Co, Ni, Bi, Cu, Ag, and X can be F, Cl, Br, or I, lithium chalcogenides such as S, Se, Te, metals and metalloids that alloy with lithium such as Si, Sn, Ge, Ga, Mg, Al, Zn, In, Au, Ag, Pt, other nonmetals in the group of iodine or oxygen, or lithium metal.

With respect to a sodium electrode (or a less reducing element compared to the ion to be extracted), it may be composed of an active material which may serve as a host for the sodium ion (or whatever ion is selected). In the case of Na+ or K+, the active material may be composed of Fe4[Fe(CN)6]3 (Prussian blue), Prussian blue analogues of the form M1x[M2y(CN)6]3, where M1 and M2 is a metal in the group of Fe, Ni, Cu, Mn, Co, Ti, Cr, Zn, carbon-based materials (graphite, carbon nanotubes (CNT), graphene, carbon nano onions (CNO), hard carbons). In the case of Na+, the active materials may also include materials alloying with sodium such as P, K, or sodium metal. In the case of K+, the active materials may also include materials alloying with potassium such as Na, or potassium metal.

In one embodiment, the active material particles 916 may also store ions via capacitive/pseudocapacitive mechanisms, such as graphene, carbon nanotubes (CNT), carbon nano onions (CNO), Mxenes, metal oxides, such as ZnO, TiO2, TiO2, RuO2, Co3O4, MnO2, NiO, NiCo2O4, Fe3O4, Fe2O3, and V2O5.

The binder 914 may adhere the active material particles 916 to the current collector 918 while providing cohesion among active material particles and other additives. The binder 914 may include one or more of the following (but not be limited thereto): poly(vinylidene fluoride) (PVDF), carboxymethylcellulose (CMC), styrene-butadiene rubber (SBR).

The electrolyte 912 may serve as a medium for transporting alkali metal ions to and from the active material (including the active material particles 916) and solid electrolyte membrane 902. The electrolyte may contain one or more salts dissolved in a solvent system of one or more components. The salt may contain one or more of any of the following cations: H+, Li+, Na+, K+, Cs+; and one or more of any of the following anions: Cl−, Br−, I−, NO3−, SO42−, PO43−, PF6−, TFSI−, FSI−, OTf−, ClO4−. The solvent may be one or more of the following: Water, dimethoxyethane (DME), dioxolane (DOL), tetrahydrofuran (THF), dimethyl carbonate (DMC), propylene carbonate (PC), ethylene carbonate (EC), ethyl methyl carbonate (EMC).

Still yet, the separator 908 may optionally serve as a reservoir for the electrolyte 912 and as an electronically insulating barrier between the active material (such as the active material particles 916) and the solid electrolyte membrane 902.

The adhesive 920 may surround the edges of the electrode 910, and may serve as an impermeable barrier between the inside and outside of the electrode 910. The adhesive may be composed of (but not be limited thereto) epoxy, polyurethanes, polyimides, cyanoacrylates, or acrylic adhesives cured via thermal or UV curing.

Still yet, a second electrolyte (including liquid) may be used in the electrode 910. The edges of the electrode 910 may be protected (edge sealant, glue sealant, etc.) to prevent a feed solution from reaching the active material (such as the active material particles 916) through these exposed areas.

Figure 10:
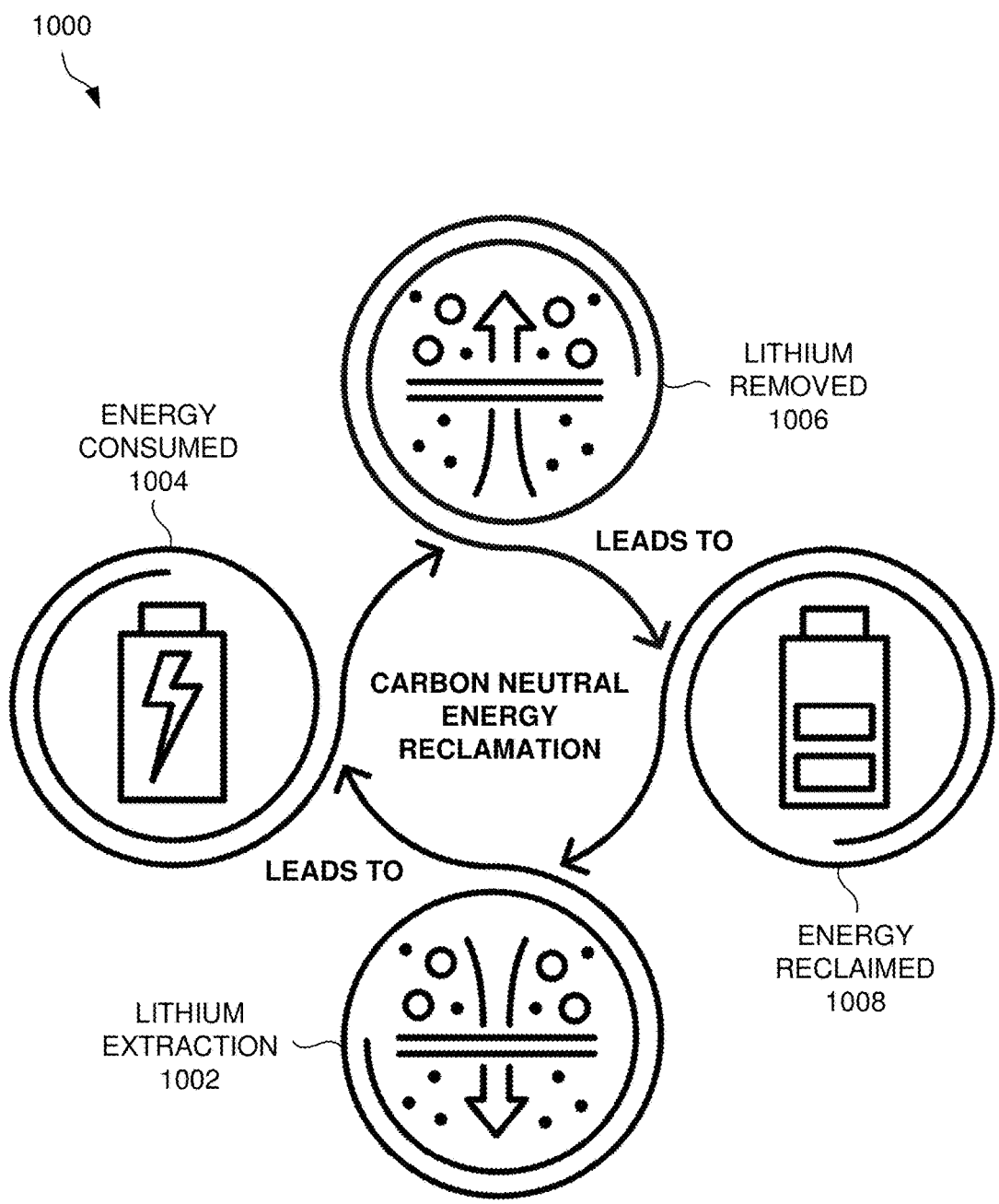
FIG. 10 illustrates a system and method for a carbon-neutral energy reclamation battery recycling, in accordance with one embodiment.

FIG. 10 illustrates a system and method 1000 for a carbon-neutral energy reclamation battery recycling, in accordance with one embodiment. As an option, the system and method 1000 may be implemented in the context of any one or more of the embodiments set forth in any previous and/or subsequent figure(s) and/or description thereof. Of course, however, the system and method 1000 may be implemented in the context of any desired environment. Further, the aforementioned definitions may equally apply to the description below.

FIG. 10 is being presented to illustrate a virtuous cycle that encompasses sustainability of both lithium extraction as well as sustainability of energy reclamation. For example, lithium has become ubiquitous in nearly all electric or electronic products, from batteries to armor plating, from to bicycle frames to glass, from lubricants to ceramics and more. Conventional systems and methods for obtaining lithium extract the lithium from raw materials such as from rocks and/or from mineral springs. It is well known that the global demand for lithium will deplete all known commercially viable sources of such raw materials. It therefore becomes imperative to recycle lithium. One source of lithium that is a candidate for recycling is from used lithium-containing batteries. However, to be sustainable, the techniques for lithium extraction must be highly energy efficient and scalable.

The present description relates not only to extraction methods for lithium, but additionally to how to recover energy spent to extract the lithium. In use, extracting lithium ions from a feed solution using a membrane having a solid electrolyte may cause a voltage drop. The extracted lithium ions may be stored on an electrode. When needed, the lithium ions can then be transferred from the electrode, which in turn, may cause a discharge of the energy stored. In this manner, the extraction, storage, and discharge steps correspond with a typical anode and cathode assembly, and the typical charging/discharging of energy based on the flow of ions.

Additionally, reclamation techniques disclosed herein are scalable so as to be able to meet the forecasted worldwide EV battery recycling demands through this decade and into the decades to follow. To illustrate the needed scale, it is estimated that 10TWh of EV battery capacity will be demanded between now and the beginning of 2030, with over 1TWh being demanded in calendar year 2025 alone. This demand, in turn, may require around 125,000 tons (or more) of lithium for EV batteries each year. It is acknowledged that a substantial high percentage of this lithium tonnage can be reclaimed from spent batteries.

In view of this large scale, a primary challenge is reclamation efficiency. The techniques disclosed herein meet this challenge by implementing energy recycling, resulting in an extremely low demand for energy needed to accomplish the lithium reclamation. For example, for a single factory that reclaims 1500 tons of lithium per year, using the energy reclamation techniques disclosed herein, a continuous power demand of only 44KW may be required (a number that is small enough to be provided by banks of solar panels that fit on the roof-space of an EV battery factory). As such, the disclosure herein not only provides for more efficient separation of lithium from feed solution, but additionally provides for significant energy reclamation associated with the lithium extraction.

As such, based on the ability to recover energy spent (to extract) through the discharging of ions may allow for a near carbon-neutral system for ultra-efficient electric battery recycling. As demand for lithium continues to increase, the need to recycle and recover lithium sustainably from pre-existing lithium-containing items will likewise increase. Additionally, with the push for more green energy, the present description provides for recovery of a substantial fraction of energy spent for extracting lithium ions, which in turn results in an environmentally prudent and responsible alternative to known methods and systems.

Additionally, known separation membranes often will crack and fail as time goes on, resulting in both time inefficiencies and fiscal losses (in having to replace the electrolyte). Further, other membranes (e.g., adsorption membranes, etc.) may have membrane fouling, which in turn, may decrease the efficiency and lifetime of the membrane. The membrane disclosed herein, in contrast, is bound in a stable matrix that does not suffer from (or have much less of) membrane fouling or membrane cracking (e.g., as a consequence of volume expansion during extraction, etc.), which in turn, increases longevity of the electrolyte and the membrane, thereby overcoming said inefficiencies and losses.

As shown, the system and method 100 includes extracting lithium (step 1002). The extraction of lithium may occur using a solid electrolyte membrane (such as the solid electrolyte membrane 100, detailed herein). In extracting the lithium, energy may be consumed (step 1004).

In one embodiment, a voltage drop (such as the voltage drop 608 due to transporting of lithium ions) may be due to ohmic resistance (V=IR). Since I (or desired current I) is generally dictated by a desired extraction rate of Li, an extractor may be configured to minimize R in order to result in the lowest voltage drop V (corresponding to, for example, unreclaimable electricity). Since resistance is proportional to the membrane thickness and inversely proportional to conductivity, the system may be constructed to use charge-conducting components (e.g., such as the Li+ extraction membrane) with minimal thickness and maximum conductivity.

The lithium ions that are extracted are stored on an electrode. When the energy is needed, a second electrolyte may be used to facilitate the removal and transfer of lithium ions from the electrode (step 1006). In removing and transferring the lithium ions from the electrode, energy may be reclaimed (step 1008).

In operation, therefore, lithium may be extracted from a feed solution using a first membrane, stored on an electrode, and then transferred out using an electrolyte solution. The energy required to extract the lithium ions from the feed solution may be recovered when the lithium ions are transferred from the electrode. Once the lithium ions are transferred out (to the electrolyte solution), the lithium ions may be in the form of lithium carbonate (or an equivalent thereof). In operation, as the lithium is extracted (per step 1002), it may be removed from the feed solution and stored on the electrode. As lithium ions are transported from the feed solution, they may be, in turn, replaced with other ions (such as sodium) which may be transported from a second electrode, through a second membrane and into the feed solution. At a later time, the feed solution may be removed and replaced with an electrolyte solution. For example, in various embodiments, the membrane may be physically removed from the feed solution (like a sponge is removed from a bath), or the membrane may be immersed in a tank containing the electrolyte solution (where the electrolyte solutions can be pumped in/out to change the electrolyte solution. In another embodiment, the extracted lithium may be put into a new solution without needing to replace the original feed solution.

The lithium ions stored on the electrode may then be transported from the electrode to the electrolyte solution. This removal of lithium ions (and transporting of them via the membrane) may cause an energy release which may be reclaimed (via an external battery, for example). In other words, the energy stored in the form of electrochemical energy of the extracted lithium may be reclaimed upon removal of the lithium. As lithium ions move from the electrode to the electrolyte solution, another ion (such as sodium) present in the electrolyte solution may transfer (via the second membrane) to the second electrode. In this manner, as lithium is transported to the electrode, energy may be consumed, and as lithium is transferred from the electrode, energy may be released. This release of energy may, in turn, be used to provide most of the input energy needed for the lithium extraction (via the lithium extraction step 1002 and the energy consumed step 1004).

As such, therefore, the operation of extracting the lithium ions, storing, and then discharging mimics energy charge and discharge cycles of a battery, which in turn, may provide high energy efficiency (due to the recovery of energy inputted).

With respect to the feed solution, previously used and spent batteries may be added to the aqueous solution, and may be the basis from which the lithium ions may be extracted. If it were desired to have greater selectivity (for example of lithium ions), the first membrane (used to extract the lithium ions) may be thickened. To clarify, a thicker membrane may have lower permeation (rate of diffusion through) of water by virtue of a longer distance that the water may need to travel through. As such, a thicker membrane may have a higher selectivity for Li+ uptake via electrodialysis over water uptake via diffusion. Additionally, in one embodiment, the greater the thickness, the greater the voltage drop as well. In other words, the voltage drop may scale linearly with thickness, since resistance scales linearly with thickness.

For example, the first membrane may be tuned to the ion that is to pass through it. In this manner, the membrane may be tuned such that a larger ion, for example, may pass through a first membrane layer, and a smaller ion, for example, may pass through a second membrane layer. For example, a solid electrolyte material may be selected whose crystal structures have inherent selectivity for the desired ion. The ease at which a specific ion may pass through the solid electrolyte material may depend on the amount of energy it takes for ions to "hop" through different sites of the crystal lattice. Ions that are too large or too small will require more energy to hop from site to site. As such, for any given solid electrolyte structure, an "optimal" ion size with the lowest activation energy (and therefore the highest ionic conductivity and selectivity over other ions) may be tuned to the particular solid electrolyte structure. In this manner, a structure of the crystal lattice (of the solid electrolyte) may be tuned for a specific ion (where if the activation energy is too high, it simply will not pass through the membrane, or it will pass through in small or insignificant quantities.

Figure 11:
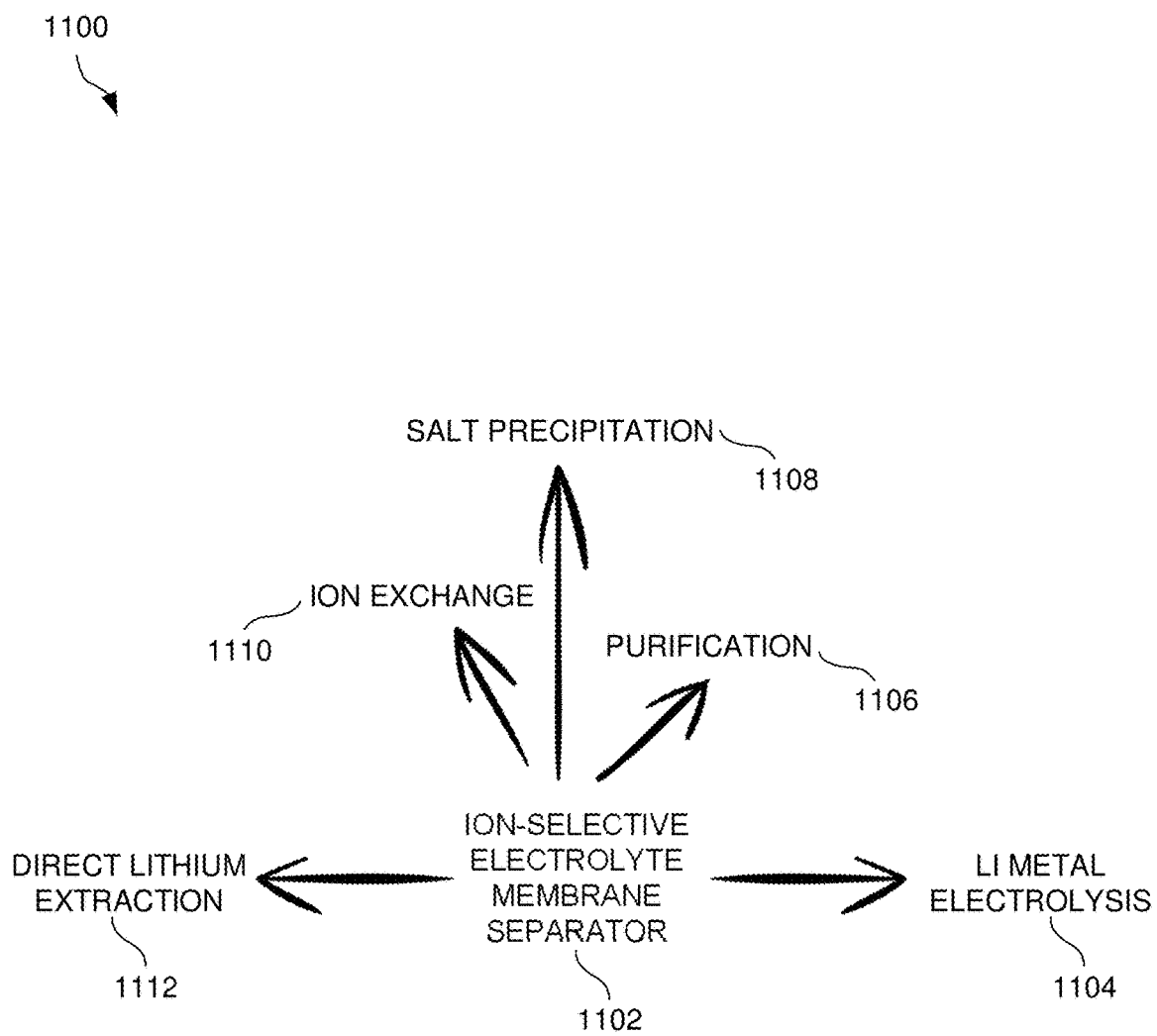
FIG. 11 Illustrates various processes where an ion-selective electrolyte membrane separator may be incorporated, in accordance with one embodiment.

FIG. 11 illustrates various processes 1100 where an ion-selective electrolyte membrane separator may be incorporated, in accordance with one embodiment. As an option, the various processes 1100 may be implemented in the context of any one or more of the embodiments set forth in any previous and/or subsequent figure(s) and/or description thereof. Of course, however, the various processes 1100 may be implemented in the context of any desired environment. Further, the aforementioned definitions may equally apply to the description below.

In one embodiment, the ion-selective electrolyte membrane separator 1102 may comprise multiple layers of membrane to help further facilitate various ion-oriented processes including, but not limited to purification 1106, salt precipitation 1108, ion exchange 1110, direct lithium extraction 1112, and/or electrolysis 1104.

The ion-selective electrolyte membrane separator 1102 may be applied consistent with the discussion relating to any of the prior (or subsequent) Figures. As shown at a high level, the application of the ion-selective electrolyte membrane separator 1102 may apply to many processes and industries. In particular, such an application may apply to critical mineral industry which may have need of the purification 1106, the salt precipitation 1108, the ion exchange 1110, the direct lithium extraction 1112, and/or the electrolysis 1104. It is to be understood that although much discussion within the present description focuses on lithium, the application of the ion-selective electrolyte membrane separator 1102 may apply equally to any critical mineral.

In one embodiment, existing direct lithium extraction (DLE) battery technology may be used to develop a DLE cell that electrochemically extracts lithium from various brines using an ion-selective solid electrolyte membrane disclosed herein. In operation, DLE cells in combination with the ion-selective solid electrolyte membrane 1102 may be used to convert untapped deposits including, but not limited to, recycled materials, lithium-based alloys, and/or solutions containing atoms such as lithium hydroxide into high-volume sources of lithium. As a result, the resulting lithium may then support production of greater volumes of EV batteries.

In one embodiment, a composition, density, and/or structure of complex brines and the ion-selective electrolyte membrane may be mapped via high-fidelity synchrotron X-ray based imaging, diffraction, and/or spectroscopy.

In one embodiment, electrolyte membrane-assisted direct lithium extraction 1112 may include applications upon lithium battery cell materials, membranes, and/or cell design, which may result in optimized systems capable of pilot-scale (≥1,000 T/year pure lithium basis) extraction of lithium from geothermal brines. Additionally, such electrolyte membrane-assisted direct lithium extraction 1112 practices may be designed to assist accompanying economic and environmental analyses.

In one embodiment, sodium (Na) super ionic conductor (NASICON)-type ceramic electrolytes such as lithium aluminum titanium phosphate (LATP) and lithium aluminum germanium phosphate (LAGP), which have previously been demonstrated to be stable in water and known to have high charge-transport selectivity for lithium ions (Li+) over common ions such as sodium (Na+) and magnesium ($Mg^{2+}$), may be embedded in an impermeable matrix wherein Li+ is selectively removed from a solution under the influence of an electric potential across the membrane. In addition, the ion-selective electrolyte membrane separator 1102 may be incorporated into a cell design consisting of two electrodes immersed in separate electrolytes, wherein one cell is configured to reversibly store Li+ and the other cell is configured to reversibly store Na+. Such a construction may provide a low-cost, environmentally-benign-waste product. Additionally, each electrolyte may contain a pair of ferricyanide ($Fe(CN)_6]^{3-/4-}$) electroactive solutes and the alkali metal ion that it may be configured to store. Further, in one implementation, the electrochemical cell design may result from the layering of individual electrode modules assembled into a lithium extractor.

In another embodiment, the electrochemical cell (such as for direct lithium extraction 1112) may be configured to extract Li+ from geothermal brine and produce a solid lithium salt product, lithium carbonate ($Li_2CO_3$), via a two-step process. It is noted that other resulting products may be provided as desired (based on the electrolyte solution, the precursor, the configuration of the membrane, etc.). In operation, one step may comprise a process for Li+ extraction in which all Na+ electrode modules may be loaded with Na+ at maximum capacity and Li+ modules may be loaded at minimum capacity. Additionally, under steady-state operation, brine may be pumped through the Li extractor and a charge may be transferred from ferrocyanide ($Fe(CN)_6]^{4-}$) within Na+ electrodes to ferricyanide in Li+ electrodes. Correspondingly, Li+ from the brine may be selectively transported into Li+ modules, and Na+ transported from Na+ modules into the brine as waste. In further operation, a second step may comprise a process for Li+ reclamation in which an aqueous solution of sodium carbonate ($Na_2CO_3$) and saturated lithium carbonate may be pumped from a silo into the extractor where it may completely replace the brine. In addition, under batch operation, charge may be transferred from the Li+ modules to the Na+ modules. Correspondingly, Li+ may be transported from the Li+ modules into the carbonate salt solution, and Na+ may be selectively transported into the Na+ modules, resulting in the precipitation (such as the salt precipitation 1108) of solid lithium carbonate that may be collected (such as in a decanter) at the bottom of the Li extractor and reconstitution of the lithium extractor into its initial state.

Current, electrochemical DLE methods historically require fragile active material electrode coatings to directly contact brine, produce toxic byproducts, or utilize non-scalable fabrication processes, limiting their viability. In contrast, the direct lithium extraction 1112 (which in particular uses the ion-selective electrolyte membrane separator 1102) may not require any active material electrode coatings, such as those used in lithium-ion batteries, which may significantly reduce cost and circumvent issues of stability in brines pumped through DLEs. In addition, other advantages may include environmentally responsible measures that may produce Na+ as waste product and may use no acid reagents, scalable ion-selective membranes which may be produced via roll-to-roll coating and polishing, robust designs featuring durable membranes which may protect vulnerable components from geothermal brine, highly selective lithium ion membrane technology which may be based on size and charge fitting of ion in solid electrolyte, adequate performance based on low-cost materials including, but not limited to, lithium, aluminum, titanium, sodium, silicon, zirconium, and iron, and/or a capacity to operate at low Li+ concentrations, which may potentially include seawater, thus diversifying Li+ resources.

In one embodiment, a Li+-selective membrane with bulk ionic resistance of 1,000Ω per cm2 may be produced for membranes of sub-mm thickness based on reported conductivity values of NASICON-type conductors. It should be noted that Na+ conductors may have less resistance than Li+ analogues and may thereby be assumed to be inconsequential. Further, at an operating potential of 0.4 V (within the 1.23 V electrochemical stability window for $H_2O$) and 10 hours of Li+ extraction per day, 4 mAh worth of Li (1 gram Li=3,860 mAh) may be extracted per cm2 of membrane per day. As a result, a 1,000 T pure Li/year target may thus meet with approximately 300,000 m2 of each membrane.

The ion-selective electrolyte membrane separator 1102 may, in like manner, be used for the ion exchange 1110, the salt precipitation 1108, the purification 1106, and/or the lithium metal electrolysis 1104, all of which are detailed hereinbelow. As such, the technology disclosed herein relate to critical mineral extraction, purification, exchange, etc. may be viable for long-term DLE from feed solutions (such as geothermal brine).

Figure 12:
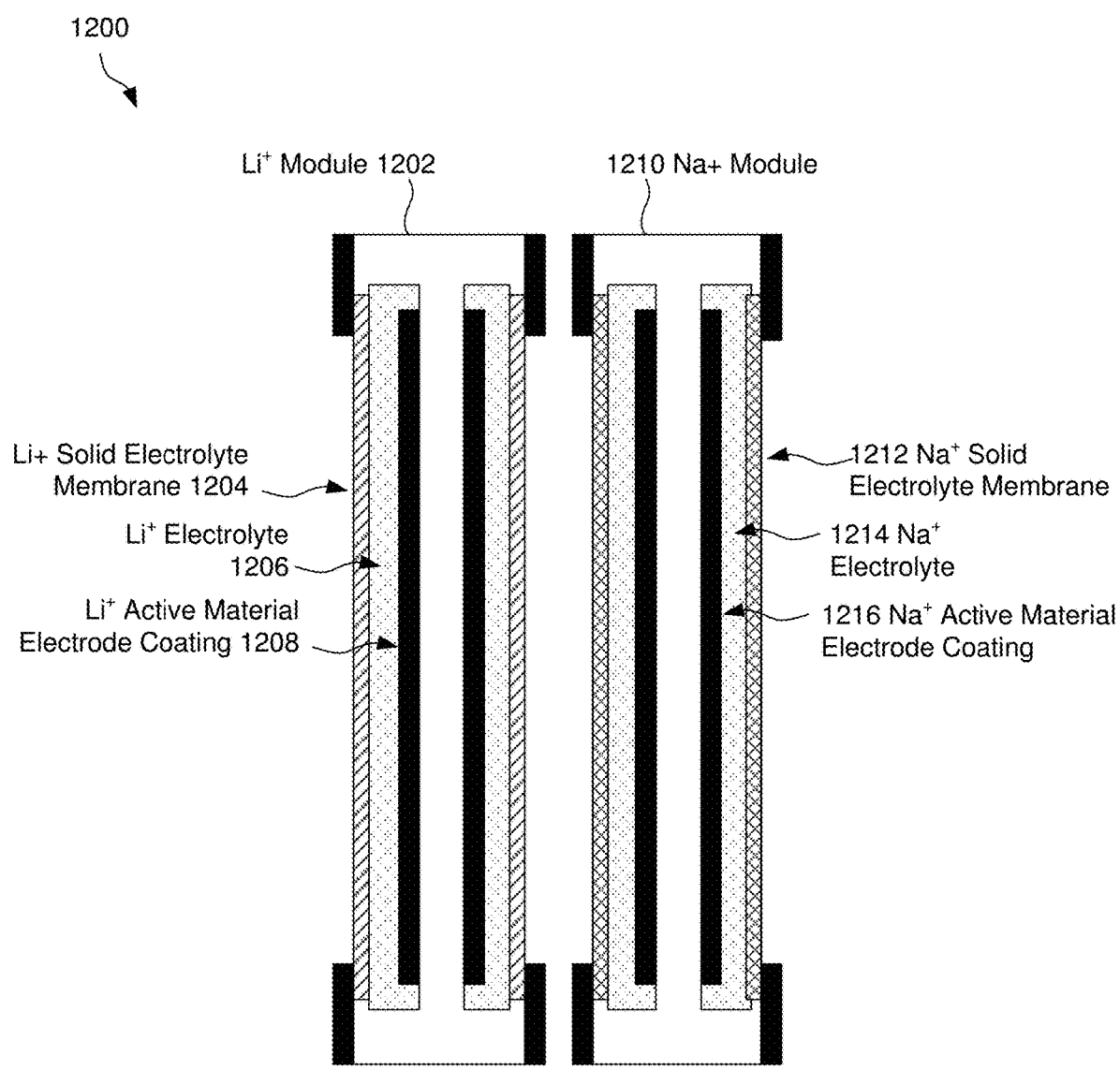
FIG. 12 illustrates electrode modules, in accordance with one embodiment.

FIG. 12 illustrates electrode modules 1200, in accordance with one embodiment. As an option, the electrode modules 1200 may be implemented in the context of any one or more of the embodiments set forth in any previous and/or subsequent figure(s) and/or description thereof. Of course, however, the electrode modules 1200 may be implemented in the context of any desired environment. Further, the aforementioned definitions may equally apply to the description below.

As shown, the electrode modules 1200 may include a lithium module 1202 (functioning as an anode) comprising a $Li^+$ solid electrolyte membrane 1204, a $Li^+$ electrolyte 1206, and $Li^+$ active material electrode coating 1208. In like manner, the electrode modules 1200 may include a sodium module 1210 (functioning as a cathode) comprising a $Na^+$ solid electrolyte membrane 1212, a $Na^+$ electrolyte 1214, and a $Na^+$ active material electrode coating 1216. It is to be appreciated that, in order to function as a redox system, both an anode and a cathode would be needed. For simplicity, the redox electrode module is presented in a singular form (a single module electrode) to describe the elements of the module that are consistent for either and/or both of the anode module and the cathode module.

The $Li^+$ solid electrolyte membrane 1204 may interface with a feed solution. Additionally, in one embodiment, the $Li^+$ electrolyte 1206 may function as an anolyte, and the $Na^+$ electrolyte 1214 may function as a catholyte. Taking a step back, FIG. 12 may depict an electrode module design that uses active material coatings (such as those found in lithium-ion and sodium-ion batteries). Further, FIG. 13 (shown and described hereinbelow) is a variation of FIG. 12 that uses "redox flow" active materials (including electroactive solutes). In addition, a redox flow electrolyte may comprise one or more electroactive solutes. In one embodiment, each electroactive solute may be characterized by its ability to adopt multiple oxidation states whose relative concentrations within the electrolyte may be manipulated through the addition or removal of charge (electrons) from the electrolyte. Further, the redox flow electrolyte may include one or more dissolved alkali metal cations. Further, the redox flow electrolyte may include one or more dissolved anions to balance the charge of cations in the solution. The current collector may be in direct contact with the redox flow electrolyte.

In operation, the lithium electrode module 1200 may be used to separate lithium from a feed solution (via the $Li^+$ solid electrolyte membrane 1204). Additional details relating to the separation of lithium via the solid electrolyte membrane 1204 may be found in relation to the disclosure of FIG. 1-FIG. 6 hereinabove. In practice, the solid electrolyte membrane may interface directly with the redox flow electrolyte, on one side, and a feed solution on the other side. The feed solution may comprise ions which may be effectively separated from the feed solution via the solid electrolyte membrane. The solid electrolyte membrane may be tuned to selectively separate desired ions from the feed solution. In other words, the solid electrolyte membrane may be configured to allow selective passage of a specific alkali metal cation.

Figure 13:
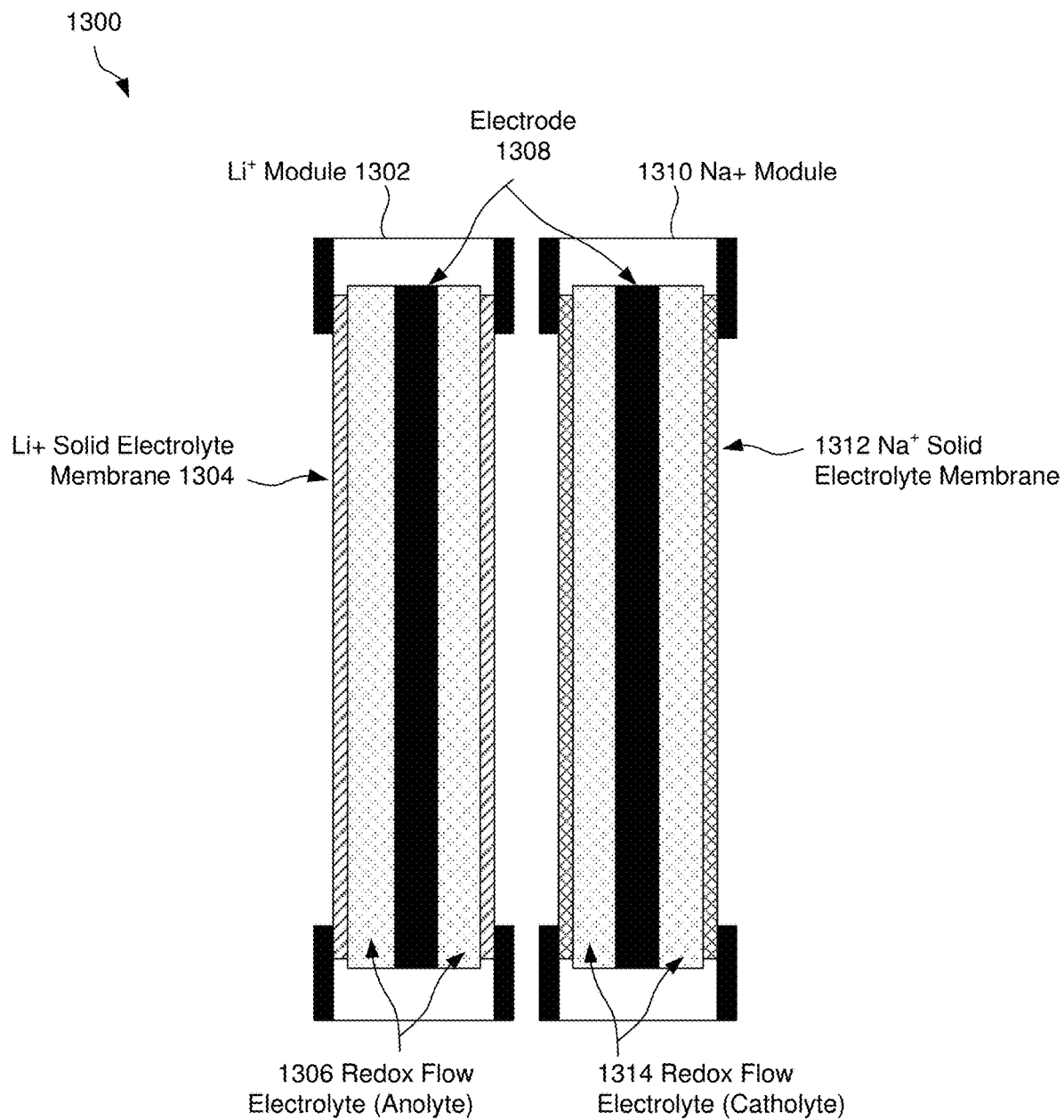
FIG. 13 illustrates redox electrode modules, in accordance with one embodiment.

In operation, the ion module may be configured as an anode electrode module or a cathode electrode module. Once again, it is emphasized that the redox electrode module is shown in singularity (with a single module). FIG. 13 discussed hereinbelow displays redox electrode modules 1300 including both an anode electrode module and a cathode electrode module.

Further, the electrode modules 1200 may be used to reclaim energy used during the separation process. For example, as lithium is extracted, it may be stored in the form of electrochemical energy which may be subsequently released.

FIG. 13 illustrates redox electrode modules 1300, in accordance with one embodiment. As an option, the redox electrode modules 1300 may be implemented in the context of any one or more of the embodiments set forth in any previous and/or subsequent figure(s) and/or description thereof. Of course, however, the redox electrode modules 1300 may be implemented in the context of any desired environment. Further, the aforementioned definitions may equally apply to the description below.

As shown the redox electrode modules 1300 includes the lithium ($Li^+$) module 1302, the $Li^+$ solid electrolyte membrane 1304, the redox flow electrolyte 1306, the electrode 1308, the sodium ($Na^+$) module 1310, the $Na^+$ solid electrolyte membrane 1312, and a redox flow electrolyte 1314. The lithium module 1302 may function as an electrode for an anode, and the sodium module 1310 may function as an electrode for a cathode. In like manner, the redox flow electrolyte 1306 may function as an anolyte and the redox flow electrolyte 1314 may function as a catholyte. In one embodiment, the redox flow electrolyte 1306 and the redox flow electrolyte 1314 may contain electractive solutes that function as an active material.

In practice, the redox electrode modules 1300 may be used for the separation of ions (such as lithium) from a feed solution via the use of the $Li^+$ solid electrolyte membrane 1304 and the $Na^+$ solid electrolyte 1312 (each of which may be ion-selective), and redox flow electrodes (such as the lithium module 1302 and the sodium module 1310). Such an invention can be used for the selective extraction of Li+ from a suitable feed source. For example, the suitable feed solution may include lithium (or other ions, etc.) brines, seawater, and/or a solution prepared from recycled battery waste. In one embodiment, the lithium solid electrolyte membrane 1304 and/or the sodium solid electrolyte membrane 1312 may be constructed in a manner consistent, e.g., with FIG. 1-FIG. 6.

In one embodiment, the feed solution may be a first solution and may include a target alkali metal ion (or $H^+$) that is desired to be selectively removed from the rest of the solution. Additionally, a second solution, where a target alkali metal ion (or $H^+$) may be removed from the first solution may be discharged to the second solution during the separation process.

The second solution may contain a dissolved alkali metal ion (or $H^+$) that may be discharged into the feed solution (the first solution) as a waste product during the process. In one embodiment, the anion within the second solution may be selected as desired. The second solution may also include one or more other dissolved salts as desired. When applied as an extraction system for $Li^+$, the second solution may contain $Na^+$ ions in the form of dissolved $Na_2CO_3$, where the $Na^+$ cations may be used as the eventual waste product discharged into the feed solution, while the carbonate anions ($CO_3^{2-}$) may serve as the anion that combines with the extracted $Li^+$ ions to form $Li_2CO_3$. In one embodiment, the second solution may include saturated $Li_2CO_3$ as a second dissolved species to facilitate the removal of the extracted $Li^+$ ions in the form of $Li_2CO_3$ via precipitation.

In one embodiment, the two electrode modules (including the lithium module 1302 and the sodium module 1310) may include an "anode" electrode module and another as a "cathode" electrode module. Each of the lithium module 1302 and the sodium module 1310 may include an electrolyte solution. In the context of the present description, the electrolyte for the "anode" electrode module may be referred to as the "anolyte" (such as the redox flow electrolyte 1306), and the electrolyte for the "cathode" electrode module may be referred to as the "catholyte" (such as the redox flow electrolyte 1314). Each of the redox flow electrolyte 1306 and the redox flow electrolyte 1314 may include one or more electroactive solutes. In one embodiment, each electroactive solute may be characterized by its ability to adopt multiple oxidation states whose relative concentrations within the electrolyte may be manipulated through the addition or removal of charge (electrons) from the electrolyte. For example, the electroactive solute may include, but not be limited to: ferricyanide/ferrocyanide ($[Fe(CN)_6]^{3-}$/$[Fe(CN)_6]^{4-}$), pervanadyl/vanadyl ($VO_2^+/VO^{2+}$), phosphotungstic acid and its various redox states ($[PW_{12}O_{40}]^{3-}$/$[P_2W_{21}O_{71}]^{6-}$/$[PW_{11}O_{39}]^{7-}$, etc.), phosphomolybdic acid and its various redox states, and/or silicotungstic acid and its various redox states. In one embodiment, the same electroactive solutes or set of electroactive solutes may be used for both the anolyte and catholyte.

Additionally, each of the redox flow electrolyte 1306 and the redox flow electrolyte 1314 may include one or more dissolved alkali metal cations. In one embodiment, each electrolyte may contain one type of alkali metal cation (or $H^+$), depending on the ion that the system is configured to extract and/or expel as a waste product in the process. Further, each of the redox flow electrolyte 1306 and the redox flow electrolyte 1314 may include one or more dissolved anions to balance the charge of cations in the solution. In one embodiment, the electroactive solute(s) may serve as the dissolved anions if the dissolved anions are anionic. Still yet, each of the redox flow electrolyte 1306 and the redox flow electrolyte 1314 may include a solvent including but not limited to water, an alcohol, a carbonate, and/or an ether-based solvent.

As shown, the electrode 1308 may be in direct contact with the electrolyte solution (such as the redox flow electrolyte 1306 and the redox flow electrolyte 1314). The electrode 1308 may be electronically conductive (such as a metal or carbon-based material). The electrode 1308 may also be porous or non-porous. In one embodiment, a non-porous current collection may be selected in order to increase the surface area of contact between the electrode 1308 and either or both of the redox flow electrolyte 1306 and/or the redox flow electrolyte 1314. Further, the electrode 1308 may be constructed of, but not limited to aluminum, nickel, copper, titanium, stainless steel, graphite felt, and/or carbon fiber. The electrode 1308 may also be a carbon-based material coated onto the surface of a metallic substrate. Still yet, the electrode 1308 may include meshed aluminum (or any desired material in meshed structure).

In one embodiment, an ion-selective solid electrolyte membrane (such as the lithium solid electrolyte membrane 1304 and/or the sodium solid electrolyte membrane 1312) may be configured to allow selective passage of a specific alkali metal cation (or $H^+$). The positioning of the ion-selective solid electrolyte membrane may be chosen such that it separates the feed solution (first solution) and a second solution from contacting the redox flow electrolyte 1306 and/or the redox flow electrolyte 1314, the electrode 1308, and/or any other electronically-conductive parts of each of the lithium module 1302 and/or the sodium module 1310 used to transfer charge to/from each module. In this way, only the target alkali metal cation (or $H^+$) may be able to transfer to/from the feed solution (first solution) and the second solution to the electrolyte solution (such as the redox flow electrolyte 1306 and/or the redox flow electrolyte 1314).

With respect to the lithium solid electrolyte membrane 1304 and/or the sodium solid electrolyte membrane 1312, each or both may consist of a matrix (used as a durable, impermeable scaffold for the membrane), and solid electrolyte particles (selected on the basis of the ion that the membrane is designed to allow selective passage through). In the case where $H^+$ is the ion of choice, Nafion may function as both the matrix and the ion-selective material, circumventing the need for a solid electrolyte particle.

In one embodiment, the lithium module 1302 and/or the sodium module may include a structural framework, which maybe designed in such a way to sequester the redox flow electrolyte 1306, the redox flow electrolyte 1314, and/or the electrode 1308 from the external environment. One or more surfaces of the structural framework may be composed of the ion-selective solid electrolyte membrane (such as the lithium solid electrolyte membrane 1304 and/or the sodium solid electrolyte membrane 1312) to enable selective passage of the desired alkali metal ion (or $H^+$) to/from the exterior of the module/framework to the interior of the module/framework.

In various embodiments, the traditional concept of "discharge" and "charge" may not necessarily apply to the redox electrode modules 1300, particularly in the case where the same set of electroactive solutes may be used for both the lithium module 1302 and/or the sodium module 1312. For example, a single step of charge transfer between the lithium module 1302 and the sodium module 1310 may include both the input of energy and reclamation of energy. In this case, the "anode" electrode module (such as the lithium module 1302) may be the module with the lower mean potential (as current may be transferred between electrode modules throughout the extraction/reclamation steps), and the "cathode" electrode module (such as the sodium module 1310) may be the module with the higher mean potential (as current may be transferred between electrode modules throughout the extraction/reclamation steps).

In the case where the mean potential of each electrode module is equal throughout the extraction/reclamation steps, the "anode" electrode module may be identified by any method convenient to the user. In the context of a $Li^+$ extraction system, the "anode" electrode module may be referred to as the module that receives charge as $Li^+$ may be selectively removed from the feed solution to the electrode module (such as the lithium module 1302).

When the redox electrode modules 1300 is utilized as a system for extracting $Li^+$ from a feed solution (such as a $Li^+$-containing brine), the following steps may be used: 1) extraction; and 2) reclamation.

With respect to the step of extraction, a feed solution may be fed between the cathode/anode modules. To initiate removal of $Li^+$ from the feed solution, a current may be flowed from the cathode electrode module to the anode electrode module. During this step, the electroactive solute in the cathode electrode module may be oxidized, coinciding with the removal of the alkali metal ion or $H^+$ within the catholyte into the feed solution through the solid electrolyte membrane of the cathode electrode module. Additionally, the electrons fed from the cathode electrode module to the anode electrode module may result in the reduction of the electroactive solute in the anode electrode module and the selective transfer of $Li^+$ from the feed solution to the anolyte. In this manner, the $Li^+$ ions extracted from the feed solution may be temporarily stored within the anolyte, while the alkali metal ions or H+ initially contained within the catholyte may be expelled to the feed solution as a waste product.

With respect to the step of reclamation, a second solution may be fed between the cathode/anode modules. The second solution may contain saturated $Li_2CO_3$ and a carbonate salt (such as $Na_2CO_3$), depending on what alkali metal ion the cathode electrode module may be configured to selectively remove. To initiate the reclamation of $Li^+$ and precipitation of $Li_2CO_3$, a charge may be transferred from the anode electrode module to the cathode electrode module. During this step, the electroactive solute in the anode electrode module may be oxidized, coinciding with the removal of the Li+ within the anolyte into the feed solution through the solid electrolyte membrane of the anode electrode module. Additionally, the electrons fed from the anode electrode module (such as the lithium module 1302) to the cathode electrode module (such as the sodium module 1310) results in the reduction of the electroactive solute in the cathode electrode module and the selective transfer of Na+(or any other alkali metal ion or H+ that the cathode electrode module is configured to transport) from the feed solution to the catholyte. In this manner, the alkali metal ions or H+ extracted from the feed solution may be temporarily stored within the catholyte, restoring the system to its initial state before the preceding extraction state.

In one embodiment, the redox electrode modules 1300 may be used for grid-scale energy storage. It is noted that theoretically, the redox electrode modules 1300 may function for grid-scale energy storage with any electroactive solutes (although it may be better to use different active materials for each side so that the voltage of the cell is higher). Additionally, in one embodiment, solvents used in the redox electrode modules 1300 may be used as both an electrode and an electrolyte.

In one embodiment, electroactive solutes used for vanadium redox flow batteries (pervanadyl ($VO_2^+$), vanadyl ($VO_2^+$), V2+, V3+) may be viable substitutes for the electroactive solutes discussed herein ($[Fe(CN)6]3-/4-$).

Conventional lithium extraction systems from Li-containing brines may often comprise a multi-step process requiring the use of many reagents, high amounts of energy, and/or high amounts of evaporated water. As such, these processes may only be economically viable when Li+ concentrations in the brines are high. In addition, extraction from ore and clay requires large volumes of water and may produce toxic waste streams. It should be noted that it may only be economically viable to perform extraction upon Li-rich brines, as the process may rely on creating high surface area pools of the brine (often in the order of square kilometers of area) to evaporate the water, thereby making it possible to precipitate the lithium out in the form of lithium carbonate.

In contrast, the systems disclose herein allow for the ability to extract Li+from more dilute sources using less energy input and less chemical reagents may make extraction from many of these sources economically viable, thus providing increased levels of Li+ to supply the ever-growing lithium-ion battery industry. Advantageously, performing these processes without producing toxic waste streams may ultimately preserve the surrounding environment and be more sustainable.

In one embodiment, electrolyte membrane-assisted lithium extraction may include a system for extraction of Li+from a Li-containing brine composed of Li+ electrode modules, which act as reservoirs for reversibly storing Li+ extracted from a feed solution, Na+(or another ion, such as K+ or H+) electrode modules, which act as reservoirs for reversible storing Na+ extracted from a feed solution, an array of Li+/Na+ modules positioned such that the surface of each Li+ module faces the surface of a Na+ module so that both modules may exchange ions from a feed solution positioned in the space between the modules. In one embodiment, the array of modules may be encased in a rectangular enclosure such that the spaces between the modules form rectangular ducts (or any shape) through which feed solutions may be passed. It should be noted that, within the system, an extractor may include the array and the requisite enclosure. Additionally, the electrolyte membrane-assisted lithium extraction system may further comprise a set of pipes and pumps, which may transport the feed solution (containing Li+) to the extractor and through the rectangular ducts of the extractor, within which Li+/Na+ may be reversibly transported to and from the feed solution through the electrode modules. In addition, the system may comprise a silo for storing an aqueous solution of sodium carbonate and/or lithium carbonate (i.e. a carbonate solution), which may contain a stirrer such that extra sodium carbonate may be added and dissolved into the aqueous solution. It should be noted that, when stored, the concentration of lithium carbonate may be maintained such that it is fully saturated. Further, the system may comprise a decanter, which may be positioned at the bottom of the extractor to collect lithium carbonate that precipitates as Li+ stored in the extractor (as a result of extracting it from the feed solution). To assist in the precipitation of lithium carbonate, a sonicator may be used either directly within the extractor or within a separate tank where the solution is pumped to after the reclamation step.

In likewise embodiment, each module may consist of an active material coating on a current collector welded to both sides of a metal plate, an ion-selective solid electrolyte membrane covering the active material coating on both sides of the metal plate, a metal frame, which may be electronically connected to the internal active material coating and function as a framework for protecting the active material coating from the external environment, an elastomeric sealant around the edges of the metal frame/solid electrolyte membrane where the frame and membrane touch, which may prevent substances from leaking into the electrode module through the membrane, an electrolyte, which may fill up the space on the interior of the module, acting as a medium for transporting ions between the active material and solid electrolyte membrane, and/or a separator between each active material coating and solid electrolyte membrane (optional), which may provide mechanical support and electronically isolate the active material from the solid electrolyte membrane.

In operation, the Na+ modules of the extractor may be completely filled with Na+ in the active material, and the Li+ modules of the extractor may be completely devoid (or near devoid) of Li+ in the active material. Additionally, a feed solution (e.g., a Li+-containing brine) may be pumped into the extractor, where Li+ ions are extracted from the feed into the Li+ electrode modules while Na+ ions are released from the Na+ modules. It should be noted that this step may operate continuously (i.e., the solution may constantly flow through the extractor as Li+/Na+ ions are transported to and from the solution). In addition, the outlet stream may be returned to the feed, where the only waste material may be Na+. Further, the carbonate solution may then be pumped from the feed silo and transferred back into the extractor such that the extractor may be completely filled with the carbonate solution. Further still, once the extractor has been filled with carbonate solution, the flow of water may be halted, after which the Li+ stored in the Li+ electrode modules may be expelled while Na+ ions from the carbonate solution may be transported into the Na+ electrode modules. It should be appreciated that, since the carbonate solution may be already fully saturated with lithium carbonate, the Li+ expelled from the extractor may immediately precipitate as a solid and collect in the decanter located at or near the bottom of the extractor. As indicated hereinabove, a supersaturated solution may benefit from an input of energy (e.g. via sonication) to initiate precipitation.

Further yet, the lithium carbonate collected in the decanter may be removed and the carbonate solution returned to the silo where additional sodium carbonate may also then be added to the silo to compensate for the material lost during reclamation. Of course, it is appreciated the solution may be configured such that the Li+ may not precipitate. For example, the solution may be configured such that the Li+ may undergo an ion exchange, as discussed herein as well.

In other embodiments, a solution of pure water may be passed through the system between the extraction and reclamation steps to ensure that the extractor has been purged of any contaminants. Additionally, the reclamation step may also be run under a constant flow, where the solution may be circulated through the extractor, back to the silo, and then back to the extractor again. In addition, the extraction step may also be run as a batch operation, where the feed solution may first be transferred to the extractor, the Li+/Na+ than may go through the exchange process, and the solution may then be removed at the end.

In another embodiment, the system may also be run such that the reclamation and extraction steps occur simultaneously. This may include two electrodes within each module (that may be electronically isolated from one another). This may also include every other rectangular duct in the extractor to have the Li brine flowing through it, and every other rectangular duct to have the carbonate solution flow through it. Within each module, one electrode may function as be an "extraction" module and one electrode may function as a "reclamation" module. During operation, the "extraction" electrodes may work in parallel such that charge is transferred from the "extraction" electrodes in Na+ modules to the "extraction" electrodes in Li+ modules; and during reclamation, charge may be transferred from "reclamation" electrodes in Li+ modules to the "reclamation" electrode in Na+ modules.

As such, this particular embodiment may enable a higher throughput of lithium to be extracted for a given period of time. This may also circumvent the need to "replace" the brine with the carbonate solution and to "wash" the module between runs. Further, this embodiment, may also be advantageous in that it may function as a "heat exchanger" for the brine. For example, as a "heat exchanger", the heat from the brine may dissipate into the carbonate solution. Further, this, in turn, may assist the Li carbonate to precipitate (Li carbonate has a lower solubility in water at higher temperatures).

Figure 14:
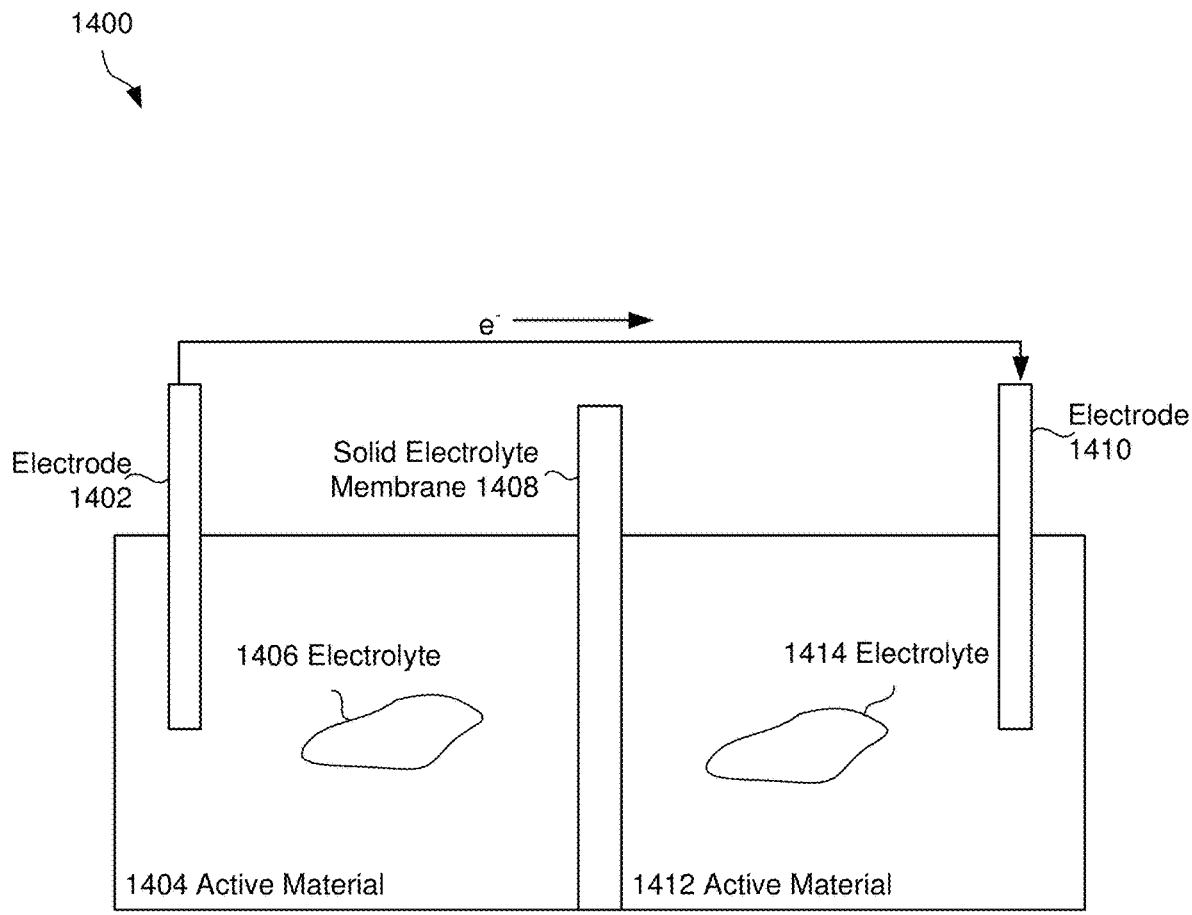
FIG. 14 illustrates a membrane separation cell, in accordance with one embodiment.

FIG. 14 illustrates a membrane separation cell 1400, in accordance with one embodiment. As an option, the membrane separation cell 1400 may be implemented in the context of any one or more of the embodiments set forth in any previous and/or subsequent figure(s) and/or description thereof. Of course, however, the membrane separation cell 1400 may be implemented in the context of any desired environment. Further, the aforementioned definitions may equally apply to the description below.

As shown, the membrane separation cell 1400 includes an electrode 1402 that is in direct contact with an active material 1404 and an electrolyte 1406. Additionally, the membrane separation cell 1400 includes an electrode 1410 that is in direct contact with an active material 1412 and an electrolyte 1414. A solid electrolyte membrane 1408 may separate the active material 1404 and the electrolyte 1406 from the active material 1412 and the electrolyte 1414. The solid electrolyte membrane 1408 may be ion selective such that preconfigured ions can pass from one solution (such as the electrolyte 1406) to another (such as the electrolyte 1414). In one example, if a liquid electrolyte (such as the electrolyte 1406 and/or the electrolyte 1414) were used as either the anolyte or catholyte, it would need to be in direct contact with the solid electrolyte membrane 1408, and in some instances, would also be in direct contact with the electrode (such as the electrode 1402, the electrode 1410, etc.).

In operation, the membrane separation cell 1400 may be used to selectively remove a particular type of alkali metal from one electrolyte or active material to another electrolyte or active material.

In one embodiment, the membrane separation cell 1400 shows electrode 1402 and/or the electrode 1410. It is to be understood that any number of electrodes may be associated with the membrane separation cell 1400. The electrode 1402 and/or the electrode 1410 may each be an electronically conductive material that interfaces with electroactive substances to partake in redox chemical reactions. Additionally, the electrode 1402 and/or the electrode 1410 may be in electrical contact with an external circuit that controls the flow of electrons between one or more other electrodes. When charge is transferred between electrode (such as between the electrode 1402 and the electrode 1410), the electrode that supplies electrons for a reduction reaction is referred to as a cathode, whereas the electrode that supplies electrons for the oxidation reaction is referred to as an anode.

In another embodiment, a single electrode may be used as both an "anode" and a "cathode" at different times of a given process. However, if more than one electrode is configured for the system, each may be referred to specifically as either an "anode" or "cathode", regardless of whether the specific electrode is currently used for a reduction or oxidation. The assignment of an electrode as the "anode" and/or "cathode" may be preconfigured as desired (although the naming generally coincides with whether the electrode functions predominately as an "anode" or "cathode" during the most relevant step of the process).

The electrode 1402 and/or the electrode 1410 may include an electronically-conductive substrate, and, optionally, a catalyst. The electronically-conductive substrate may include carbon-based materials (such as but not limited to graphite, graphene, carbon nano onions (CNO), carbon nanotubes (CNT), carbon nanofibers (CNF), and carbon felt), and/or other materials (such as but not limited to metals such as Al, Cu, Li, Na, Stainless Steel, Ti, Ni, Ta, Au, Ag, Pt, Rh, Jr, Pd). Additionally, the catalyst may participate in a chemical reaction (but may not be generated or consumed by the overall reaction). A catalyst may function to lower the activation energy of the reaction, thereby increasing its rate and improving the energy efficiency of the overall system.

With respect to the active material 1404 and/or the active material 1412, it is to be understood that two or any number of active materials may be involved in the membrane separation cell 1400. The active material 1404 and/or the active material 1412 may be any substance (such as but not limited to a solid, liquid, gas, solute, or ionic species) that serves as a reactant or product for a redox reaction. As electrons are transferred between two electrodes, at least one active material may be oxidized at one electrode, and at least one active material may be reduced at the opposite electrode. The active material 1404 and/or the active material 1412 may include, but not limited to carbon-based materials (such as but not limited to graphite, graphene, carbon nano onions (CNO), carbon nanotubes (CNT)); pure alkali metals (such as but not limited to Li, Na, K, Rb, Cs); metals and metalloids that alloy with alkali metals (such as but not limited to Si, P, Mg, Ca, Sn, Ga, In, Ge, Au, Ag, Pd, Pt, and any alloys of these metals); oxide materials (such as but not limited to LTO, LMO, NCA, NMC, LCO); phosphate materials (such as but not limited to LFP, NVP); Prussian blue and Prussian blue analogues; metal hydrides (such as but not limited to $NiO(OH)_2/NiO(OH)$); gases, liquids, and solids (such as but not limited to $H_2$, $O_2$, $H_2O$, $H_2O_2$, $CO_2$, $CH_4$, $F_2$, $Cl_2$, $Br_2$, $I_2$); and/or aqueous solutes (such as but not limited to $H^+$, $OH^-$, $OH^{2-}$). It is to be understood that H+ may be a common notation for $H_3O$+(the hydronium cation, or protonated water) but may also include protonated alcohols and ethers such as $CH_3(OH_2)^+$(protonated methanol) and $CH_3CH_2(OH^+)CH_2CH_3$ (protonated dimethyl ether).

With respect to the electrolyte 1406 and/or the electrolyte 1414, it is to be understood that they may be same or different substance. The electrolyte 1406 and/or the electrolyte 1414 may be configured to transport ions between different electrodes under the application of a potential difference between electrodes. An electrolyte in contact with the anode, but not in contact with the cathode is referred to as the "anolyte", whereas an electrolyte in contact with a cathode but not an anode is referred to as the "catholyte". It is to be appreciated that the electrolyte 1406 and/or the electrolyte 1414 may be in either/or liquid, semi-solid (such as gel), or solid form.

The electrolyte 1406 and/or the electrolyte 1414, in liquid electrolyte form, may consist of one or more liquid solvents (such as but not limited to water, alcohols, carbonates, ethers, hydrocarbons, etc.), and/or multiple ionic solutes (one of which may include the alkali metal cation of interest or H+, and another of which may include at least one anion). Alkali metal cations of interest may include Li+, Na+, K+, H+. A single substance can function as both a liquid solvent and as an ionic solute, such as in the case of ionic liquids. In one embodiment, the liquid electrolyte may contain an active material (such as the active material 1404 and/or the active material 1412) as a solute. In another embodiment, a single solute may function as both an active material and an ionic solute. Further, the liquid electrolyte may contain one or more solutes acting as a buffer, which may stabilize the pH within a narrow, desired range.

The electrolyte 1406 and/or the electrolyte 1414, in solid electrolyte form, may be either an ion-conducting ceramic, glass, polymer, polymer/salt hybrid, or any combination thereof. In another embodiment, the electrolyte 1406 and/or the electrolyte 1414 may also include a plasticizer (which may be but not be limited to a solid or liquid distributed throughout the electrolyte to increase segmental motion of the electrolyte, thereby increasing its ionic conductivity), and/or a mechanical additive (which may serve to improve any mechanical property of interest such as hardness, modulus, or elasticity of the electrolyte).

With respect to the solid electrolyte membrane 1408, it may be configured as an ion-selective solid electrolyte membrane, and may be a particular subset of electrolytes that enables highly selective separation of alkali metals. In one embodiment, the driving force of separation may be a potential difference across the solid electrolyte membrane 1408, which may be precisely controlled by controlling the potential difference between two electrodes (such as the electrode 1402 and the electrode 1410) positioned at opposite sides of the solid electrolyte membrane 1408.

In one embodiment, the solid electrolyte membrane 1408 may consist of (but not limited to) an ion-selective solid electrolyte, a matrix, and/or mechanical additives. With respect to the ion-selective solid electrolyte, it may have high ionic conductivity for the alkali metal of interest and low (such as negligible, or no) ionic conductivity for other substances. For example, in one embodiment, if the alkali metal of interest was Li$^+$, the applicable solid electrolyte membrane 1408 may include, but not be limited to any member of the family of NASICON-type structure (including but not be limited to LAGP, LATP, any of LFP, LTO, NCM, or LMO). If Na$^+$ was the alkali metal of interest, the applicable solid electrolyte membrane 1408 may include, but not be limited to, any member of the family of NASICON-type structure. Further, if K$^+$ was the alkali metal of interest, the applicable solid electrolyte membrane 1408 may include, but not be limited to, K$_2$Fe$_4$O$_7$. If H$^+$ was the alkali metal of interest, the applicable solid electrolyte membrane 1408 may include, but not be limited to, Nafion. Additionally, the solid electrolyte membrane 1408 may include Rb+(such as RbxFeyVzO4, where x y and z denote subscripts), Cs (such as CsxPyZzO4, where x y z are subscripts and Z is an element from S, Cr, Mo, W; CsxMyPO4, where M is a metal from Mg, Ca, Sr, Ba; and/or CsxPO4M, where M is a metal from Sc, Y, La, Sm, Nd.

With respect to the matrix of the solid electrolyte membrane 1408, the matrix may serve as a scaffold that holds the ion-selective solid electrolyte in place. The matrix may inhibit the permeation of all materials across the solid electrolyte membrane 1408. The matrix may or may not be covalently crosslinked and may or may not be covalently bonded to the ion-selective solid electrolyte. In one embodiment, the matrix may also comprise a metal (such as Sn, etc.), which may make it easier to polish the membrane to a preconfigured roughness, and configure the matrix for increased impermeability.

With respect to the mechanical additives of the solid electrolyte membrane 1408, the mechanical additives may serve to maintain the structural integrity of the solid electrolyte membrane 1408 to prevent the uptake of solvent and/or loss of impermeability of the solid electrolyte membrane 1408 to unwanted substances. For example, mechanical additives may include, but not be limited to carbon-based materials (such as but not limited to graphene, carbon nano onions (CNO), carbon nanotubes (CNT), carbon nanofibers (CNF), diamond), metals (such as but not limited to titanium, stainless steel), and/or ceramics (such as but not limited to TiO$_2$, SiO$_2$, Al$_2$O$_3$).

In one embodiment, the membrane separation cell 1400 may relate to a membrane-based alkali metal extraction system. In use, an alkali metal extraction system includes an anode and a cathode, where the anode is configured for oxidation and the cathode is configured for reduction. Additionally, wherein migration of a predetermined alkali metal ion through an ion-selective solid electrolyte membrane is driven by a current across the anode and the cathode, and the ion-selective solid electrolyte membrane is selectively permeable to the predetermined alkali metal ion. The alkali metal extraction system further includes at least one active material, a first solution comprising the predetermined alkali metal ion, and a second solution comprising the migrated predetermined alkali metal ion.

In various embodiments, the first solution may include an anolyte, and the second solution may include a catholyte. Additionally, each of the anolyte and the catholyte may include an active material (including for example, one or more electroactive solutes) or an electrode coating immersed in each of the anolyte and the catholyte, one or more dissolved alkali metal cations (including the predetermined alkali metal ion), one or more dissolved anions, and a solvent.

In various embodiments, the active material may include one or more of: H$_2$, Na$^+$, Li metal, LFP, LMO, NCA, NMC, graphite; Na-based active materials including Prussian Blue; and/or electroactive solutes include but are not limited to: ferricyanide, ferrocyanide, or a redox state ferricyanide or ferrocyanide ([Fe(CN)$_6$]$^{3-}$/[Fe(CN)$_6$]$^{4-}$); ferrocene (Fe(C$_5$H$_5$)$_2$, ferrocenium Fe(C$_5$H$_5$)$_2^+$, cobaltocene (Co(C$_5$H$_5$)$_2$, cobaltocenium Co(C$_5$H$_5$)$_2^+$, or any organic derivatives thereof; vanadium-containing ions or vanadium coordination complexes, including one or more of pervanadyl (VO$_2^+$), vanadyl (VO$^{2+}$), V$^{2+}$, V$^{3+}$; phosphotungstic acid, or a redox state of phosphotungstic acid ([PW$_{12}$O$_{40}$]$^{3-}$/[P$_2$W$_{21}$O$_{71}$]$^{6-}$/[PW$_{11}$O$_{39}$]$^{7-}$, etc.); phosphomolybdic acid, or a redox state of phosphomolybdic acid; silicotungstic acid, or a redox state of slicotungstic acid; and/or an ion of any common redox state of Fe, Co, Ni, or Cu, including one or more of Fe$^{2+}$, Fe$^{3+}$, Co$^{2+}$, Co$^{3+}$, Ni$^{2+}$, Ni$^{3+}$, Cu$^{2+}$, Cu$^+$, or any coordination complex thereof.

In various embodiments, a first current collector may be in contact with the first solution, and a second current collector may be in contact with the second solution. Additionally, each of the first current collector and the second current collector may be electronically conductive, and made of at least one of aluminum, nickel, copper, titanium, stainless steel, graphite felt, or carbon fiber.

In various embodiments, the anode may have a first mean potential, and the cathode may have a second mean potential, where the first mean potential is less than or equal to the second mean potential such that the anode receives electronic charge as the predetermined alkali metal migrates from the first solution to the second solution. Additionally, the first solution may include one or more secondary ions, and/or a first concentration of the one or more secondary ions in the first solution may be greater than a second concentration of the one or more secondary ions in the second solution.

In various embodiments, the configuration of the ion-selective solid electrolyte membrane may include a solid electrolyte particle with a predetermined pore size corresponding with the predetermined metal ion. In one embodiment, ionic selectivity of the material may be based on the barrier for diffusion for the ion through a crystal lattice (of the material). The energy barrier for diffusion may be a function of charge and size of the ion and may not necessarily correlate with either. The first solution may be a geothermal brine or a salar brine. Still yet, the first solution may comprise at least one of lithium minerals, lithium-containing brines, recycled lithium batteries, or seawater.

In various embodiments, the second solution may comprise a first electroactive solute, where the reduction of the first electroactive solute coincides with the migration of the predetermined alkali metal ion. Additionally, the first solution may comprise a second electroactive solute, where oxidation of the second electroactive solute coincides with the migration of the predetermined alkali metal ion. A first concentration of at least one H$^+$ ion or at least one Na$^+$ ion may decrease in the second solution, and a second concentration of the at least one H$^+$ ion or the at least one Na$^+$ ion may increase in the first solution.

In various embodiments, the first solution may include LiOH at a first solubility, and the second solution may include an organic solution with second solubility, wherein the second solubility is lower than the first solubility. Additionally, the organic solution may comprise H$_2$O, where the H$_2$O is configured to facilitate formation of an alkali salt.

In various embodiments, the migrated predetermined alkali metal ion may be configured to recombine with a hydroxyl group to precipitate. Additionally, input energy used to migrate the predetermined metal alkali ion may be stored and recovered, at least in part, as electrochemical energy of the migrated predetermined metal alkali ion at the cathode. Further, the input energy may correspond with an electric charging at an electrode with the predetermined metal alkali ion and the electrochemical energy may correspond with an electric discharge at the electrode of the predetermined metal alkali ion. Still yet, the recovery of the input energy may reduce a carbon footprint of a manufacturing facility.

In another embodiment, recovering energy may apply to a design where the reduction potential of the anode and cathode are different (e.g. each of the anode and cathode use different active materials). In this case, it may take an input of energy to move charge from a cathode side to an anode side (which may correspond to the migration of an alkali metal ion from cathode to anode), but such energy may be recovered when the cell then moves charge from the anode to the cathode (which may correspond to the migration of an alkali metal ion from anode to cathode). The recovery therefore may occur via a two-step process where the direction of current changes.

In another embodiment where the anode and cathode have equal mean reduction potentials (as is the case when using the same active materials on both sides), it may not be required to have any net energy input to drive the electrochemical reaction in either direction. In any case, an input of irrecoverable energy is always required to move charge (per Ohm's law).

Figure 15:
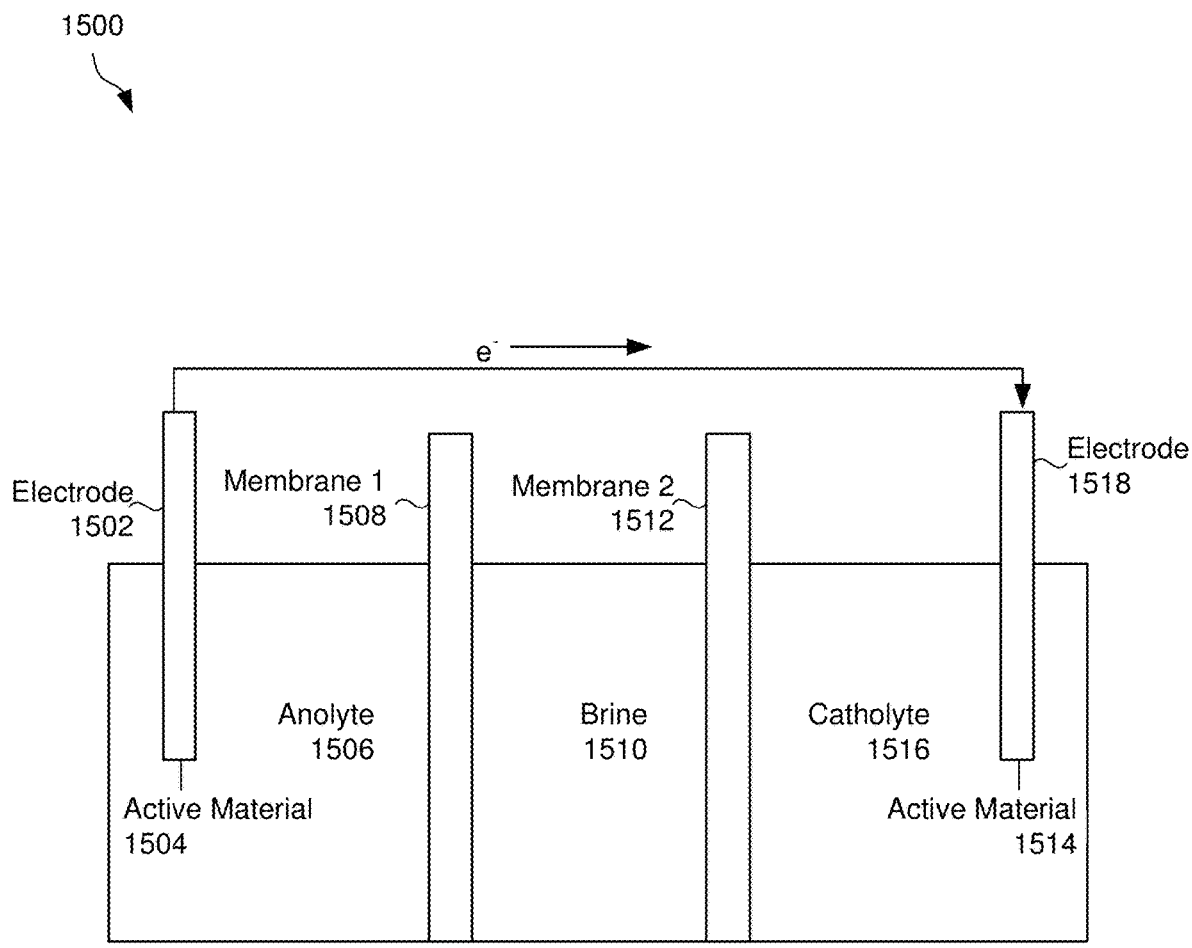
FIG. 15 illustrates a lithium extractor with active materials, in accordance with one embodiment.

FIG. 15 illustrates a lithium extractor 1500 with active materials, in accordance with one embodiment. As an option, the lithium extractor 1500 may be implemented in the context of any one or more of the embodiments set forth in any previous and/or subsequent figure(s) and/or description thereof. Of course, however, the lithium extractor 1500 may be implemented in the context of any desired environment. Further, the aforementioned definitions may equally apply to the description below.

As shown, the lithium extractor 1500 includes an electrode 1502 in contact with active material 1504, and an anolyte 1506. The anolyte 1506 may be separated from brine 1510 via a membrane 1 1508. Further, the brine 1510 may be separated from a catholyte 1516 via a membrane 2 1512. The electrode 1518 may be in contact with active material 1514, and the catholyte 1516. The active material 1504 may be a coating on the surface of the electrode 1502, and the active material 1514 may be a coating on the surface of the electrode 1518.

In one embodiment, the electrode 1502 may be copper (Cu), and the electrode 1518 may be aluminum (Al). In other embodiments, the anode electrode (such as the electrode 1502) may be a sheet of Al or Cu foil coated with the anode active material, and the cathode (such as the electrode 1518) may be a sheet of Al or Cu foil coated with the cathode active material.

In operation, the lithium extractor 1500 may include three electrolytes (anolyte 1506, brine 1510, catholyte 1516) which may be used in series. Each of the three electrolytes may be separated from each other via an ion-selective solid electrolyte membrane (such as the membrane 1 1508 and the membrane 2 1512). One liquid electrolyte may in direct contact with the anode (such as the anolyte 1506), a second liquid electrolyte may be in direct contact with the cathode (such as the catholyte 1516), and a third liquid electrolyte (such as the brine 1510) may be a Li ion-containing brine.

The membrane 1 1502 may include an ion-selective solid electrolyte membrane separating the anolyte 1506 and the brine 1510, and may be selective for Li ions. In contrast, the membrane 2 1512 may include an ion-selective solid electrolyte membrane separating the catholyte 1516 from the brine 1510, and may be selective for a different type of ion (such as Na ions).

In one embodiment, the anolyte 1506 may be an aqueous solution containing Li+ cations and $SO_4^{2-}$ anions. Further, the catholyte 1516 may be an aqueous solution containing Na+ cations and $SO_4^{2-}$ anions.

With respect to the active material 1504 (for the anode), the active material 1504 may include, but not be limited to LMO, LTO, LFP, etc. Further, the active material 1514 (for the cathode) may include, but not be limited to Na iron phosphate (NFP), Prussian Blue, etc.

In other embodiments, the anolyte 1506 may include, but not be limited to, a solvent (water), cations (Li+), and/or anions (TFSI−). The catholyte 1516 may include, but not be limited to, a solvent (water), cations (Na+), and/or anions (TFSI−). The brine 1510 may include, but not be limited to, a solvent (water, naturally present), cations (Na+, Li+, naturally present), and anions (naturally present).

Figure 16:
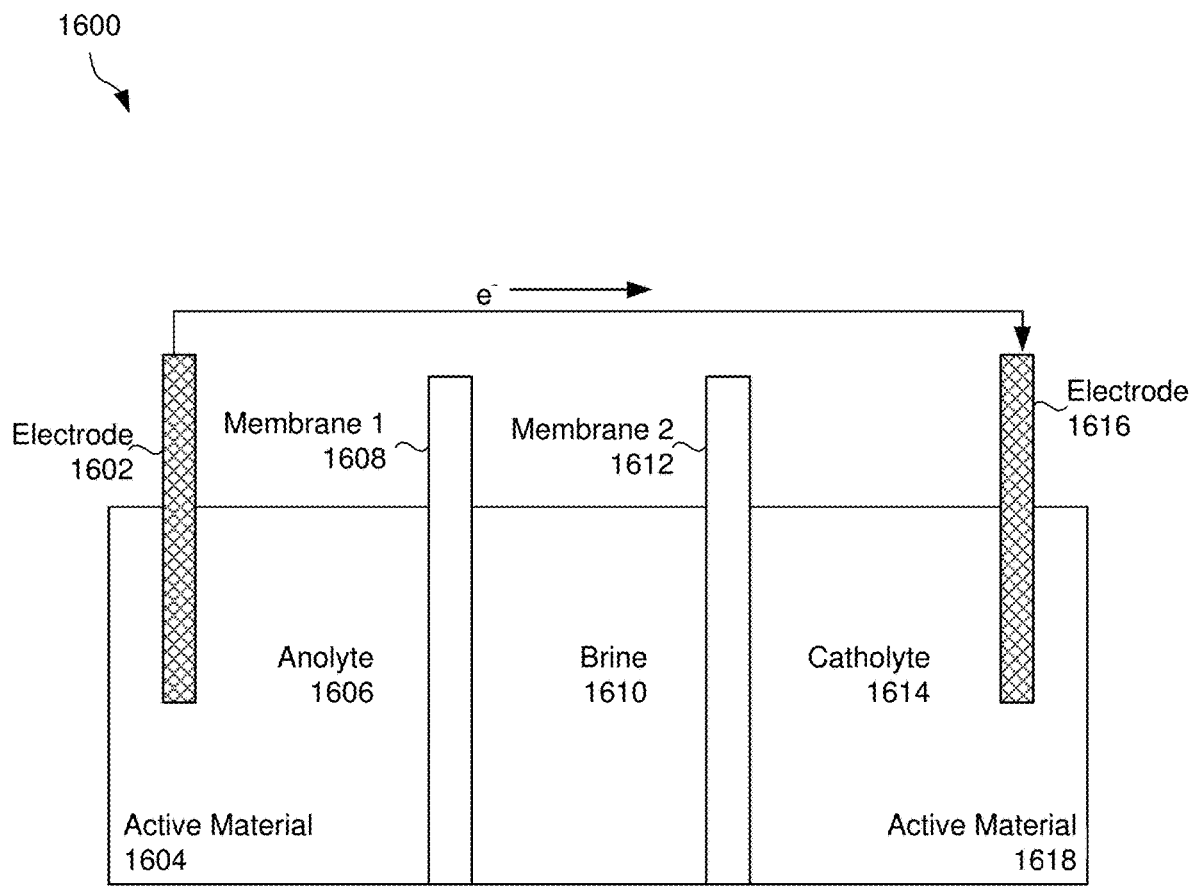
FIG. 16 illustrates a lithium extractor with redox flow active materials, in accordance with one embodiment.

FIG. 16 illustrates a lithium extractor 1600 with redox flow active materials, in accordance with one embodiment. As an option, the lithium extractor 1600 may be implemented in the context of any one or more of the embodiments set forth in any previous and/or subsequent figure(s) and/or description thereof. Of course, however, the lithium extractor 1600 may be implemented in the context of any desired environment. Further, the aforementioned definitions may equally apply to the description below.

As shown, the lithium extractor 1600 includes an electrode 1602 in contact with active material 1604, and an anolyte 1606. The anolyte 1606 may be separated from brine 1610 via a membrane 1 1608. Further, the brine 1610 may be separated from a catholyte 1614 via a membrane 2 1612. The electrode 1616 may be in contact with active material 1618, and the catholyte 1614. In one embodiment, the active material 1604 may include an electroactive solute.

In operation, the lithium extractor 1600 may include three electrolytes (anolyte 1606, brine 1610, catholyte 1614), which may be used in series. The three electrolytes may be separated from each other via an ion-selective solid electrolyte membrane (such as the membrane 1 1608 and the membrane 2 1612). One liquid electrolyte may be in direct contact with the anode (the anolyte 1606), a second liquid electrolyte may be in direct contact with the cathode (the catholyte 1614), and a third liquid electrolyte (the brine 1610) may be a Li ion-containing brine.

The membrane 1 may be an ion-selective solid electrolyte membrane separating the anolyte 1606 and the brine 1610, and may be selective for Li ions, whereas the membrane 2 may be an ion-selective solid electrolyte membrane separating the catholyte 1614 from the brine 1610, and may be selective for a different type of ions (such as but not limited to Na ions).

In various embodiments, the anolyte 1606 may be an aqueous solution containing, but not be limited to, Li+ cations and $[Fe(CN)_6]^{4-}$ and $[Fe(CN)_6]^{3-}$ anions. Additionally, the catholyte 1614 may be an aqueous solution containing, but not be limited to, Na+ cations and $[Fe(CN)_6]^{4-}$ and $[Fe(CN)_6]^{3-}$ anions.

The anode (such as the electrode 1602) may be a porous mesh composed of stainless steel. Additionally, the cathode (such as the electrode 1616) may be a porous mesh composed of stainless steel. Further, the active material 1604

(the active material for the anode) may be, but not be limited to, $[Fe(CN)_6]^{4-}$. The active material 1618 (the active material for the cathode), may be, but not be limited to, is $[Fe(CN)_6]^{3-}$.

In other embodiments, the anolyte 1606 may include, but not be limited to, a solvent (water), cations (Li+), and/or anions ($[Fe(CN)_6]^3$, $[Fe(CN)_6]^{3-}$). The catholyte 1614 may include, but not be limited to, a solvent (water), cations (Na+), and/or anions ($[Fe(CN)6]3$, $[Fe(CN)6]3-$). The brine 1610 may include, but not be limited to, a solvent (water, naturally present), cations (Na+, Li+, naturally present), and anions (naturally present).

Figure 17:
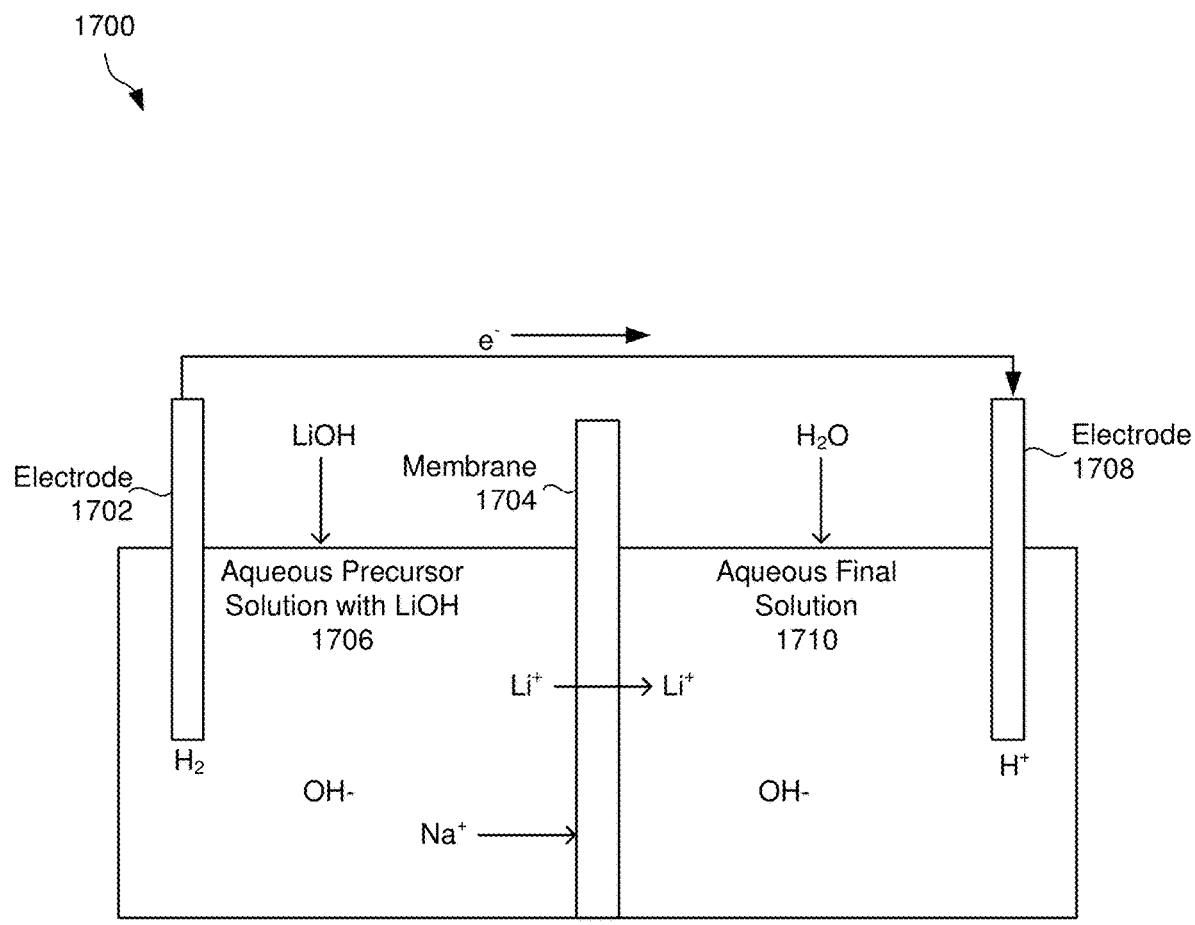
FIG. 17 illustrates redox electrode modules for critical minerals purification, in accordance with one embodiment.

FIG. 17 illustrates redox electrode modules 1700 for critical minerals purification, in accordance with one embodiment. As an option, the redox electrode modules 1700 may be implemented in the context of any one or more of the embodiments set forth in any previous and/or subsequent figure(s) and/or description thereof. Of course, however, the redox electrode modules 1700 may be implemented in the context of any desired environment. Further, the aforementioned definitions may equally apply to the description below.

As shown, lithium ions ($Li^+$) may pass from an anode comprised of aqueous precursor solution 1706 through a solid electrolyte membrane 1704 to a cathode comprised of an aqueous final solution 1710. In operation, lithium hydroxide (LiOH) atoms present in the aqueous precursor solution 1706 may break apart into positively-charged lithium ions and negatively-charged hydroxide ($OH^-$) atoms. In addition, the lithium ions may then be drawn across the electrolyte membrane 1704 into the aqueous final solution 1710 where they may recombine with hydroxide atoms to reform into additional lithium hydroxide atoms, thus yielding a higher concentration of lithium hydroxide in the aqueous final solution 1710 upon completion of the purification process. Further, the purification process may simultaneously combine the actions of reduction of $H^+$ at a cathode electrode 1708, forming $H_2$ (sent to an anode), and oxidation of $H_2$ at the anode electrode 1702, forming $H^+$ waste.

In one embodiment, the solid electrolyte membrane 1704 may be impermeable such that the aqueous solution may be prevented from crossing the solid electrolyte and matrix, yet simultaneously allow an alkali metal (such as $Li_+$) to pass through the solid electrolyte.

In one embodiment, the redox electrode modules 1700 may relate to a membrane-based critical minerals purification system. In use, a critical minerals purification system includes an anode and a cathode, where the anode is configured for oxidation and the cathode is configured for reduction. Additionally, migration of a predetermined alkali metal ion through an ion-selective solid electrolyte membrane is driven by a current across the anode and the cathode, and the ion-selective solid electrolyte membrane is selectively permeable to the predetermined alkali metal ion. Additionally, the critical minerals purification system includes at least one active material, a precursor solution comprising the predetermined alkali metal ion, where the precursor solution is characterized by a first purity with respect to an alkali metal salt, and a second solution comprising the migrated predetermined alkali metal ion, wherein the second solution is characterized by a second purity with respect to the alkali metal salt.

In various embodiments, the second purity may be greater than the first purity. Additionally, the at least one active material at the anode and/or the cathode includes at least one of: $H_2$, $Na^+$, Li metal, LFP, LMO, NCA, NMC, graphite; Na-based active materials including Prussian Blue; ferricyanide, ferrocyanide, or a redox state ferricyanide or ferrocyanide ($[Fe(CN)_6]^{3-}/[Fe(CN)_6]^{4-}$); ferrocene ($Fe(C_5H_5)_2$, ferrocenium $Fe(C_5H_5)_2^+$, cobaltocene ($Co(C_5H_5)_2$, cobaltocenium $Co(C_5H_5)_2^+$, or any organic derivatives thereof; vanadium-containing ions or vanadium coordination complexes, including one or more of pervanadyl ($VO_2^+$), vanadyl ($VO^{2+}$), $V^{2+}$, V 3+; phosphotungstic acid, or a redox state of phosphotungstic acid ($[PW_{12}O_{40}]^{3-}$/$[P_2W_{21}O_{71}]^{6-}$/$[PW_{11}O_{39}]^{7-}$, etc.); phosphomolybdic acid, or a redox state of phosphomolybdic acid; silicotungstic acid, or a redox state of slicotungstic acid; or an ion of any common redox state of Fe, Co, Ni, or Cu, including one or more of $Fe^{2+}$, $Fe^{3+}$, $Co^{2+}$, $Co^{3+}$, $Ni^{2+}$, $Ni^{3+}$, $Cu^{2+}$, $Cu^+$, or any coordination complex thereof.

In various embodiments, the ion-selective solid electrolyte membrane may be the at least one active material. Additionally, the second solution may include $H_2$, where the $H_2$ is an output of the reduction of the cathode. Further, the first solution may include $H_2$, where the $H_2$ is an input of the oxidation of the anode. In one embodiment, $Cl_2$ may be produced from $Cl^-$ at the anode and consumed at the cathode (and converted back to $Cl^-$).

In various embodiments, the anode may use a first active material, the cathode may use a second active material, and the first active material may differ from the second active material. Additionally, energy lost to the output of the reduction may be regained by the input of the oxidation. Further, the precursor solution may be in contact with the anode. The precursor solution may include LiOH.

In one embodiment, the aqueous precursor solution 1706 may contain any type of dissolved salt, not limited to LiOH (e.g. $Li_2CO_3$, LiCl, etc.). The flexibility of the aqueous precursor solution 1706 is further exemplified via LiX 1806 discussed hereinbelow.

In various embodiments, the second solution may be in contact with the cathode. The second solution may include $H_2O$. Additionally, the $H_2O$ may function as a reagent and a solvent. Further, the alkali metal salt may be extracted from the second solution. The extracted alkali metal salt at the second purity may be used for battery components.

In various embodiments, a reagent may be added to the second solution, where the reagent is configured to cause the migrated predetermined alkali metal ion to combine with a hydroxyl group to form the alkali metal salt at the second purity. Additionally, the precursor solution may include at least one of: lithium minerals, lithium-containing brines, recycled lithium batteries, or seawater.

In various embodiments, input energy used to migrate the predetermined metal alkali ion may be saved and recovered, at least in part, as electrochemical energy of the migrated predetermined metal alkali ion at the cathode. Additionally, the input energy may correspond with an electric charge process and the electrochemical energy may correspond with an electric discharge process. Further, the recovery of the input energy may reduce a carbon footprint of a manufacturing facility.

Figure 18:
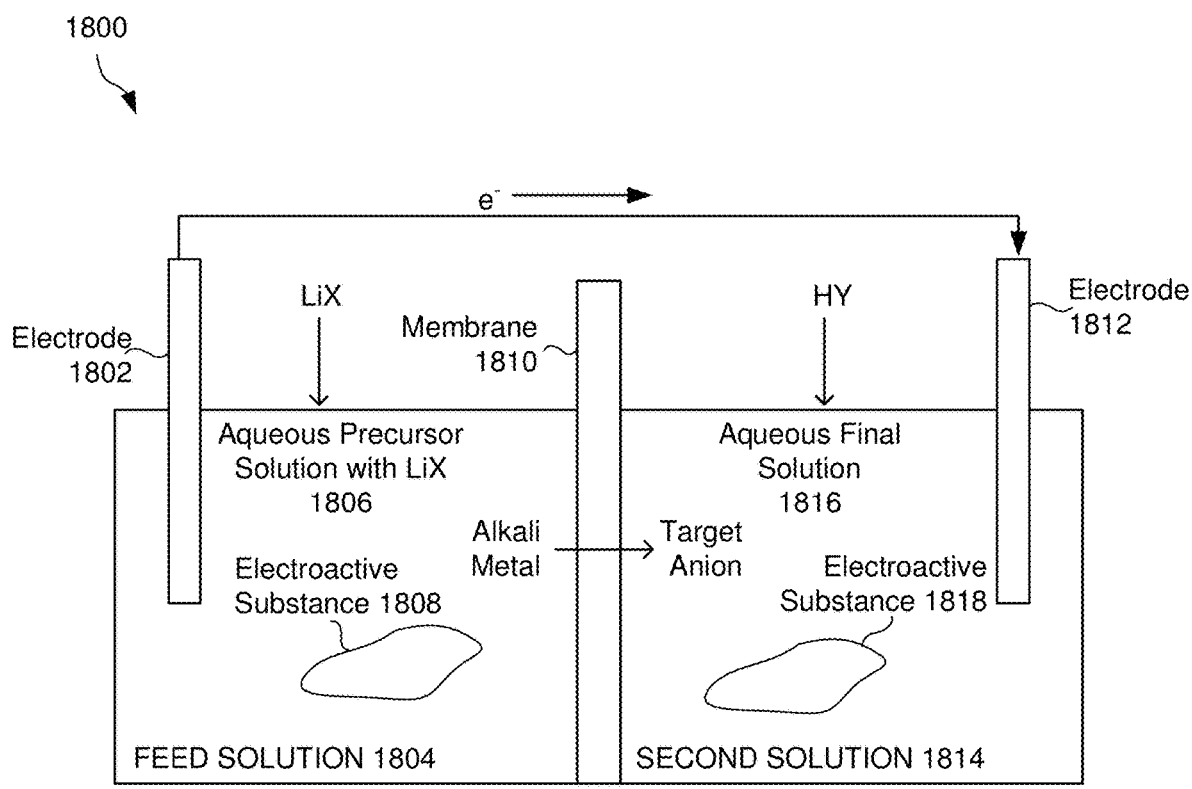
FIG. 18 illustrates redox electrode modules for critical minerals purification, in accordance with one embodiment.

FIG. 18 illustrates redox electrode modules 1800 for critical minerals purification, in accordance with one embodiment. As an option, the redox electrode modules 1800 may be implemented in the context of any one or more of the embodiments set forth in any previous and/or subsequent figure(s) and/or description thereof. Of course, however, the redox electrode modules 1800 may be implemented in the context of any desired environment. Further, the aforementioned definitions may equally apply to the description below.

As shown, alkali metal ions may pass from an anode comprised of aqueous precursor solution with LiX 1806 in a feed solution 1804 through a solid electrolyte membrane 1810 to a cathode comprised of an aqueous final solution 1816 in a second solution 1814. In one embodiment, LiX 1806 may include any lithium salt, including but not limited to monovalent anions (e.g. Cl–, Br–, I–, etc.), $Li_2CO_3$, and/or any other anion disclosed herein. In operation, alkali metal atoms comprising an electroactive substance 1808 present in the aqueous precursor solution with LiX 1806 may break apart into positively-charged metal ions and counterpart negatively-charged atoms. In addition, the alkali metal ions may then be drawn across the electrolyte membrane 1810 into the aqueous final solution 1816 where they may recombine with other counterpart atoms to reform into new atoms comprising a higher concentration of electroactive substance 1818 in the aqueous final solution 1816 upon completion of the purification process. In one embodiment, the purification process may simultaneously combine the actions of reduction of $H^+$ at a cathode electrode 1812, forming $H_2$ (sent to an anode electrode), and oxidation of $H_2$ at the anode electrode 1802, forming $H^+$ waste.

In one embodiment, the solid electrolyte membrane 1810 may be impermeable such that the aqueous solution may be prevented from crossing the solid electrolyte and matrix, yet simultaneously allow an alkali metal (such as $Li_+$) to pass through the solid electrolyte.

Figure 19:
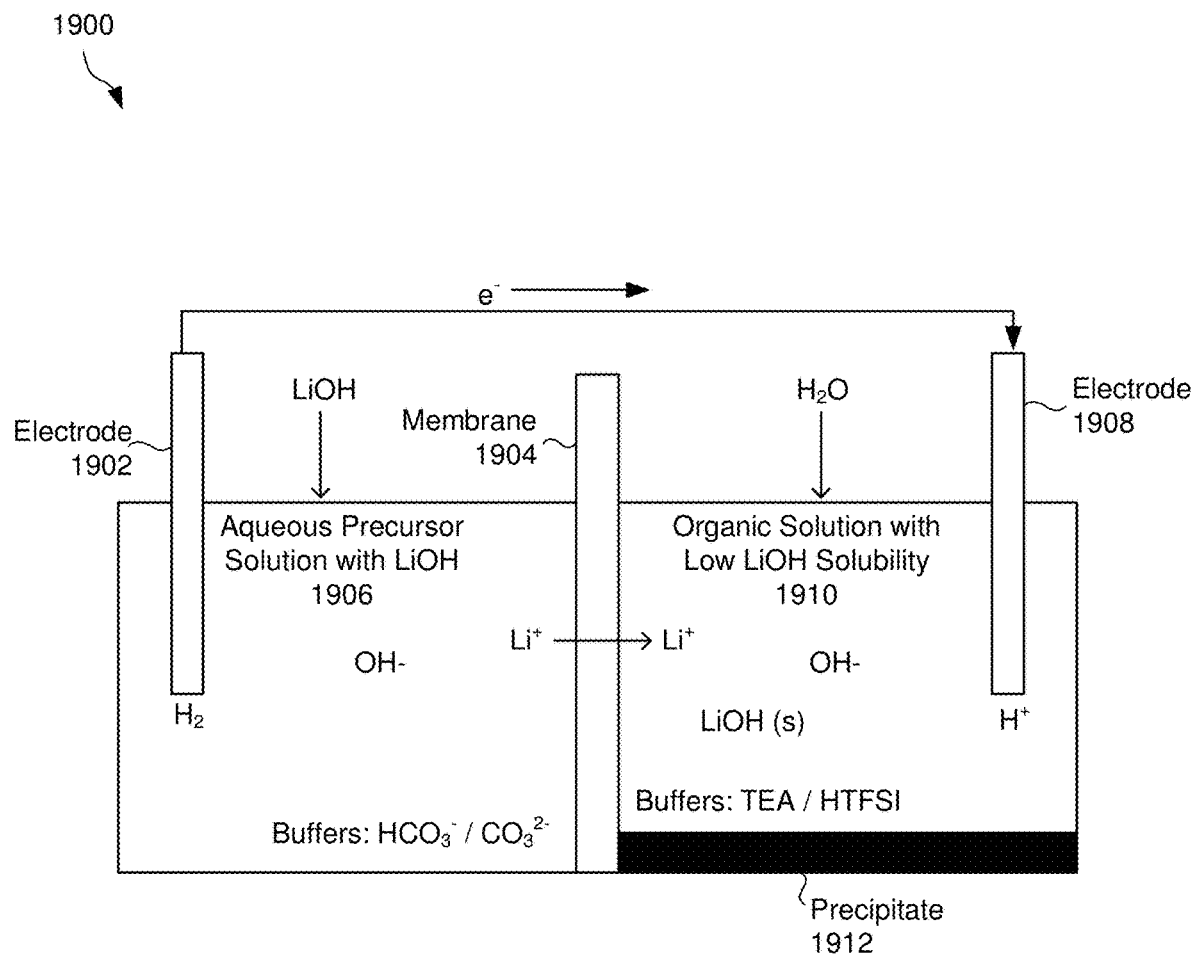
FIG. 19 illustrates redox electrode modules for metal salt precipitation, in accordance with one embodiment.

FIG. 19 illustrates redox electrode modules 1900 for metal salt precipitation, in accordance with one embodiment. As an option, the redox electrode modules 1900 may be implemented in the context of any one or more of the embodiments set forth in any previous and/or subsequent figure(s) and/or description thereof. Of course, however, the redox electrode modules 1900 may be implemented in the context of any desired environment. Further, the aforementioned definitions may equally apply to the description below.

As shown, lithium ions ($Li^+$) may pass from an anode comprised of aqueous precursor solution with lithium hydroxide (LiOH) 1906 through a solid electrolyte membrane 1904 to a cathode comprised of an organic solution with low LiOH solubility 1910. In operation, lithium hydroxide atoms present in the aqueous precursor solution 1906 may break apart into positively-charged lithium ions and negatively-charged hydroxide ($OH^-$) atoms. In addition, the lithium ions may then be drawn across the electrolyte membrane 1904 into the organic solution with low LiOH solubility 1910 where they may recombine with hydroxide atoms to reform into additional lithium hydroxide atoms, thus yielding a high concentration of lithium hydroxide in the organic solution with low LiOH solubility 1910 resulting in the formation of a concentrated precipitate salt 1912 upon completion of the precipitation process.

Additionally, in one embodiment, the precipitation process may simultaneously combine the actions of reduction of $H^+$ at a cathode electrode 1908, forming $H_2$ (sent to an anode), and oxidation of $H_2$ at the anode electrode 1902, forming $H^+$ waste. Further, to prevent corrosion and degradation of the effectiveness of the solid electrolyte membrane 1904, suitable buffers may be used to coat the solid electrolyte membrane 1904 in the case of contact with both the aqueous precursor solution with lithium hydroxide 1906 and organic solution with low LiOH solubility 1910. By way of example, the compound used to comprise the buffer in the aqueous precursor solution with lithium hydroxide 1906 may include, but not be limited to, bicarbonate ($HCO_3^-$) and/or Carbonate ion ($CO_3^{2-}$). Conversely, the compound used to comprise the buffer in the organic solution with low LiOH solubility 1910 may include, but not be limited to, Triethylamine (TEA) and/or bis(trifluoromethanesulfonyl) imide (HTFSI).

In one embodiment, the redox electrode modules 1900 may relate to a membrane-based alkali metal salt precipitation system. In use, an alkali metal salt precipitation system includes an anode and a cathode, where the anode is configured for oxidation and the cathode is configured for reduction. Additionally, migration of a predetermined alkali metal ion through an ion-selective solid electrolyte membrane is driven by a current across the anode and the cathode, and the ion-selective solid electrolyte membrane is selectively permeable to the predetermined alkali metal ion. The alkali metal salt precipitation system further includes at least one active material, a precursor solution comprising the predetermined metal ion, where the precursor solution is at a first solubility of an alkali metal salt, and a second solution comprising the predetermined metal ion, where the second solution is at a second solubility of the alkali metal salt which causes the migrated predetermined metal ion to precipitate.

In various embodiments, the precursor solution may include at least one of LiOH, LiCl, or $Li_2CO_3$. Additionally, the LiOH may be insoluble in the second solution. Further, the first solubility may be higher than the second solubility.

In various embodiments, the precursor solution may include one or more buffers. The one or more buffers may include at least one of $HCO_3^-$ or $CO_3^{2-}$. Additionally, the one or more buffers may be used to protect the ion-selective solid electrolyte membrane. Further, the migrated predetermined metal ion may be Li+, and/or the second solution may comprise at least one LiOH precipitate. Still yet, the second solution may comprise $H_2O$, where the $H_2O$ may be configured to facilitate the LiOH precipitate formation. The $H_2O$ may function as a reagent.

In various embodiments, the second solution may comprise at least one ether. In other embodiments, the second solution may comprise alcohols, organic carbonates, esters, and/or ketones. Additionally, the precursor solution may include an electroactive solute. The cathode and the anode each may include an electronically conductive substrate made of at least one of: graphite, CNO, graphene, Pt, Au, Ag, Ti, Cu, Al, or stainless steel.

In various embodiments, the at least one active material may comprise an electrode slurry casted on a current collector. The cathode may include a catalyst electrically coupled with an electrically conductive substrate of the cathode. Additionally, the anode may include a catalyst electrically coupled with an electrically conductive substrate of the anode.

In various embodiments, input energy used to migrate the predetermined metal ion may be saved and recovered, at least in part, as electrochemical energy of the migrated predetermined metal ion at the cathode. Additionally, the input energy may correspond with an electric charge process and the electrochemical energy may correspond with an electric discharge process. Further, the recovery of the input energy may reduce a carbon footprint of a manufacturing facility.

Figure 20:
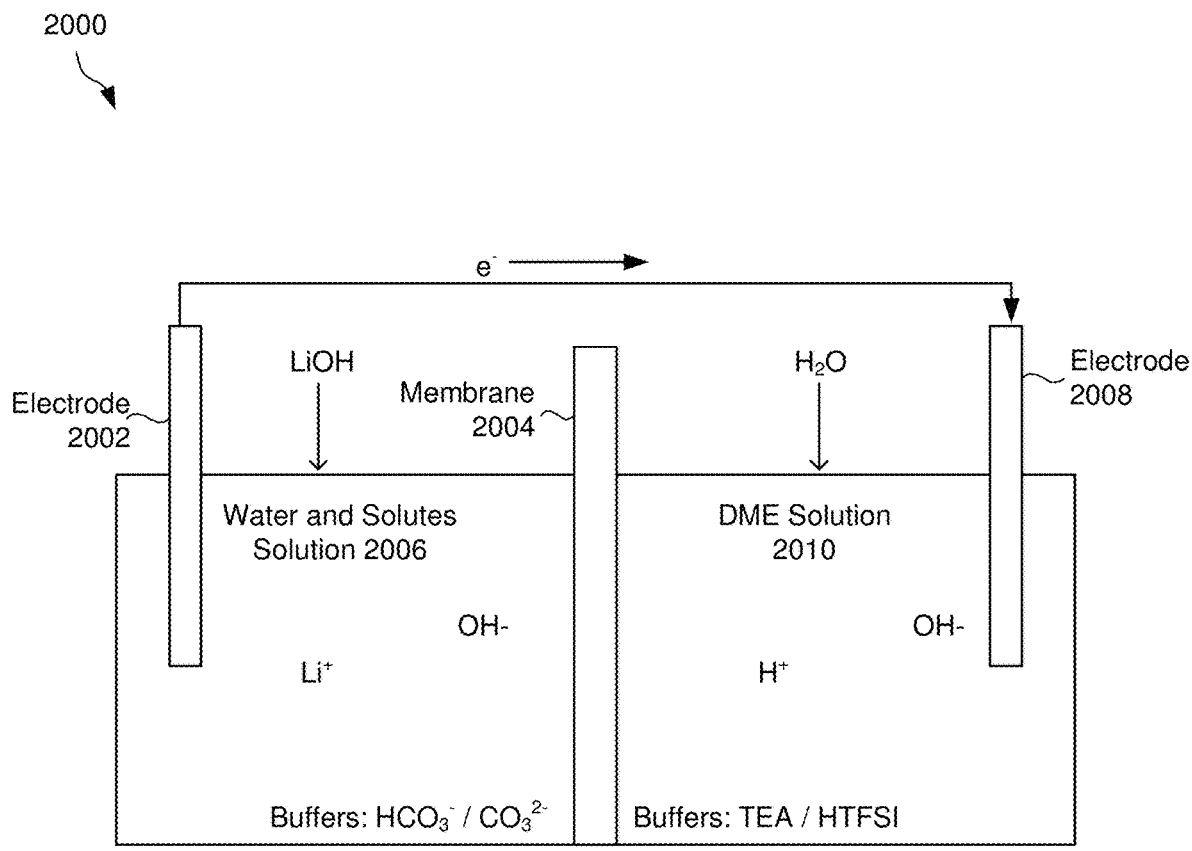
FIG. 20 illustrates redox electrode modules being set up for metal salt precipitation, in accordance with one embodiment.

FIG. 20 illustrates redox electrode modules 2000 being set up for metal salt precipitation, in accordance with one embodiment. As an option, the redox electrode modules 2000 may be implemented in the context of any one or more of the embodiments set forth in any previous and/or subsequent figure(s) and/or description thereof. Of course, however, the redox electrode modules 2000 may be implemented in the context of any desired environment. Further, the aforementioned definitions may equally apply to the description below.

As shown, anode electrode 2002 may be comprised of platinum, and cathode electrode 2008 comprised of copper. The anode electrode 2002 may be in contact with a water and solutes solution 2006 and the cathode electrode 2008 may be in contact with a dimethoxyethane (DME) solution 2010. By design, a current may pass from the anode to the cathode and lithium ions (Li+) may simultaneously pass from the water and solutes solution 2006 through a LATP/epoxy membrane 2004 to the Dimethoxyethane (DME) solution 2010. It should be noted that, in order to prevent corrosion and degradation of the effectiveness of the LATP/epoxy membrane 2004, suitable buffers may be used to coat the LATP/epoxy membrane 2004 in the case of contact with both the water and solutes solution 2006 and Dimethoxyethane (DME) solution 2010. By way of example, the compound used to comprise the buffer in the water and solutes solution 2006 may include bicarbonate ($HCO_3^-$) and/or Carbonate ion ($CO_3^{2-}$). Conversely, the compound used to comprise the buffer in the dimethoxyethane (DME) solution 2010 may include triethylamine (TEA) and/or bis(trifluoromethanesulfonyl)imide (HTFSI).

Figure 21:
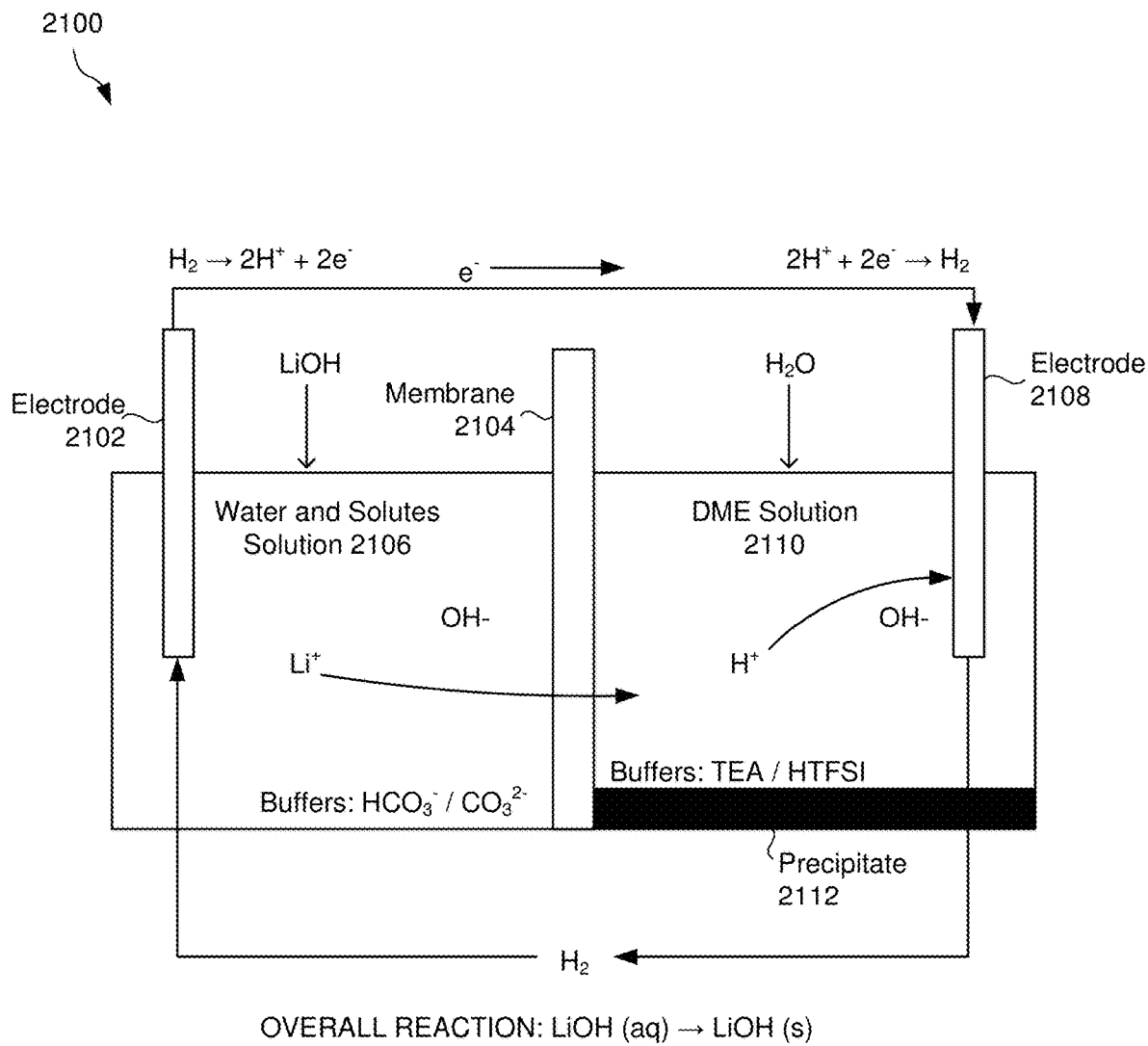
FIG. 21 illustrates redox electrode modules for metal salt precipitation during reaction, in accordance with one embodiment.

FIG. 21 illustrates redox electrode modules 2100 for metal salt precipitation during reaction, in accordance with one embodiment. As an option, the redox electrode modules 2100 may be implemented in the context of any one or more of the embodiments set forth in any previous and/or subsequent figure(s) and/or description thereof. Of course, however, the redox electrode modules 2100 may be implemented in the context of any desired environment. Further, the aforementioned definitions may equally apply to the description below.

As shown, anode electrode 2102 may be comprised of platinum and cathode electrode 2108 may be comprised of copper. The anode electrode 2102 may be in contact with a water and solutes solution 2106, and the cathode electrode 2108 may be in contact with a dimethoxyethane (DME) solution 2110. In operation, a current may pass from the anode electrode 2102 to the cathode electrode 2108 and lithium ions (Li+) may simultaneously pass from the anode containing the water and solutes solution 2106 through a LATP/epoxy membrane 2104 to the cathode comprised of the dimethoxyethane (DME) solution 2110. Additionally, lithium hydroxide atoms present in the water and solutes solution 2106 may break apart into positively-charged lithium ions and negatively-charged hydroxide (OH−) atoms. Further, the lithium ions may then be drawn across the LATP/epoxy membrane 2104 into the dimethoxyethane (DME) solution 2110 where they may recombine with hydroxide atoms to reform into additional lithium hydroxide atoms, thus yielding a high concentration of lithium hydroxide in the dimethoxyethane (DME) solution 2110 resulting in the formation of a concentrated precipitate salt 2112 upon completion of the precipitation process. Further still, the precipitation process may simultaneously combine the actions of oxidation of $H_2$ at the anode electrode 2102, forming $H^+$ waste and reduction of $H^+$ at the cathode electrode 2108, forming $H_2$ (sent to the anode).

It should be noted that, in order to prevent corrosion and degradation of the effectiveness of the LATP/epoxy membrane 2104, suitable buffers may be used to coat the LATP/epoxy membrane 2104 in the case of contact with both the water and solutes solution 2106 and dimethoxyethane (DME) solution 2110. By way of example, the compound used to comprise the buffer in the water and solutes solution 2106 may include, but not be limited to, bicarbonate ($HCO_3^-$) and/or Carbonate ion ($CO_3^{2-}$). Conversely, the compound used to comprise the buffer in the Dimethoxyethane (DME) solution 2110 may include Triethylamine (TEA), and/or bis(trifluoromethanesulfonyl)imide (HTFSI).

In one embodiment, a net result of the completed reaction process may yield a concentrated precipitate salt 2112 in the form of a mass of lithium hydroxide (LiOH) solid.

It is acknowledged that conventional removal of an ionic species from solution, particularly an aqueous solution, may be a complex and expensive process due to the high amounts of energy and time required to remove water by methods such as boiling, evaporation, and/or centrifugation. Known industrial methods include manipulation of temperature, either to induce precipitation of the target species or to remove the solvent, manipulation of evaporation rate, either by altering temperature, humidity, or pressure of the system, or addition of kinetic energy, such as via centrifugation. All these methods typically require either a long time or a high amount of energy and add to complexity of processes. In addition, in the context of traditional chemical processes, the introduction of an additional liquid phase, such as in water/organic extraction, and the precipitation of a solute by addition of a second solvent, can be used. The former is only applicable to some chemicals, particularly organic acids/bases, while the latter requires either a large amount of second (typically organic) solvent as a consumable, or additional processing to remove the second solvent. As such, a process for removing highly soluble salts, such as lithium chloride (LiCl) and/or lithium hydroxide (LiOH), may make the precipitation process much less expensive, and thus enable additional potential applications. It should be noted that such a process may also significantly reduce the energy required, which may also realize the added benefit of decreasing the carbon footprint of the facility.

In various embodiments, the redox electrode modules 2100 may be used for precipitation of an ionic compound. Such an application may be, in particular, for those solutions with a high solubility in water and that contain an alkali metal cation. Additionally, the solutions may consist of a feed solution containing a precursor ionic compound (which in turn may contain the alkali metal cation of the salt that the system is designed to precipitate). In one embodiment, the precursor ionic compound may be lithium hydroxide or any other ionic compound containing Li+, which is the alkali metal cation that the system is designed to precipitate. It is acknowledged that although lithium is focused on as the desired mineral to be extracted and precipitated, other critical minerals may, in like manner, be extracted and precipitated.

In another embodiment, the precursor ionic compound and/or target ionic compound may have a high solubility in the feed solution, the solvent for which may be water, an alcohol, a carbonate, an ether, a hydrocarbon, and/or a liquid metal solution. Additionally, the system may comprise a second solution containing a target anion, which may be identical to or different from the anion of the precursor compound. Additionally, in one embodiment, the solvent for the second solution may be selected such that the target compound that the system may be designed to precipitate at low solubility. For example, the solvent for the second solution may be water, an alcohol, a carbonate, an ether, a hydrocarbon, or a liquid metal solution. In one embodiment, the system may be designed to precipitate a salt containing the target anion.

The system for precipitation of an ionic compound may also comprise a solid electrolyte membrane, which may serve as a barrier for the precursor solution and nonvolatile solution and selectively transport lithium in the form of lithium ions through the membrane. Additionally, the solid electrolyte membrane may contain an ion-selective solid, such as lithium aluminum titanium phosphate, lithium aluminum germanium phosphate and/or any other member of the NASICON-type solid electrolyte structure family. As discussed herein, the solid electrolyte membrane may be constructed to be ion-specific in selectively allowing a predesignated ion to pass.

The system for precipitation of an ionic compound may also comprise an alkali metal cation or H+ initially dissolved in the feed solution. Additionally, the alkali metal cation may also ultimately be the salt that the system is designed to precipitate. In like manner, the system may also comprise a target anion initially dissolved in the second solution, the salt for which the system is designed to precipitate.

The system for precipitation of an ionic compound may also comprise a first electroactive solute, which can be oxidized and donate electrons for the system and may be a single solute or set of solutes that undergo electrochemical reactions. Such reactions may include electrons as a product, based on one or more of hydrogen gas, hydroxide, a chloride ion, a bromide ion, and/or an iodide ion. Additionally, the system may comprise a second electroactive solute, which can be reduced and receive electrons from the system. Such second electroactive solute may include a single solute or set of solutes that undergo electrochemical reactions in which electrons are a reactant, based on one or more of oxygen gas, a hydrogen ion, water, chlorine, bromine, and/or iodine.

The system for precipitation of an ionic compound may also comprise a first buffer which may be dissolved in the feed solution and may be comprised of a set of multiple solutes that together maintain a pH of the solution within a desired range (such as pH 7 or any desired level). Additionally, the system may comprise a second buffer, which may be dissolved in the second solution and may comprise a set of multiple solutes that together maintain the pH of the solution within a desired range (such as pH 7 or any desired level). In addition, a buffering system with two components may contain a base, whose conjugate acid (for example, triethylamine (TEA), and/or an acid, etc.) may form a substance that when combined with the target anion, or any other anion found in the second solution, may be soluble in the second solution during operation of the system, whose conjugate base (for example, (bis(trifluoromethylsulfoniminic) acid (HTFSI), etc.) may form a substance that when combined with the target alkali metal cation or H+, or any other cation found in the second solution, may be soluble in the second solution during operation of the system. It should be noted that either the conjugate acid of the base or the acid may have a moderate pKa, (such as a pH of around 7).

The system for precipitation of an ionic compound may also comprise an anode, immersed in a feed solution consisting of an electronically conductive substrate, such as a metal, metalloid, or carbon-based material, an active material (optional). The feed solution may be electronically in contact with the electronically conductive substrate and may undergo a chemical reaction with the first electroactive solute, and/or a catalyst (optional). The feed solution may further be in contact with the electronically conductive substrate and, when utilized, may lower the activation energy/overpotential of the oxidation of the first electroactive solute.

In one embodiment, the electronically conductive substrate may be a sheet, a rod, and/or a sphere immersed in the solution. Additionally, the substrate may be selected such that the reduction potential of the material is higher than that of the first electroactive solute. The first electrode may include, but not be limited to graphite, cyanate, graphene, platinum, gold, silver, titanium, copper, aluminum, and/or stainless steel. In another embodiment, the catalyst may be comprised of platinum, gold, silver, iridium, iron, ruthenium, rhodium, and/or palladium.

The system for precipitation of an ionic compound may also comprise a cathode immersed in the second solution further comprised of an electronically conductive substrate. The electronically conductive substrate may include, but not be limited to a metal, metalloid, or carbon-based material that may be a sheet, a rod, and/or a sphere, and may be immersed in the solution. In addition, the electronically conductive substrate may be selected such that the reduction potential of the material is higher than that of the second electroactive solute. Additionally, the system may comprise an active material (optional), which may be electronically in contact with the electronically conductive substrate and, when utilized, may react with the second electroactive solute. Further, the system may comprise a catalyst (optional), which may be in contact with the electronically conductive substrate and, when utilized, may lower the activation energy/overpotential of the oxidation of the second electroactive solute.

In one embodiment, the electronically conductive substrate may be comprised of, but not limited to, graphite, cyanate, graphene, platinum, gold, silver, titanium, copper, aluminum, and/or stainless steel. In a related embodiment, the catalyst may be comprised of platinum, gold, silver, iridium, iron, ruthenium, rhodium, and/or palladium.

In operation, the process for precipitation of an ionic compound may comprise transferring current from the anode to the cathode, which may result in selective transport of the alkali metal cation or a Hydrogen ion from a first solution, through the solid electrolyte membrane, and into a second solution. In addition, the process may include oxidation of the first electroactive species at the anode and reduction of the second electroactive species at the cathode. Additionally, the process may include transport of gaseous products from one electrode to another. In one embodiment, the terms anode and cathode may both be referred to as electrodes.

In further operation, the process for precipitation of an ionic compound may comprise a change in relative concentration of the buffering species of the first buffer and the second buffer, which may maintain the pH of the feed and second solutions. Additionally, the process may include precipitation of target salt, which may occur due to, in one embodiment, low solubility of the salt in the second solution, thus resulting in a precipitated salt formed in the bottom of the second solution.

In one embodiment, an active material may be an electrode slurry applied to a current collector. In another embodiment, additional solutions may be added to the system, wherein the additional solutions may be situated between the feed and second solution and separated by any other solutions via ion-selective solid electrolyte membranes.

In still another embodiment, a system for circulating any gaseous species formed at either the cathode or anode may be used to partially reclaim the energy input required for the system. Additionally, a second system of solutions and/or ionically selective solid electrolyte membranes may be used to recycle any gaseous species formed at either the cathode or anode.

It is to be appreciated that the system may be used in conjunction with any other membrane-assisted system, such as those used for selective extraction of alkali metal ions or hydrogen ions from a feed solution, an ion-exchange system, a system for the production of lithium metal via electrolysis (solid metal production), and/or a system for purification of alkali metal ions. This can be configured in such a way where all processes take place in series and only a single anode or cathode may be used to run all processes simultaneously.

Figure 22:
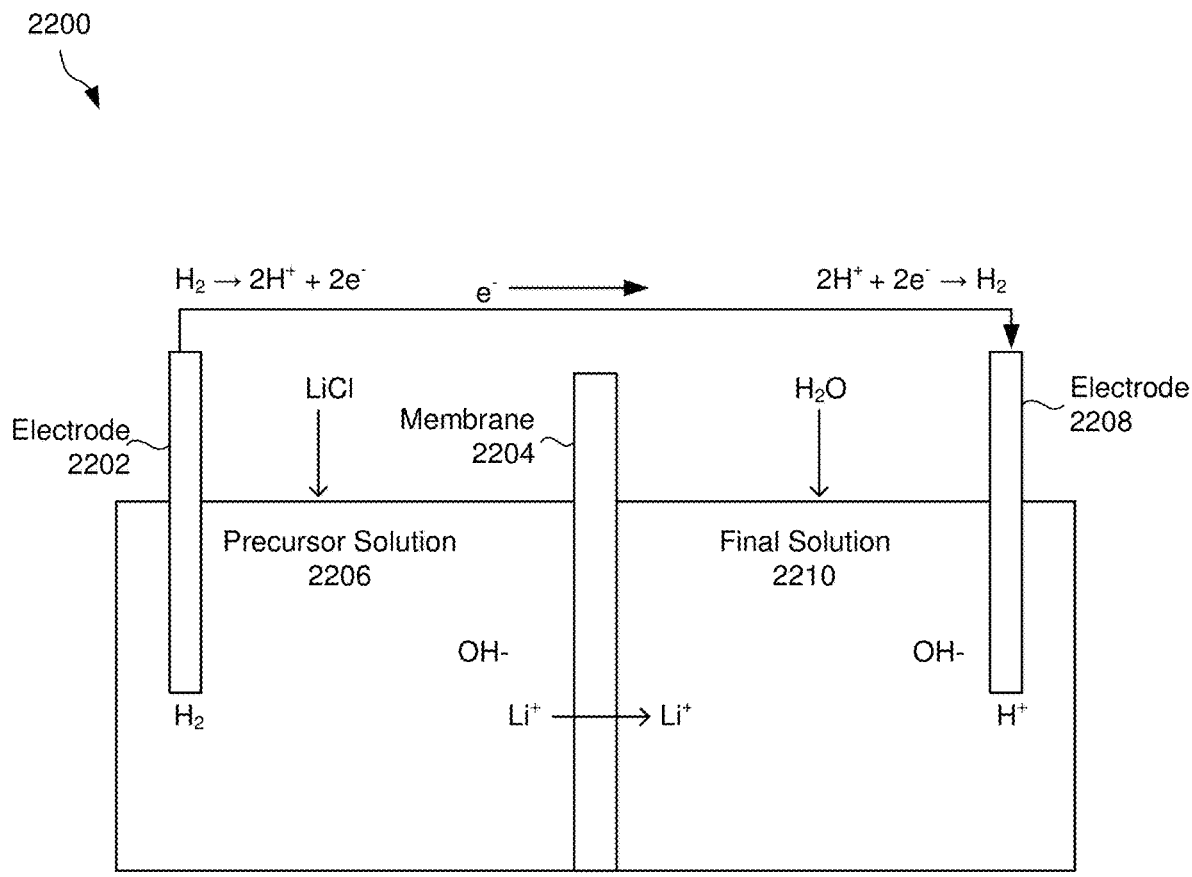
FIG. 22 illustrates redox electrode modules for ion exchange, in accordance with one embodiment.

FIG. 22 illustrates redox electrode modules 2200 for ion exchange, in accordance with one embodiment. As an option, the redox electrode modules 2200 may be implemented in the context of any one or more of the embodiments set forth in any previous and/or subsequent figure(s) and/or description thereof. Of course, however, the redox electrode modules 2200 may be implemented in the context of any desired environment. Further, the aforementioned definitions may equally apply to the description below.

As shown, lithium ions ($Li^+$) may pass from an anode comprised of aqueous precursor solution 2206 through a solid electrolyte membrane 2204 to a cathode comprised of an aqueous final solution 2210. In operation, lithium hydroxide (LiOH) atoms present in the aqueous precursor solution 2206 may break apart into positively-charged lithium ions and negatively-charged hydroxide (OH–) atoms. In addition, the lithium ions may then be drawn across the electrolyte membrane 2204 into the aqueous final solution 2210 where they may recombine with hydroxide atoms to reform into additional lithium hydroxide atoms, thus yielding a higher concentration of lithium hydroxide in the aqueous final solution 2210 upon completion of the ion exchange process. Further, the ion exchange process may simultaneously combine the actions of reduction of $H^+$ at a cathode electrode 2208, forming $H_2$ (sent to an anode), and oxidation of $H_2$ at the anode electrode 2202, forming $H^+$ in the precursor solution 2206.

In one embodiment, redox electrode modules 2200 may relate to a membrane-based ion exchange system. In use, an ion exchange system includes an anode, and a cathode, where the anode is configured for oxidation and the cathode is configured for reduction. Additionally, migration of a predetermined alkali metal cation through an ion-selective solid electrolyte membrane is driven by a current across the anode and the cathode. Further, the ion-selective solid electrolyte membrane may be selectively permeable to the predetermined alkali metal cation. The ion exchange system further includes a first active material associated with the anode, a second active material associated with the cathode, an anolyte solution comprising the predetermined alkali metal cation and a first anion, and a catholyte solution comprising the migrated predetermined alkali metal cation and a second anion, where the migrated predetermined alkali metal cation and the second anion are configured to combine to form a dissolved salt in the catholyte solution.

In various embodiments, the catholyte solution may include $H_2O$ or HCl. Additionally, the $H_2O$ or the HCl may be added at the same rate at which the predetermined alkali metal cation passes through the ion-selective solid electrolyte membrane. The catholyte solution may comprise the $H_2O$ or the HCl as a reagent. Further, the formation may be based on a reduction of LiOH.

In various embodiments, the second anion may comprise a hydroxyl group, the predetermined alkali metal cation may comprise $Li^+$, and the first anion may differ from the second anion. Additionally, the first anion and/or the second anion may include one or more of: $CO_3^{2-}$, $HCO_3^-$, $NO_3^-$, $PO_4^{3-}$, $OH^-$, $Cl^-$, $Br^-$, or I. Further, the anolyte solution and the catholyte each independently may comprise a solvent comprising one or more of: water, alcohol, ester, ether, carbonate, or hydrocarbon.

In various embodiments, the first active material includes one or more of: $H_2$, $H_2O$, $OH^-$, $Cl^-$, $Br^-$, or $I^-$; and the second active material may include one or more of: $H^+$, $H_2O$, $O_2$, $Cl_2$, $Br_2$, or $I_2$. Further, the ion exchange system may include a buffer in one or more of the anolyte and the catholyte. Additionally, a second ion-selective solid electrolyte membrane may be configured to selectively allow passage of the migrated predetermined alkali metal cation, and a third solution may include the allowed migrated predetermined alkali metal ion.

In various embodiments, the dissolved salt may be an alkali metal salt, and a purity of the alkali metal salt in the catholyte may be less than a purity of the dissolved salt in the third solution. Additionally, the alkali metal salt may be insoluble in the third solution.

In various embodiments, input energy used to migrate the predetermined metal alkali ion may be saved and recovered, at least in part, as electrochemical energy of the migrated predetermined metal alkali ion at the cathode. Additionally, the input energy may correspond with an electric charge process and the electrochemical energy may correspond with an electric discharge process. Further, the recovery of the input energy may reduce a carbon footprint of a manufacturing facility.

Figure 23:
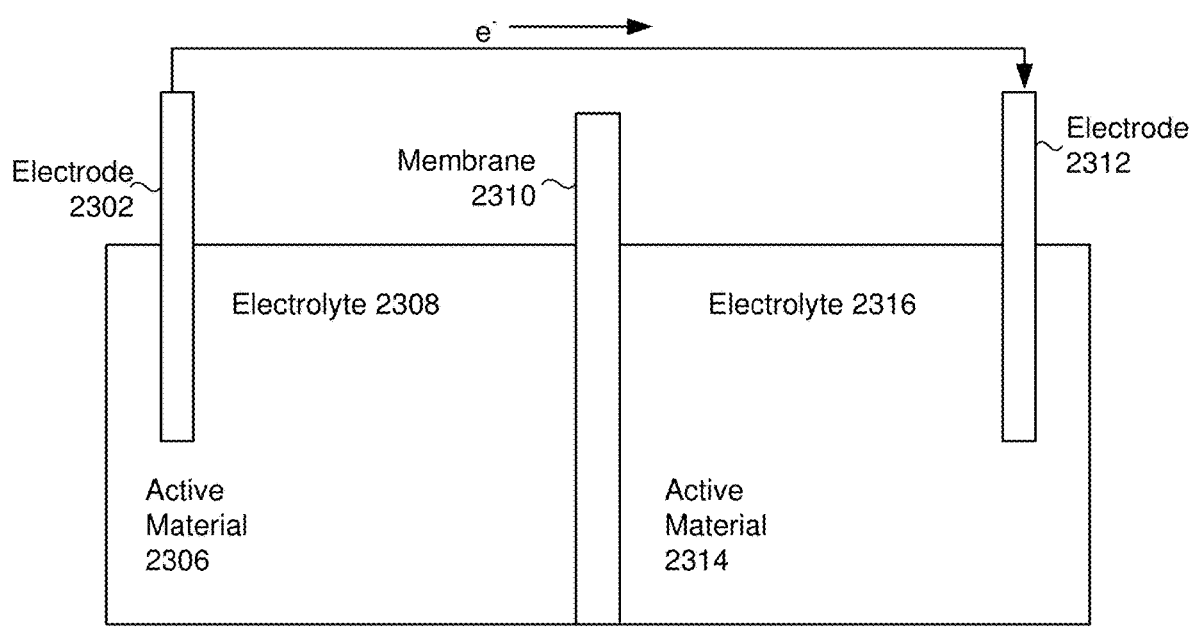
FIG. 23 illustrates a membrane separation system, in accordance with one embodiment.

FIG. 23 illustrates a membrane separation system 2300, in accordance with one embodiment. As an option, the membrane separation system 2300 may be implemented in the context of any one or more of the embodiments set forth in any previous and/or subsequent figure(s) and/or description thereof. Of course, however, the membrane separation system 2300 may be implemented in the context of any desired environment. Further, the aforementioned definitions may equally apply to the description below.

As shown, an ion-selective solid electrolyte membrane 2310 separates anode electrolyte 2308 containing an active material 2306 from cathode electrolyte 2316 containing another active material 2314 in an exemplary system. In addition, anode electrode 2302 and cathode electrode 2312 may be in contact with anode electrolyte 2308 and anode electrolyte 2316 within the exemplary system, respectively.

In one embodiment, the ion-selective solid electrolyte membrane 2310 may facilitate various ion-oriented processes including, but not limited to purification, salt precipitation, ion exchange, ion extraction, and/or electrolysis. In a related embodiment, the ion-selective solid electrolyte membrane 2310 may comprise two or more layers of membrane to help control various aspects of ion-oriented processes including, but not limited to, increased purity of allowable ion transfer and/or rate of reaction. Additionally, the membrane separate system 2300 may be further configured as needed, including having three solutions (similar to a configuration found in FIG. 15), depending on the needs of the input feed(s), and the needs of the output. For example, a three solution separation system (such as that found in FIG. 15) may be more efficient, in one embodiment, for an assembly for continuous processing.

Figure 24:
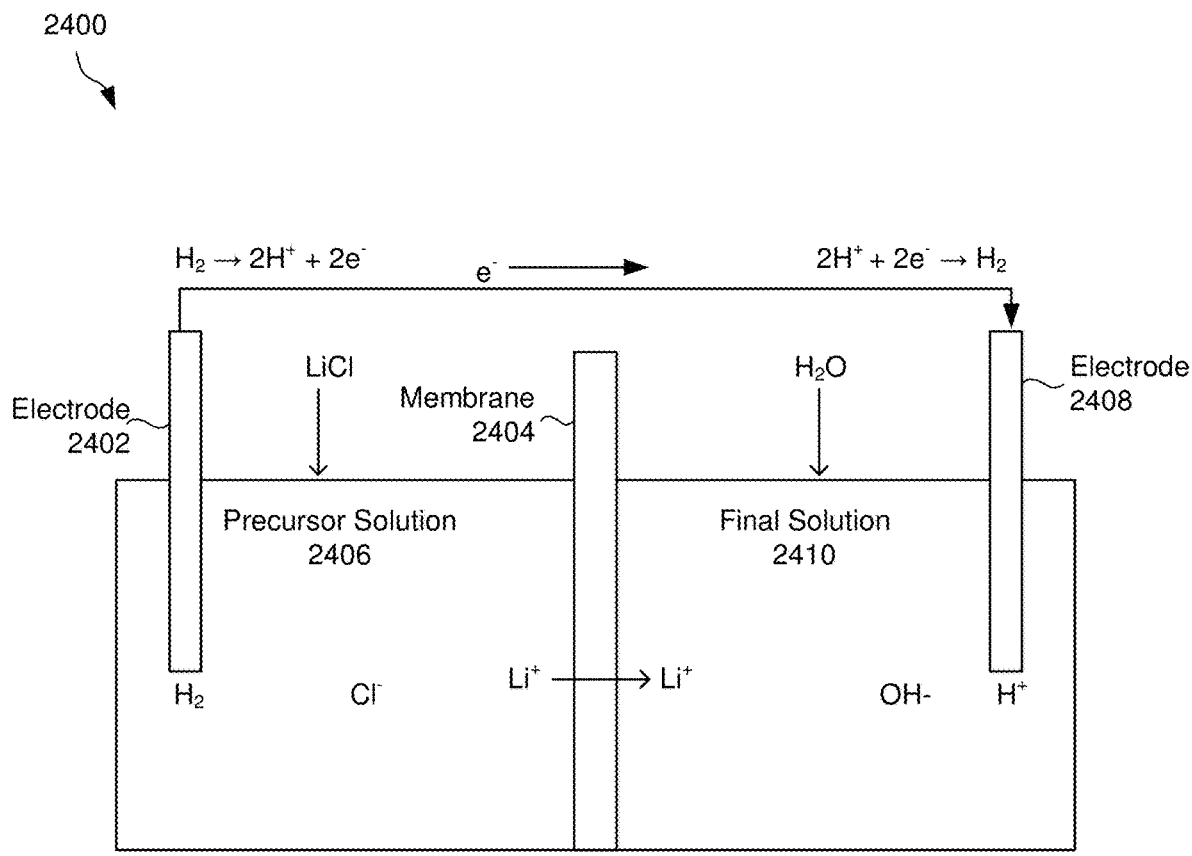
FIG. 24 illustrates redox electrode modules for ion exchange, in accordance with one embodiment.

FIG. 24 illustrates redox electrode modules 2400 for ion exchange, in accordance with one embodiment. As an option, the redox electrode modules 2400 may be implemented in the context of any one or more of the embodiments set forth in any previous and/or subsequent figure(s) and/or description thereof. Of course, however, the redox electrode modules 2400 may be implemented in the context of any desired environment. Further, the aforementioned definitions may equally apply to the description below.

As shown, lithium ions ($Li^+$) may pass from an anode comprised of aqueous precursor solution 2406 through a solid electrolyte membrane 2404 to a cathode comprised of an aqueous final solution 2410. In operation, lithium hydroxide (LiOH) atoms present in the aqueous precursor solution 2406 may break apart into positively-charged lithium ions and negatively-charged hydroxide (OH−) atoms. In addition, the lithium ions may then be drawn across the electrolyte membrane 2404 into the aqueous final solution 2410 where they may recombine with hydroxide atoms to reform into additional lithium hydroxide atoms, thus yielding a higher concentration of lithium hydroxide in the aqueous final solution 2410 upon completion of the ion exchange process. Further, the ion exchange process may simultaneously combine the actions of reduction of $H^+$ at a cathode electrode 2408, forming $H_2$ (sent to an anode), and oxidation of $H_2$ at the anode electrode 2402, forming $H^+$ in the precursor solution 2406.

In conventional systems, cations and/or anions may be exchanged by the use of ion-exchange resins. However, use of these resins may limit the extent of ion exchange (i.e., the resulting materials are less pure than they could be). Additionally, ion exchange resins for lithium, specifically, are far less successful compared to other ions. In contrast, the processes detailed herein enable enabling the ability to exchange cations and/or anions of various ionic compounds, including lithium compounds, in a cost-effective and highly-selective, complete manner which can simplify the processing of a wide range of materials, reduce costs, and allow for a wider range of material precursors to fit into current processes that require specific cations and/or anions.

In one embodiment, a system for ion exchange of ionic compounds containing an alkali metal cation may comprise two electrodes including a carbon rod with a platinum catalyst on the anode side and a carbon or metal rod and/or mesh on the cathode side, two active materials (including, but not limited to hydrogen on the anode side and hydrogen ions on the cathode side, etc.), two liquid electrolytes (including but not limited to an anode electrolyte, anolyte, containing a solvent like water), a cation (including but not limited to hydrogen ions, lithium ions, sodium ions, potassium ions, etc.), anions (including but not limited to carbonate, bicarbonate ($HCO_3^-$), nitrate ($NO_3^-$), phosphate ($PO_4^{3-}$), hydroxide, chlorine ions, bromine ions, iodine ions, etc.), a buffer (optional), and/or feed salt dissolved in the solvent, a cathode liquid electrolyte (catholyte) containing a solvent like water, a final anion (which is the desired target product of the ion exchange system), an ion-selective solid electrolyte membrane (including solid electrolyte particles such as but not limited to lithium, aluminum, titanium phosphate, lithium aluminum, germanium phosphate, NASICON, potassium Ferrate ($K_2Fe_4O_7$), etc.), a matrix of epoxy and/or polymers, and mechanical fillers like carbon and/or ceramic particles.

In one embodiment, the anode active material may include, but not be limited to, hydroxide, chlorine ions, bromine ions, and/or iridium ions. In a related embodiment, the cathode active material may include, but not be limited to, oxygen, chlorine, bromine, and/or iodine. In another embodiment, the anolyte may include, but not be limited to, alcohols, esters, ethers, carbonates, and/or hydrocarbons. In yet another embodiment, the feed salt may be the source of one or more of the cations, anions, the buffer, and/or anode active material. In still another embodiment, the catholyte may also include, but not be limited to, alcohols, esters, ethers, carbonates, and/or hydrocarbons. In one embodiment, the final anion may be in the form of an acid (for example, if the final anion is bromine ions, then hydrogen bromide (HBr) may be dissolved in the liquid electrolyte to provide bromine ions, etc.). In a related embodiment, the final anion may be the source of one or more of the anions, buffer, and/or cathode active material.

In operation, the process for ion exchange of ionic compounds containing an alkali metal cation may include passing current from the anode to cathode, which may result in reduction of the cathode active material and oxidation of the anode active material. This current may also cause a spontaneous migration of the target cations (e.g., lithium ions) across the solid electrolyte membrane from the anolyte to the catholyte, resulting in the catholyte (which may initially contain the "final anion") containing a dissolved salt of the alkali metal cation and target anion.

In one embodiment, the process for ion exchange of ionic compounds containing an alkali metal cation may be performed in series or in parallel with other separation processes using the ion-selective solid electrolyte membrane, such as alkali metal purification, direct lithium extraction, salt precipitation, or alkali metal production. In another embodiment, if the product at the cathode is a gas (such as hydrogen, for example), the product may be transferred to the anode and function as the active material, thereby enabling partial recovery of the energy required to drive the cathode side reaction.

Figure 25:
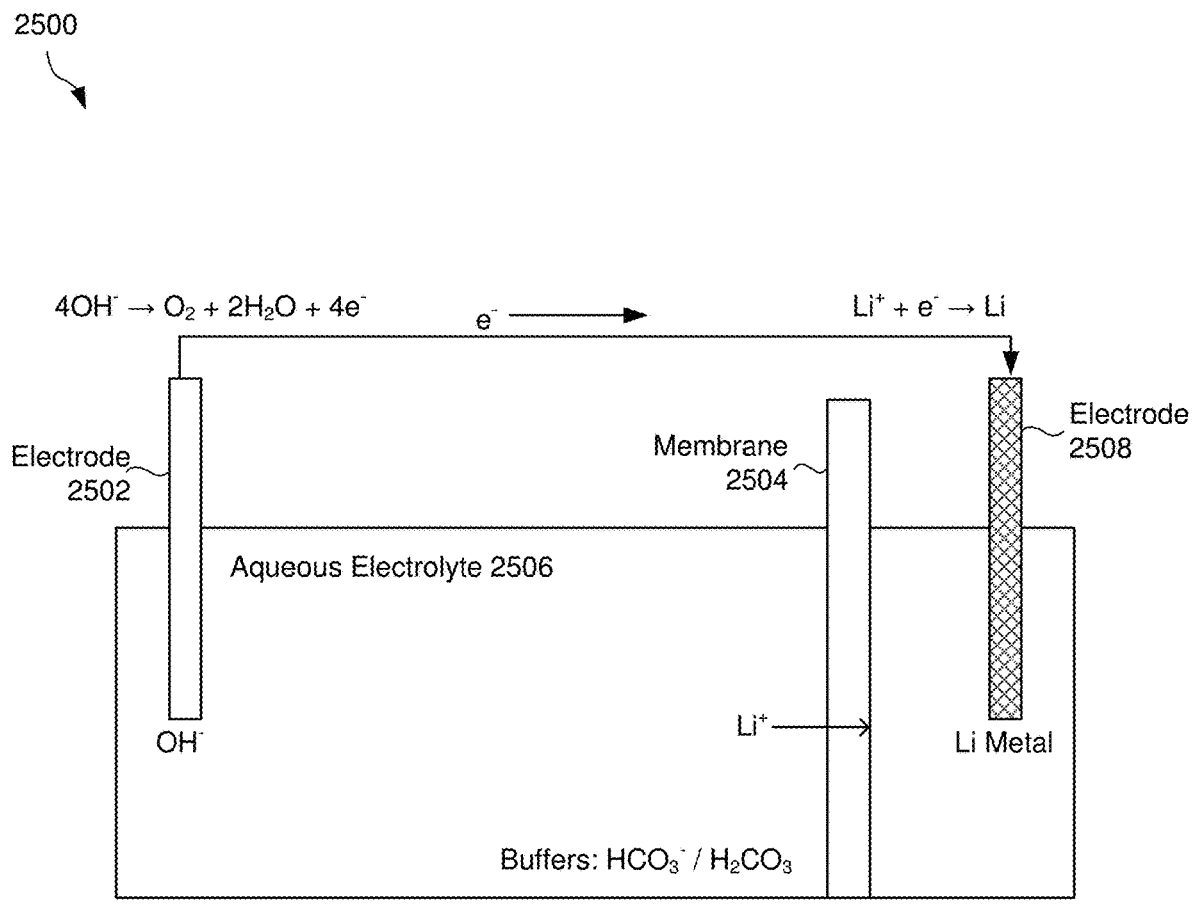
FIG. 25 illustrates membrane-based alkali metal production, in accordance with one embodiment.

FIG. 25 illustrates membrane-based alkali metal production 2500, in accordance with one embodiment. As an option, the membrane-based alkali metal production 2500 may be implemented in the context of any one or more of the embodiments set forth in any previous and/or subsequent figure(s) and/or description thereof. Of course, however, the membrane-based alkali metal production 2500 may be implemented in the context of any desired environment. Further, the aforementioned definitions may equally apply to the description below.

As shown, lithium ions ($Li^+$) may pass from an anode comprised of aqueous electrolyte 2506 through a solid electrolyte membrane 2504 to a cathode comprised of an alkali metal—in this instance, lithium metal. In operation, lithium hydroxide atoms present in the aqueous electrolyte 2506 may break apart into positively-charged lithium ions and negatively-charged hydroxide ($OH^-$) atoms. In addition, the lithium ions may then be drawn across the electrolyte membrane 2504 to the cathode containing the aggregated alkali metal (such as Li+ metal). Additionally, the alkali metal production may simultaneously combine the actions of reduction of $Li^+$ at a cathode electrode 2508, forming lithium metal, and oxidation of OH− at the anode electrode 2502, forming $O_2$ and/or $H_2O$ waste. Further, to prevent corrosion and degradation of the effectiveness of the solid electrolyte membrane 2504, a suitable buffer may be used to coat the solid electrolyte membrane 2504 in the case of contact with the aqueous electrolyte 2506. By way of example, the compound used to comprise the buffer in the aqueous electrolyte 2506 may include bicarbonate ($HCO_3^-$) and/or carbonic acid ($H_2CO_3$).

In one embodiment, the resulting alkali metal may be in solid and/or liquid metal form upon completion of the alkali metal production process.

In one embodiment, the membrane-based alkali metal production 2500 may relate to a membrane-based alkali metal production system. In use, an alkali metal production system includes an anode, and a cathode, where the anode is configured for oxidation and the cathode is configured for reduction. Additionally, migration of a predetermined metal ion through an ion-selective solid electrolyte membrane is driven by a current across the anode and the cathode. Further, the ion-selective solid electrolyte membrane is selectively permeable to the predetermined metal ion. The alkali metal production system further includes at least one active material, a first solution comprising an aqueous electrolyte (where the aqueous electrolyte includes the predetermined metal ion), and a second solution comprising a metal atom based on the migrated predetermined metal ion, wherein the second solution is at least partially disposed in a liquid state of the metal atom.

In various embodiments, the at least one active material includes a hydroxyl group for the anode, and/or the at least one active material includes lithium metal for the cathode. Additionally, the liquid state is a molten solution of the metal atom.

In various embodiments, the anode is a carbon rod, and/or the carbon rod includes a Pt catalyst. Additionally, the cathode may comprise a carbon rod or mesh, or a metal rod or mesh. Further, the at least one active material for the anode may include at least one of: $H_2$, $OH^-$, $Cl^-$, $Br^-$, or I.

In various embodiments, the at least one active material for the cathode may include a liquid metal. The liquid metal may within the temperature range of 25° C.-250° C. Additionally, the liquid metal may be configured to form a molten alloy with lithium. The liquid metal may include one of: Ga, Ga—In, Na—K alloys, Na—K—Cs alloys, or Ga—In—Sn alloys.

In another embodiment, a system for alkali metal production is provided, which includes a first electrode, a first electrolyte comprising an alkali metal salt, where the first electrolyte is configured to be in contact with the first electrode, and a second electrode, where when a current is passed from the first electrode to the second electrode, the current causes migration of an alkali metal ion of the alkali metal salt. Additionally, an ion-selective solid electrolyte membrane is configured to selectively allow the alkali metal ion to migrate. A second solution includes an alkali metal atom based on the migrated alkali metal ion and galinstan (i.e. Ga—In—Sn alloy). Additionally, the system includes a third electrode, where when a second current passed from the second electrode to the third electrode, the second current causes second migration of the alkali metal atom of the second solution. A second ion-selective solid electrolyte membrane is configured to selectively allow the alkali metal atom to migrate, and a third solution includes the second migrated alkali metal atom.

In various embodiments, the second migrated alkali metal atom may be in a molten state. Additionally, the migration may occur at ambient conditions, and/or the second migration may occur at controlled conditions, wherein the controlled conditions include at least one of: an inert environment, or Ar atmosphere.

In various embodiments, a thickness of the second ion-selective solid electrolyte membrane may be configured to increase a purity of the second migrated alkali metal atom. Additionally, the migration and the second migration may occur concurrently, and/or the migration and the second migration may occur in series or a batch configuration.

In various embodiments, the alkali metal ion may be $Li^+$, and/or the second solution may include lithiated galinstan. Further, the third solution may include only the second migrated alkali metal atom.

Figure 26:
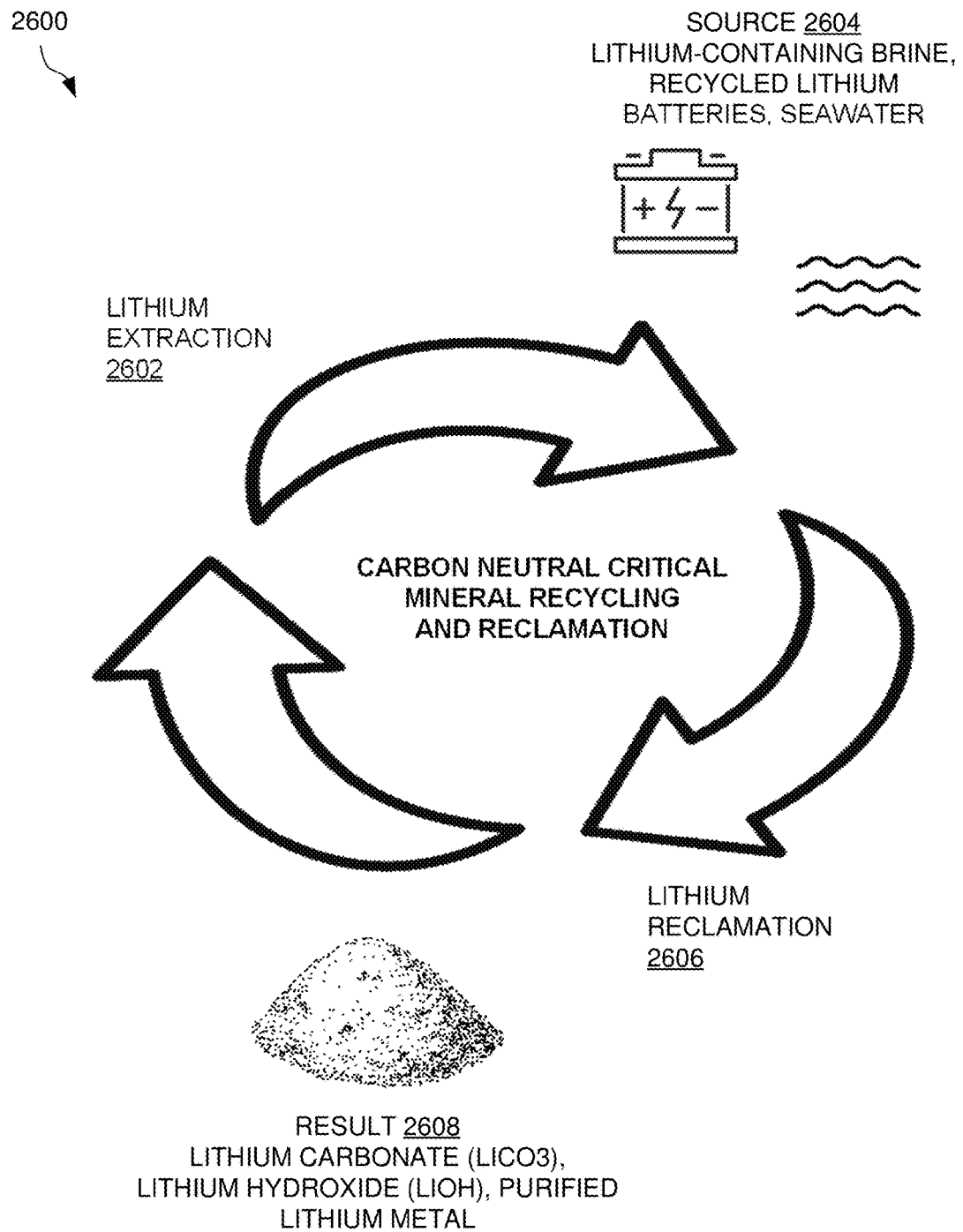
FIG. 26 illustrates a process for carbon-neutral mineral recycling and reclamation.

FIG. 26 illustrates a process 2600 for carbon neutral critical mineral recycling and reclamation, in accordance with one embodiment. As an option, the process 2600 may be implemented in the context of any one or more of the embodiments set forth in any previous and/or subsequent figure(s) and/or description thereof. Of course, however, the process 2600 may be implemented in the context of any desired environment. Further, the aforementioned definitions may equally apply to the description below.

As shown, a process for carbon neutral critical mineral recycling and reclamation 2600 may include cyclical steps including, but not limited to, a critical mineral (in this instance, lithium) source 2604, lithium reclamation 2606, a critical mineral and result 2608, and lithium extraction 2602. In operation, the process 2600 may begin with the lithium source(s) from which lithium metal may ultimately be extracted in the form of lithium-containing brine, recycled lithium batteries, and/or seawater. Additionally, lithium reclamation 2606 subprocesses may be employed to produce resulting materials (the result 2608) including, but not limited to, lithium carbonate ($LiCO_3$), lithium hydroxide (LiOH), and purified lithium metal. In addition, lithium extraction 2602 may be employed to provide raw lithium metal and/or other forms of lithium for use in products and/or processes such as new lithium battery electrolytes for anodes and cathodes, by way of one example. Further, once such new lithium-based products have reached the end of their practical and/or useful life, those products may again become lithium source 2604 materials to initiate another process for carbon neutral critical mineral recycling and reclamation 2600. In this manner, the lithium extraction 2602 and the lithium reclamation 2606 steps may provide for a near carbon neutral system for extracting lithium from sources, and producing a lithium that can be reused. Additionally, although the process 2600 is discussed in particular with respect to lithium, it is to be appreciated that the process 2600 may apply in like manner to any critical mineral.

In one embodiment, the process 2600 may relate to an energy reclamation and carbon-neutral system for critical mineral extraction. In use, a method for critical mineral reclamation includes driving migration of lithium ions using a current passing from an anode to cathode, where the current is driven by a redox configuration of the anode and the cathode. Additionally, the lithium ions are extracted from a first solution into a second solution through an ion-selective solid electrolyte membrane, where the ion-selective solid electrolyte membrane is configured to selectively allow the lithium ions to pass. Further, an input of energy is provided for the extraction, and after the extraction, a reclamation of the lithium ions is caused, where the reclamation recovers at least a portion of the input of energy.

In various embodiments, the reclamation may include converting the lithium ions to lithium carbonate or lithium hydroxide. Additionally, the reclamation may include purifying the lithium ions to a minimum of 99.9% desired lithium salt, or 99.9% lithium trace metals basis. Further, the input of energy may be stored as electrochemical energy of the lithium ions.

In various embodiments, recovering the at least a portion of the input of energy may reduce a carbon footprint of a manufacturing facility. Additionally, the first solution may be based on at least one of lithium minerals, lithium-containing brines, recycled lithium batteries, geothermal brines, salar brines, or seawater.

In various embodiments, the ion-selective solid electrolyte membrane may be water impermeable. Additionally, the reclamation may include transporting the lithium ions from the second solution to a third solution via the ion-selective solid electrolyte membrane, and/or transporting second ions from the third solution to a fourth solution via a second ion-selective solid electrolyte membrane, wherein the transporting of the second ions from the third solution to the fourth solution coincides with the transporting of the lithium ions from the second solution to the third solution. Still yet, extracting the lithium ions from the first solution to the second solution may coincide with an uptake of second ions from a third solution to the first solution.

In various embodiments, the first solution may be a feed solution, the second solution may be an anolyte, a third solution may be a catholyte, and a second ion-selective solid electrolyte membrane may be selectively permeable to sodium. The anolyte may include a lithium electrolyte and the catholyte may include a sodium electrolyte. Additionally, at least one of the anode or the cathode may be made of stainless steel mesh. The extraction of the lithium ions from the first solution to the second solution may coincide with an extraction of sodium ions from the third solution to the first solution, and the reclamation of the lithium ions may include transporting the lithium ions from the second solution to a fourth solution which may coincide with transporting the sodium ions from the fourth solution to the third solution. Further, the transporting of the lithium ions may coincide with an electric discharge of electrochemical energy of the lithium ions.

In various embodiments, the extraction and reclamation may be performed, at least in part, using a lithium module which includes the ion-selective solid electrolyte membrane, the second solution (where the second solution includes a lithium electrolyte), and an active material electrode in direct contact with the second solution. Additionally, the extraction and reclamation may be further performed, at least in part, using a sodium module which includes a second ion-selective solid electrolyte membrane (where the second ion-selective solid electrolyte membrane is sodium selective), a third solution (where the third solution includes a sodium electrolyte), and a second active material electrode in direct contact with the third solution. Further, the lithium module and the sodium module may be configured to be part of a module array, the module array configured to have multiple lithium modules comprising the lithium module, and multiple sodium modules comprising the sodium module.

In various embodiments, the first solution may be a feed solution that flows into the module array and between each of the multiple lithium modules and each of the multiple sodium modules. Additionally, the first solution may be used for the extraction, and a fourth solution may be used for the reclamation, where the first solution differs from the fourth solution, and the fourth solution replaces the third solution after the extraction. Further, the first solution may comprise at least one of lithium minerals, lithium-containing brines, recycled lithium batteries, geothermal brines, salar brines, or seawater, and the fourth solution may comprise a $Na_2CO_3$ feed.

In various embodiments, the multiple lithium modules and the multiple sodium modules may be configured to be connected in, at least one of, series, parallel, or a combination of series and parallel. Further, the extraction and the reclamation may facilitate recycling of lithium ions, which in turn may reduce a carbon footprint of a manufacturing facility and may allow for sustainable reuse of lithium batteries.

Figure 27:
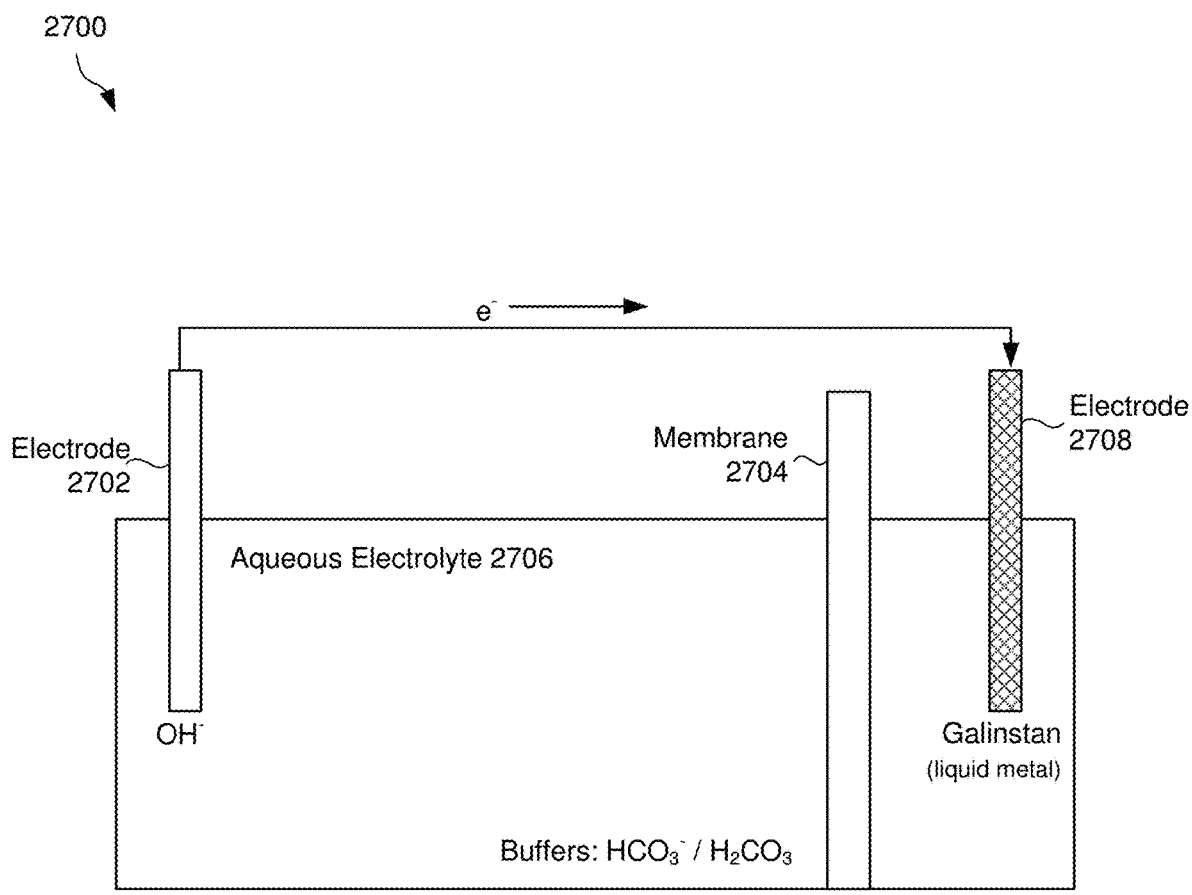
FIG. 27 illustrates membrane-based alkali metal production, in accordance with one embodiment.

FIG. 27 illustrates membrane-based alkali metal production 2700, in accordance with one embodiment. As an option, the membrane-based alkali metal production 2700 may be implemented in the context of any one or more of the embodiments set forth in any previous and/or subsequent figure(s) and/or description thereof. Of course, however, the membrane-based alkali metal production 2700 may be implemented in the context of any desired environment. Further, the aforementioned definitions may equally apply to the description below.

As shown, lithium ions ($Li^+$) may pass from an anode comprised of aqueous electrolyte 2706 through a lithium ion-selective solid electrolyte membrane 2704 to a cathode comprised of lithiated galinstan (Ga—In—Sn) liquid metal. In operation, lithium hydroxide atoms present in the aqueous electrolyte 2706 may break apart into positively-charged lithium ions and negatively-charged hydroxide ($OH^-$) atoms. In addition, the lithium ions may then be drawn across the lithium ion-selective solid electrolyte membrane 2704 into the cathode containing the lithiated galinstan liquid metal. Additionally, the alkali metal production may simultaneously combine the actions of reduction of galinstan at a carbon/metal rod/metal mesh 2708, resulting in the recombination of lithium ions and electrons to form a lithiated galinstan liquid metal, and oxidation of OH– at a carbon rod with Pt catalyst 2702, producing oxygen gas ($O_2$), water ($H_2O$), and electrons. Further, to prevent corrosion and degradation of the effectiveness of the lithium ion-selective solid electrolyte membrane 2704, a suitable buffer may be used to coat the lithium ion-selective solid electrolyte membrane 2704 in the case of contact with the aqueous electrolyte 2706. By way of example, the compound used to comprise the buffer in the aqueous electrolyte 2706 may include bicarbonate ($HCO_3^-$) and/or carbonic acid ($H_2CO_3$).

In various embodiments, conventional lithium precursors may undergo a series of many complex steps to be converted and purified into lithium chloride (LiCl) and may be separated from any associated solution (i.e., dry), which can be expensive, as lithium chloride and other precursors are hygroscopic, making water difficult and expensive to remove. In addition, downs cell electrolysis is currently only possible via high-temperature electrolysis of a lithium chloride/potassium chloride (KCl) eutectic system, producing toxic chlorine gas as a byproduct. Yet, the downs cell electrolysis system remains the only current economically feasible method for producing lithium metal. In contrast, using lithium salt of any purity as a precursor for lithium metal electrolysis (metal production), as shown in the membrane-based alkali metal production 2700 allows for the entire lithium metal value chain to be much more simple and cheaper and may have fewer points of potential failure. Additionally, the lithium salt may be processed at lower temperatures that do not require distillation for removal, do not introduce potassium impurities, and/or do not affect treatment of undesired chlorine byproducts, thus making the cost of production much cheaper and remove many safety concerns.

It is to be appreciated that within the context of the present description, the term electrolysis refers to any system where an electric current is passed through a substance to effect a chemical change. Further metal electrolysis may include metal production such that, as a result of the electrolysis, compounds may be separated into their discrete parts (including a molten liquid form of metal). The term metal electrolysis and metal production may therefore be used interchangeably within the context of the present description.

In one embodiment, the metal electrolysis process may consist of different designs for an ion-selective solid electrolyte membrane separator and a process for the production of lithium metal from any aqueous precursor. For example, a first separator design may comprise two electrodes, including an anode in the form of a carbon rod with a platinum catalyst, and a cathode in the form of a carbon/metal rod and/or mesh. In addition, the first separator may comprise two active materials, including hydroxide (OH−) anions, as well as other materials such as hydrogen gas ($H_2$), chlorine ions (Cl−), bromine ions (Br−), and/or iridium ions (I−) on the anode side and a metal that remains in liquid state and features low volatility in the 25-250 Celsius temperature range, and may form a molten alloy with lithium. The range of solubility of lithium in the alloy may include at least a small region where the alloy remains molten and has a high reduction potential on the cathode side. In one embodiment, materials comprising the cathode may include gallium, gallium-indium, and gallium-indium alloys (galinstan). It is envisioned that other materials (for active materials, cathode, anode, etc.) may be selected.

The first separator may comprise a liquid electrolyte (anolyte) of, in one embodiment, water, cations including lithium ions (which also may also be used for sodium ions and potassium ions for the production of sodium and potassium, respectively), anions including hydroxide and carbonate ($CO_3^{2-}$), a buffer of carbonic acid/bicarbonate, and/or an ion-selective solid electrolyte membrane. In an alternate embodiment, the liquid electrolyte (anolyte) may also contain alcohols, carbonates, ethers, hydrocarbons, esters, and ionic liquids. In a related embodiment, other potential anions may include bicarbonate, chloride, bromide, iodide, perchlorate, nitrate, sulfate, and/or phosphate. In another embodiment, the buffer may be comprised of lead sulfide (PBS), HEPES, and/or acetate.

In various embodiment, the second separator may comprise two electrodes including an anode in the form of a stainless steel slab and a cathode in the form of a carbon rod and/or mesh, two active materials including lithiated liquid metal on the anode side and molten lithium metal on the cathode side, and/or an ion-selective solid electrolyte membrane. The ion-selective solid electrolyte membrane may be composed of ion-selective solid electrolyte material including, but not limited to $Li_{10}GeP_2S_{12}$ (LGPS), $Li_7La_3Zr_2O_{12}$ (LLZO), lithium aluminum titanium phosphate (LATP), and/or lithium aluminum germanium phosphate (LAGP), a matrix (which may or may not include solid electrolyte material). The ion-selective solid electrolyte membrane may also include a lithium-stable layer of lithium fluoride and/or lithium oxide ($Li_2O$) in contact with the molten lithium-facing (cathode) side, and/or additives (including but not limited to one or more of a variety of carbons including graphene, graphite, cyanate, diamond, and/or boron nitride). In one embodiment, the anode may also comprise metals such as aluminum, copper, titanium, nickel, and/or carbon.

In one embodiment, lithium metal production may include two steps. It is acknowledged that the lithium metal production process may be set up in series or parallel (for continuous processing). In any event, it is to be understood that the number of steps may fluctuate (increase or decrease) depending on the setup and implementation of the process. As such, in an exemplary configuration, the first step may include a process wherein lithium salt may be fed to the electrolyte, and current may be passed from an anode to a cathode. In one embodiment, the feeding in of the lithium salt to the electrolyte may occur continuously. This first step may result in: oxidation of the active material (such as hydroxide) and formation of electrons at the anode, a potential (electric and/or chemical) forming across the ion-selective membrane, migration of alkali metal ions across the membrane as a result of the potential, and/or reduction of the active material (such as galinstan) at the cathode. As such, this first step may result in the recombination of the lithium ions with electrons and the lithiation of galinstan. In the exemplary configuration, a second step may include a process where lithiated galinstan (from the first step) may be fed to the anode (of a separate cell), and a current may be passed from the anode to the cathode. This second step may result in: oxidation of the active material (such as lithiated galinstan) and the formation of electrons at the anode, a potential forming across the ion-selective membrane, migration of alkali metal ions across the membrane as a result of the potential, and/or reduction of the active material (such as molten lithium) at the cathode. As such, this second step may result in the recombination of lithium ions with electrons and the production of additional molten lithium. In one embodiment, the feeding of the lithiated galinstan to the anode may occur continuously.

In one embodiment, the first and second steps in the exemplary lithium metal production process may be performed concurrently, where the product of the first step (lithiated galinstan) may be continuously fed and/or circulated back to the anode for the second step. In a related embodiment, both steps may also be performed in a batch process, where the active material may be first fully transferred into a separation system before a current is applied. In another embodiment, the first step may be done in an inert environment (for example, an argon atmosphere). Additionally, the first step may also be performed in a dry room environment and/or in ambient conditions. In still another embodiment, the second step may also be performed in an inert argon atmosphere.

In one embodiment, each membrane may be substituted for a thicker membrane and/or multiple membranes in series to increase the purity of the final product (and/or to protect the integrity of the membrane from the harsh conditions of the lithiated galinstan).

Figure 28:
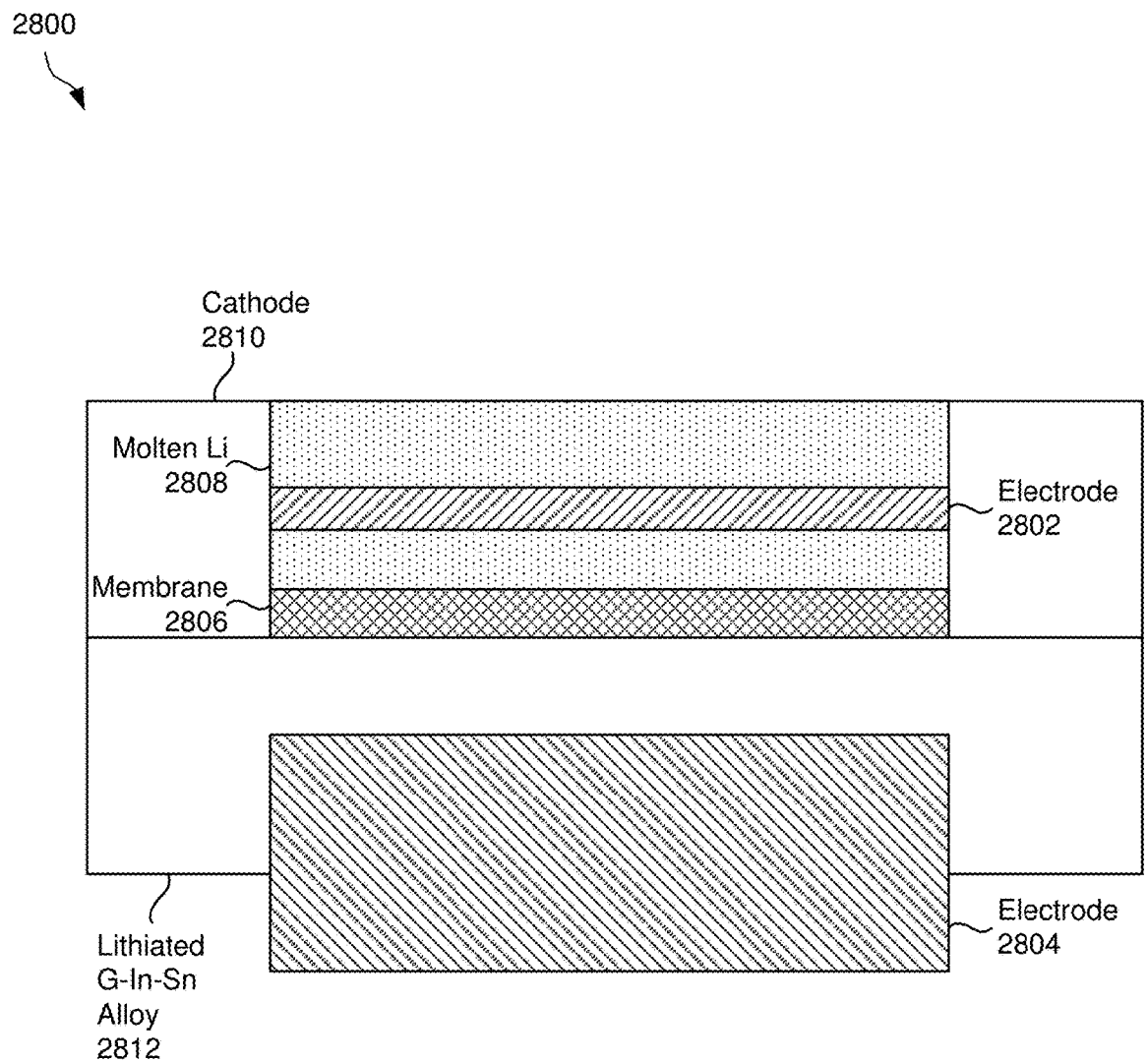
FIG. 28 illustrates another implementation of membrane-based alkali metal production, in accordance with one embodiment.

FIG. 28 illustrates another implementation of membrane-based alkali metal production 2800, in accordance with one embodiment. As an option, the other implementation of membrane-based alkali metal production 2800 may be implemented in the context of any one or more of the embodiments set forth in any previous and/or subsequent figure(s) and/or description thereof. Of course, however, the other implementation of membrane-based alkali metal production 2800 may be implemented in the context of any desired environment. Further, the aforementioned definitions may equally apply to the description below.

As shown, lithium ions (Li+) may pass from an anode comprised of lithiated galinstan (Ga—In—Sn) alloy 2812 through a lithium ion-selective solid electrolyte membrane 2806 to a cathode 2810 comprised of molten lithium 2808. In operation, lithiated galinstan alloy may be continuously fed into the anode (if an adequate amount of such lithiated galinstan alloy is not already present) where lithium ions may then be drawn across the lithium ion-selective solid electrolyte membrane 2806 into the cathode comprised of molten lithium 2808. Additionally, the alkali metal production process may simultaneously combine the actions of oxidation of galinstan-Li at a stainless steel slab electrode 2804, resulting in lithium ions and electrons, and reduction at the carbon rod/metal mesh 2802 where lithium ions are recombined with electrons to form the new lithium metal.

In one embodiment, the lithium ion-selective solid electrolyte membrane 2806 may comprise a layer of $Li_{10}GeP_2S_{12}$ (LGPS) with a lithium-stable coating of, for example, lithium fluoride (LiF) and/or lithium oxide ($Li_2O$).

Figure 29:
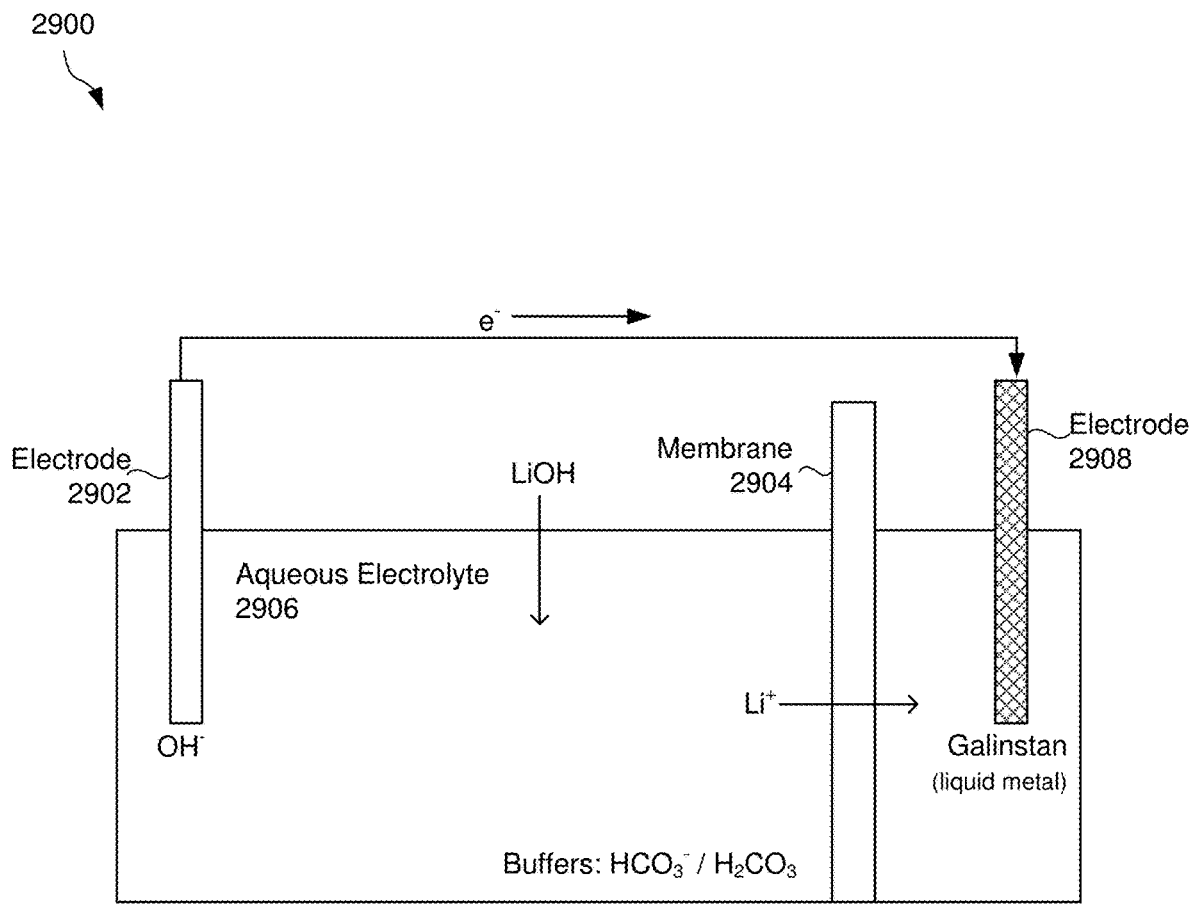
FIG. 29 illustrates membrane-based alkali metal production, in accordance with one embodiment.

FIG. 29 illustrates membrane-based alkali metal production 2900, in accordance with one embodiment. As an option, the membrane-based alkali metal production 2900 may be implemented in the context of any one or more of the embodiments set forth in any previous and/or subsequent figure(s) and/or description thereof. Of course, however, the membrane-based alkali metal production 2900 may be implemented in the context of any desired environment. Further, the aforementioned definitions may equally apply to the description below.

As shown, lithium ions ($Li^+$) may pass from an anode comprised of aqueous electrolyte 2906 through a lithium ion-selective solid electrolyte membrane 2904 to a cathode comprised of lithiated galinstan (Ga—In—Sn) liquid metal. In operation, lithium hydroxide atoms may be continuously fed into the aqueous electrolyte 2906 (if an adequate amount of lithium hydroxide is not already present) and may break apart into positively-charged lithium ions and negatively-charged hydroxide ($OH^-$) atoms. In addition, the lithium ions may then be drawn across the lithium ion-selective solid electrolyte membrane 2904 into the cathode containing the lithiated galinstan liquid metal. Additionally, the alkali metal production may simultaneously combine the actions of reduction of galinstan at a carbon/metal rod/metal mesh 2908, resulting in the recombination of lithium ions and electrons to form a lithiated galinstan liquid metal, and oxidation of OH– at a carbon rod with Pt catalyst 2902, producing 02, $H_2O$, and electrons. Further, to prevent corrosion and degradation of the effectiveness of the lithium ion-selective solid electrolyte membrane 2904, a suitable buffer may be used to coat the lithium ion-selective solid electrolyte membrane 2904 in the case of contact with the aqueous electrolyte 2906. By way of example, the compound used to comprise the buffer in the aqueous electrolyte 2906 may include bicarbonate ($HCO_{3-}$) and/or carbonic acid ($H_2CO_3$).

Figure 30:
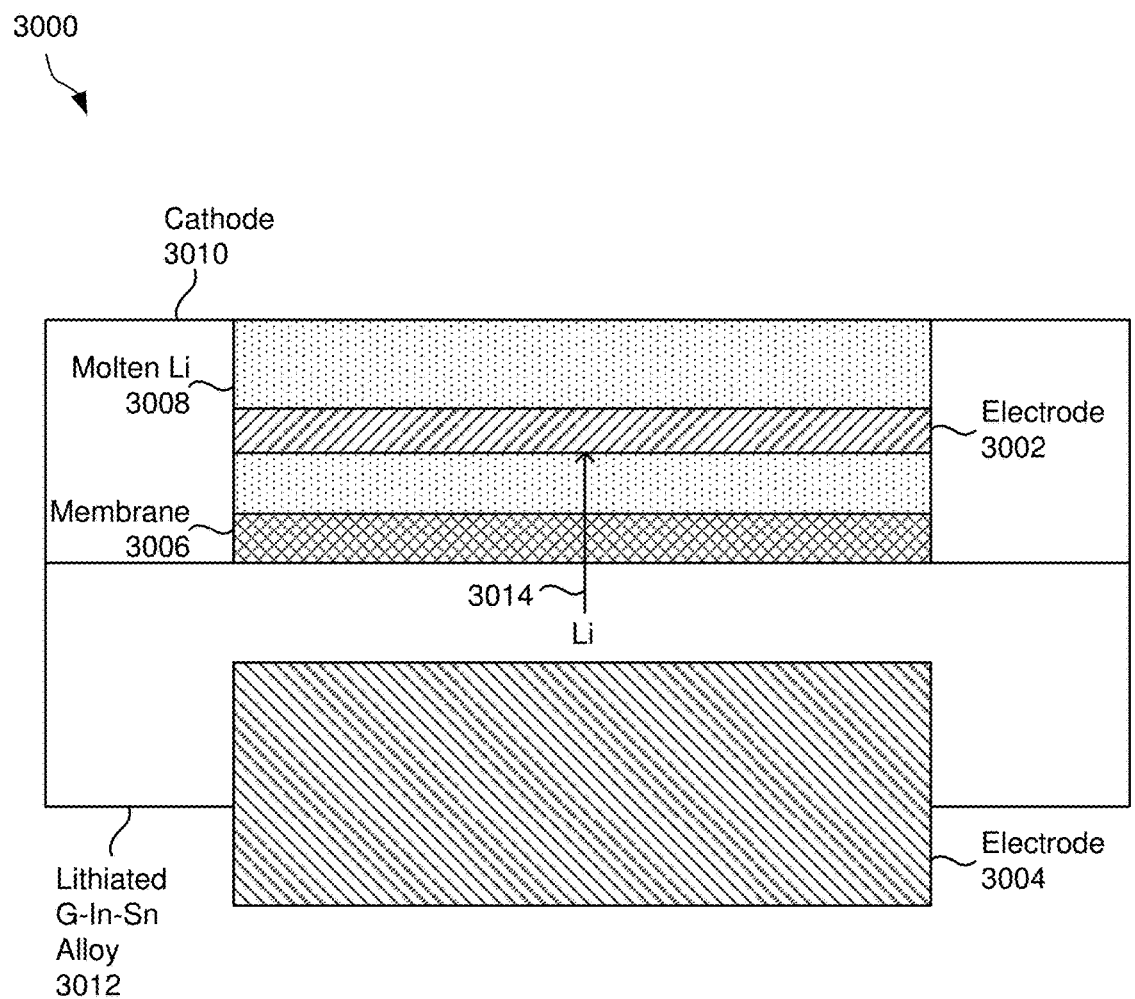
FIG. 30 illustrates another implementation of membrane-based alkali metal production, in accordance with one embodiment.

FIG. 30 illustrates another implementation of membrane-based alkali metal production 3000, in accordance with one embodiment. As an option, the other implementation of membrane-based alkali metal production 3000 may be implemented in the context of any one or more of the embodiments set forth in any previous and/or subsequent figure(s) and/or description thereof. Of course, however, the other implementation of membrane-based alkali metal production 3000 may be implemented in the context of any desired environment. Further, the aforementioned definitions may equally apply to the description below.

As shown, lithium ions ($Li^+$) 3014 may pass from an anode comprised of lithiated galinstan (Ga—In—Sn) alloy 3012 through a lithium ion-selective solid electrolyte membrane 3006 to a cathode 3010 comprised of molten lithium 3008. In operation, lithiated galinstan alloy may be continuously fed into the anode (if an adequate amount of such lithiated galinstan alloy is not already present) where lithium ions 3014 may then be drawn across the lithium ion-selective solid electrolyte membrane 3006 into the cathode comprised of molten lithium 3008. Additionally, the alkali metal production process may simultaneously combine the actions of oxidation of galinstan-Li at a stainless steel slab electrode 3004, resulting in lithium ions 3014 and electrons, and reduction at the carbon rod/metal mesh 3002 where lithium ions 3014 are recombined with electrons to form the new lithium metal.

In one embodiment, the lithium ion-selective solid electrolyte membrane 3006 may comprise a layer of $Li_{10}GeP_2S_{12}$ (LGPS) with a lithium-stable coating of, for example, lithium fluoride (LiF) and/or lithium oxide ($Li_2O$).

Figure 31:
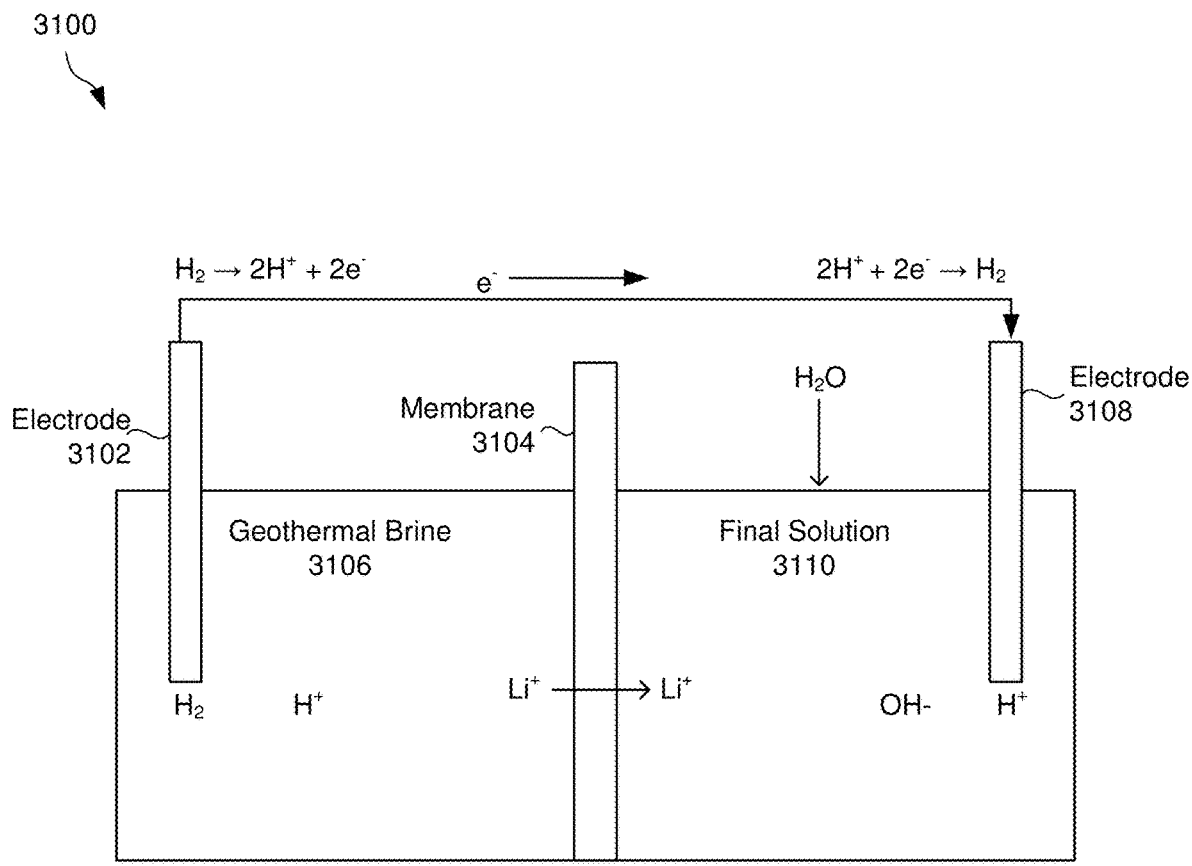
FIG. 31 illustrates a redox electrode system for alkali metal extraction, in accordance with one embodiment.

FIG. 31 illustrates a redox electrode system 3100 for alkali metal extraction, in accordance with one embodiment. As an option, the redox electrode system 3100 may be implemented in the context of any one or more of the embodiments set forth in any previous and/or subsequent figure(s) and/or description thereof. Of course, however, the redox electrode system 3100 may be implemented in the context of any desired environment. Further, the aforementioned definitions may equally apply to the description below.

As shown, lithium ions ($Li^+$) may pass from an anode comprised of geothermal brine 3106 through a solid electrolyte membrane 3104 to a cathode comprised of an aqueous final solution 3110. In operation, lithium hydroxide (LiOH) atoms present in the geothermal brine 3106 may react with an $H_2O$ reagent and break apart into positively-charged lithium ions and negatively-charged hydroxide (OH–) atoms. In addition, the lithium ions may then be drawn across the electrolyte membrane 3104 into the aqueous final solution 3110 where they may recombine with hydroxide atoms to reform into lithium hydroxide atoms, thus yielding a concentration of lithium hydroxide in the aqueous final solution 3110 upon completion of the alkali metal extraction process. Further, the alkali metal extraction process may simultaneously combine the actions of reduction of $H^+$ at a cathode electrode 3108, forming $H_2$ (sent to an anode), and oxidation of $H_2$ at the anode electrode 3102, forming $H^+$ waste.

Figure 32:
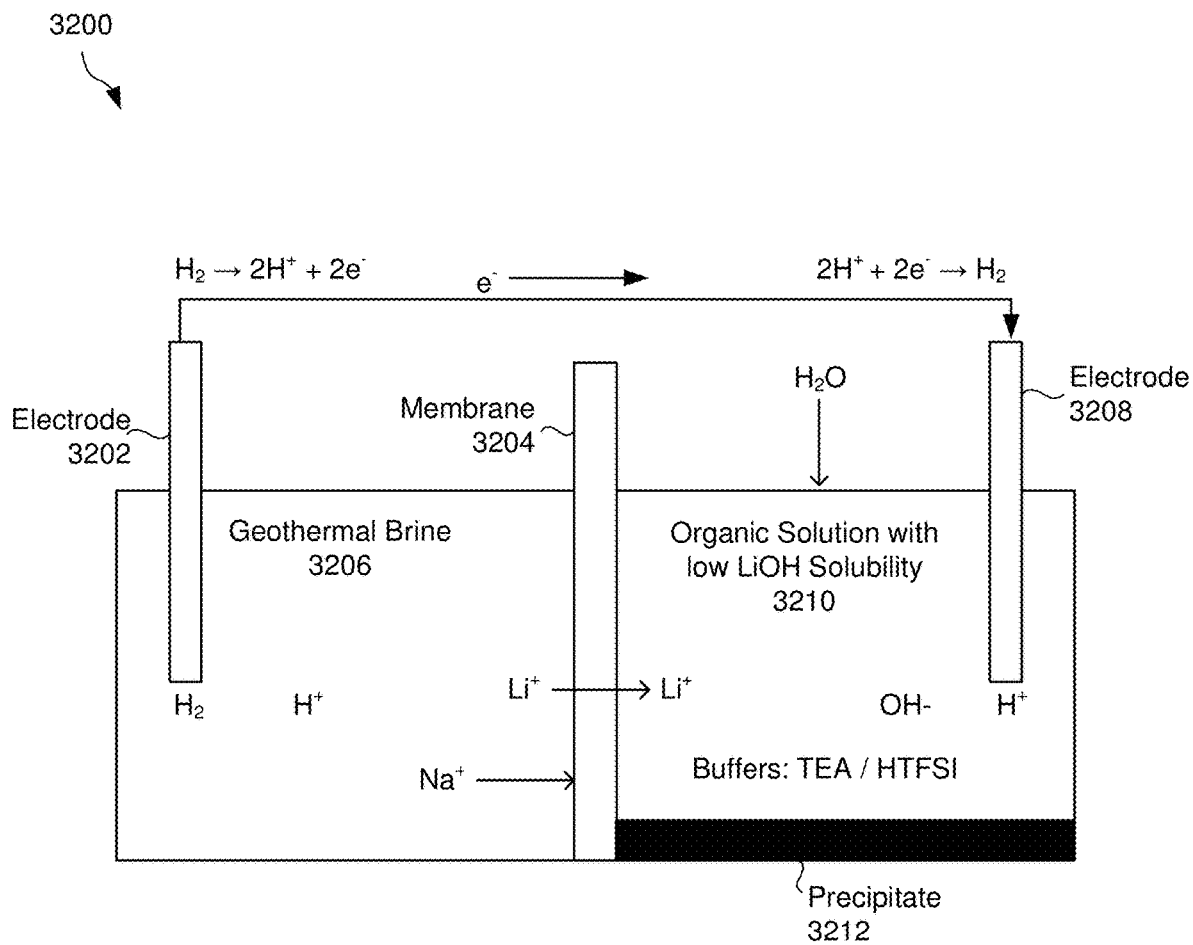
FIG. 32 illustrates a redox electrode system for alkali metal extraction and precipitation, in accordance with one embodiment.

FIG. 32 illustrates a redox electrode system 3200 for alkali metal extraction and precipitation, in accordance with one embodiment. As an option, the redox electrode system 3200 may be implemented in the context of any one or more of the embodiments set forth in any previous and/or subsequent figure(s) and/or description thereof. Of course, however, the redox electrode system 3200 may be implemented in the context of any desired environment. Further, the aforementioned definitions may equally apply to the description below.

As shown, lithium ions ($Li^+$) may pass from an anode comprised of geothermal brine 3206 through a solid electrolyte membrane 3204 to a cathode comprised of an organic solution with low LiOH solubility 3210. In operation, lithium hydroxide (LiOH) atoms present in the geothermal brine 3206 may react with an $H_2O$ reagent and break apart into positively-charged lithium ions and negatively-charged hydroxide (OH–) atoms. In addition, the lithium ions may then be drawn across the electrolyte membrane 3204 into the organic solution with low LiOH solubility 3210 where they may recombine with hydroxide atoms to reform into lithium hydroxide atoms, thus yielding a concentration of lithium hydroxide in the organic solution with low LiOH solubility 3210 resulting in the formation of a concentrated precipitate salt 3212 upon completion of the alkali metal extraction process. Additionally, the alkali metal extraction process may simultaneously combine the actions of reduction of $H^+$ at a cathode electrode 3208, forming $H_2$ (sent to an anode), and oxidation of $H_2$ at the anode electrode 3202, forming $H^+$ waste. Further, to prevent corrosion and degradation of the effectiveness of the solid electrolyte membrane 3204, a suitable buffer may be used to coat the solid electrolyte membrane 3204 in the case of contact with the organic solution with low LiOH solubility 3210. By way of example, the compound used to comprise the buffer in the organic solution with low LiOH solubility 3210 may include Tri-ethylamine (TEA) and/or bis(trifluoromethanesulfonyl)imide (HTFSI).

The redox electrode system 3200 shows, in particular, that many of the processes disclosed herein (such as extraction, purification, ion exchange, precipitation, etc.) may be combined together as desired to create an efficient process.

Figure 33:
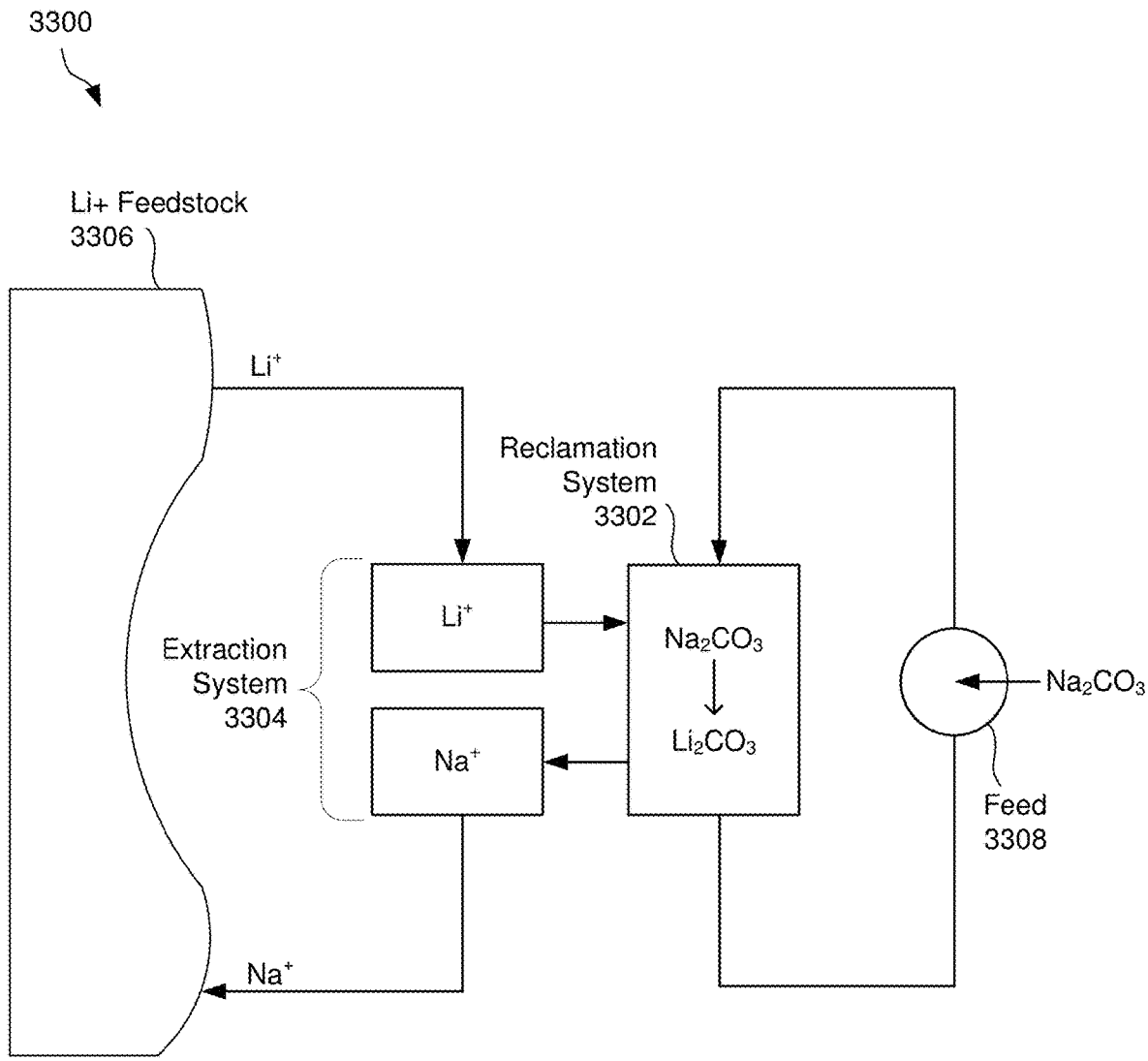
FIG. 33 illustrates a lithium extraction system, in accordance with one embodiment.

FIG. 33 illustrates a lithium extraction system 3300, in accordance with one embodiment. As an option, the lithium extraction system 3300 may be implemented in the context of any one or more of the embodiments set forth in any previous and/or subsequent figure(s) and/or description thereof. Of course, however, the lithium extraction system 3300 may be implemented in the context of any desired environment. Further, the aforementioned definitions may equally apply to the description below.

As shown, a lithium ion (Li+) feedstock 3306 may contain a collection of lithium ions to be fed into an extraction system 3304 and combined with a sodium carbonate ($Na_2CO_3$) reagent from another Feed 3308. In operation, the lithium ions fed into the extraction system 3304 chemically react with the sodium carbonate to form lithium carbonate ($Li_2CO_3$) atoms and a concentration of sodium ions (Na+), which may then ultimately be handled as waste byproduct.

In one embodiment, conversely, a reclamation reaction process may yield a concentration of lithium carbonate solid and a sodium ion concentration which may be stored for another future purpose.

The extraction reaction may include: Li+(feed)+Na+(stored)→Li+(stored)+Na+(waste). The reclamation reaction may include: 2Li+(stored)+$Na_2CO_3$ (feed)→$Li_2CO_3$(s)+2Na+(stored). Additionally, the overall reaction may include: $2Li^+ + Na_2CO_3 \rightarrow Li_2CO_3(s) + 2Na^+$.

In this manner, the extraction system 3304 may be used to extract lithium from the Li+ feedstock 3306. The lithium ions may be replaced by sodium ions from the feed 3308.

Figure 34:
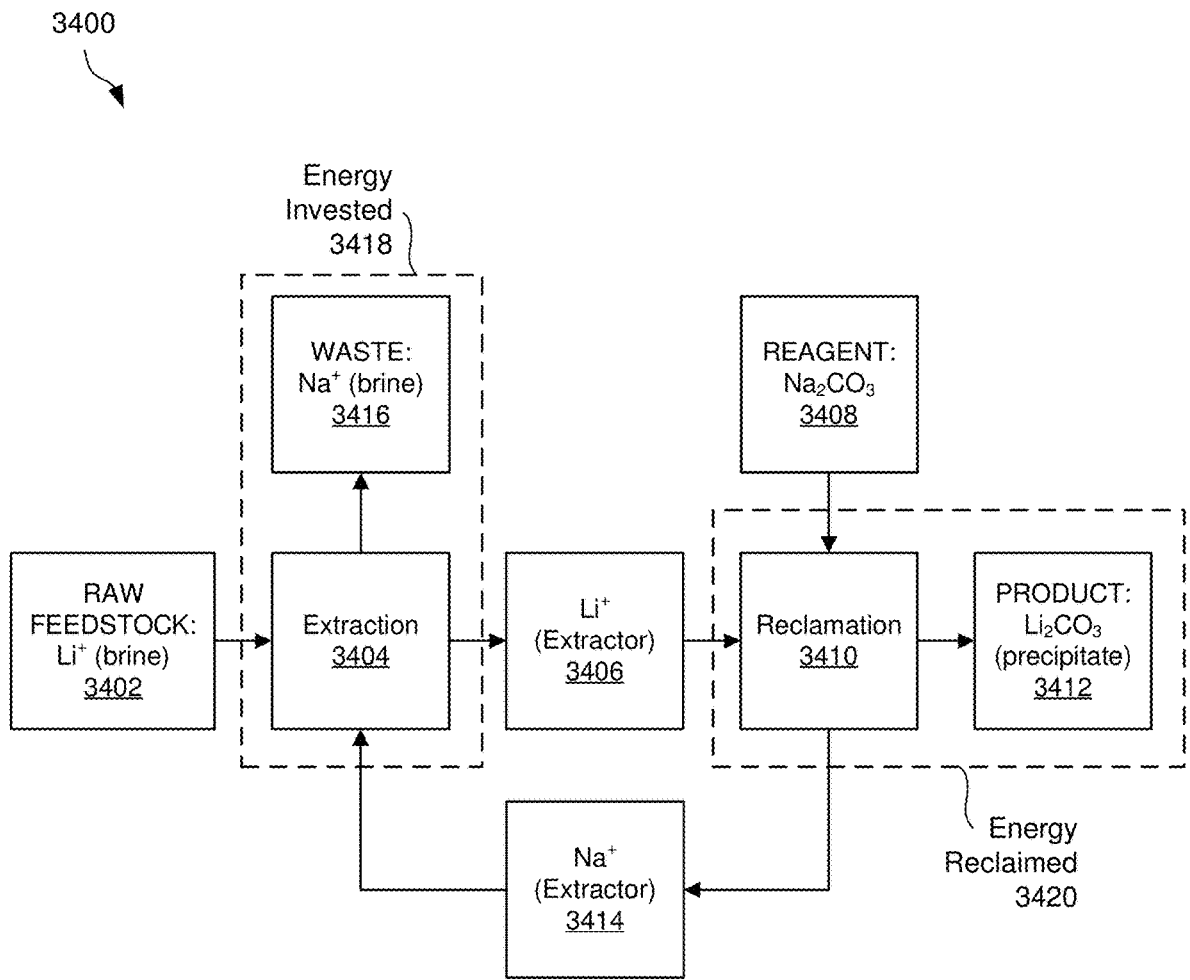
FIG. 34 illustrates an energy reclamation process for alkali metal extraction, in accordance with one embodiment.

FIG. 34 illustrates an energy reclamation process 3400 for alkali metal extraction, in accordance with one embodiment. As an option, the energy reclamation process 3400 may be implemented in the context of any one or more of the embodiments set forth in any previous and/or subsequent figure(s) and/or description thereof. Of course, however, the energy reclamation process 3400 may be implemented in the context of any desired environment. Further, the aforementioned definitions may equally apply to the description below.

In operation, an alkali metal (in this case, lithium ion (Li+)) raw feedstock 3402, which may take the form of a brine, may feed lithium ions into an extraction subprocess 3404 and extractor 3406. In addition, the lithium ions may be passed from the extractor 3406 into a reclamation subprocess 3410 and combined with a sodium carbonate ($Na_2CO_3$) reagent 3408, wherein the lithium ions chemically react with the sodium carbonate reagent 3408 to produce a lithium carbonate ($Li_2CO_3$) precipitate salt 3412 and a concentration of sodium ions (Na+). The reclamation 3410 may also result in a solution which may be passed to an extractor 3414, passed back through the extraction subprocess 3404, and may ultimately be reclaimed in the form of a waste brine comprised of a mass of sodium ions 3416.

In one embodiment, the measure of energy output may be derived by combining the measure of energy invested 3418 with the measure of energy reclaimed 3420. In a related embodiment, the measure of energy invested may be quantified by measuring the waste brine comprised of the mass of sodium ions 3416 produced via the extraction subprocess 3404. In a counterpart embodiment, the measure of energy reclaimed may be quantified by measuring the lithium carbonate ($Li_2CO_3$) precipitate salt 3412 produced via the reclamation subprocess 3410.

In one exemplary embodiment, the energy reclamation process may include the following overall reaction: $2Li^+ + Na_2CO_3 \rightarrow Li_2CO_3(s) + 2Na^+$.

Figure 35:
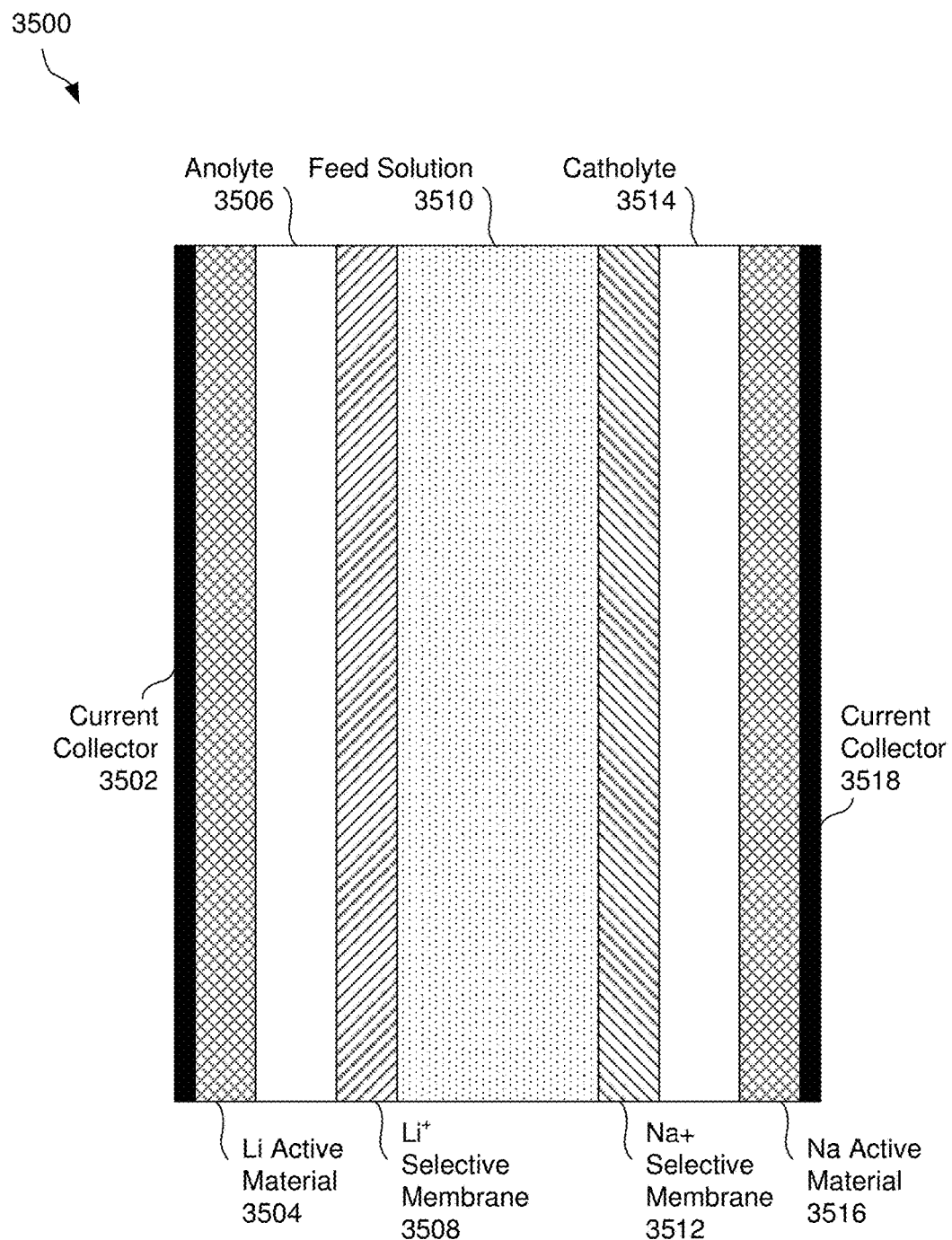
FIG. 35 illustrates a lithium extraction cell, in accordance with one embodiment.

FIG. 35 illustrates a lithium extraction cell 3500, in accordance with one embodiment. As an option, the lithium extraction cell 3500 may be implemented in the context of any one or more of the embodiments set forth in any previous and/or subsequent figure(s) and/or description thereof. Of course, however, the lithium extraction cell 3500 may be implemented in the context of any desired environment. Further, the aforementioned definitions may equally apply to the description below.

As shown an anode-side current collector 3502 may form one outside contact surface of the lithium extraction cell 3500 and be in direct contact with a mass of lithium active material 3504. Additionally, an anolyte 3506 may be situated between the lithium active material 3504 and a lithium ion-selective solid electrolyte membrane 3508. Additionally, a feed solution 3510 may be positioned between the lithium ion-selective solid electrolyte membrane 3508 on the anode side of the lithium extraction cell 3500 and a sodium ion-selective solid electrolyte membrane 3512 on the cathode side of the lithium extraction cell 3500. Further, within the cathode portion of the lithium extraction cell 3500, a catholyte 3514 may be situated between the sodium ion-selective solid electrolyte membrane 3512 and sodium active material 3516. Further still the cathode side of the lithium extraction cell 3500 may be "capped" by another current collector 3518.

In one embodiment, the lithium active material 3504 may be comprised of lithium-titanate or lithium-titanium-oxide (LTO). In another embodiment, the anolyte 3506 may be formed of lithium ion electrolyte. In a likewise embodiment, the catholyte 3514 may be comprised of sodium ion electrolyte. In yet another embodiment, the sodium active material 3516 may be comprised of Prussian Blue (or iron cyanides).

Figure 36:
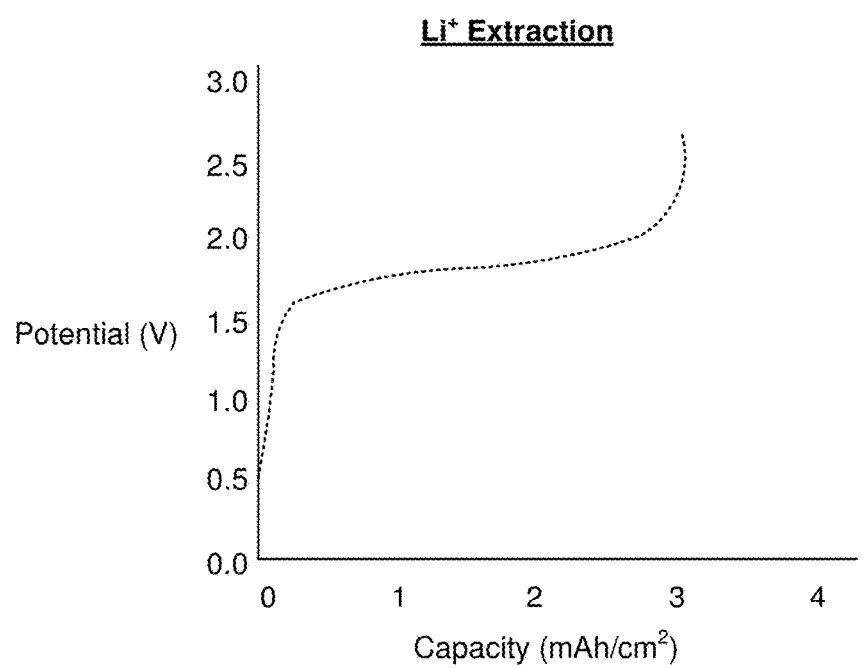
FIG. 36 illustrates a data plot of lithium extraction, in accordance with one embodiment.

FIG. 36 illustrates a data plot of lithium extraction 3600, in accordance with one embodiment. As an option, the data plot of lithium extraction 3600 may be implemented in the context of any one or more of the embodiments set forth in any previous and/or subsequent figure(s) and/or description thereof. Of course, however, the data plot of lithium extraction 3600 may be implemented in the context of any desired environment. Further, the aforementioned definitions may equally apply to the description below.

As shown, a data plot of lithium extraction 3600 may show relative measures of electrode capacity, measured in $mAh/cm^2$, along an x-axis over the course of a lithium extraction reaction, juxtaposed with counterpart voltage potential measurement along a y-axis over the course of the same reaction time.

By way of just one example, in a scenario where 0.78 $mg/cm^2$ of lithium extract results from a reaction in which 6.15 $mWh/cm^2$ of electrochemical energy has been consumed, approximately 2.5 volts of energy may be generated where 3 $mAh/cm^2$ of capacity is realized.

Figure 37:
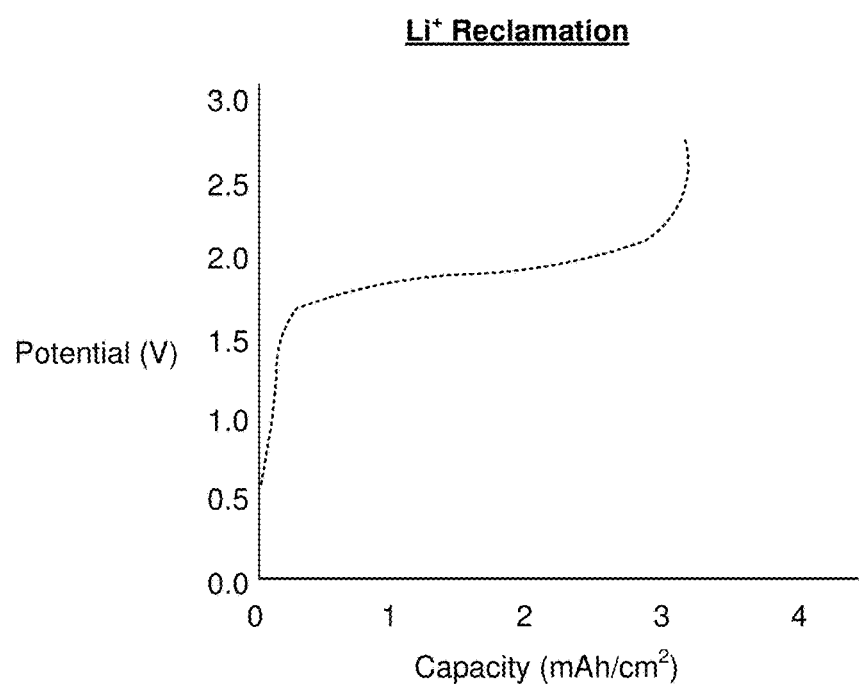
FIG. 37 illustrates a data plot of lithium reclamation, in accordance with one embodiment.

FIG. 37 illustrates a data plot of lithium reclamation 3700, in accordance with one embodiment. As an option, the data plot of lithium reclamation 3700 may be implemented in the context of any one or more of the embodiments set forth in any previous and/or subsequent figure(s) and/or description thereof. Of course, however, the data plot of lithium reclamation 3700 may be implemented in the context of any desired environment. Further, the aforementioned definitions may equally apply to the description below.

As shown, a data plot of lithium reclamation 3700 may show relative measures of electrode capacity, measured in mAh/cm$^2$, along an x-axis over the course of a lithium reclamation reaction, juxtaposed with counterpart voltage potential measurement along a y-axis over the course of the same reaction time.

By way of just one example, in a scenario where 0.78 mg/cm$^2$ of lithium extract results from a reaction in which 4.95 mWh/cm$^2$ of electrochemical energy has been consumed (or invested) and 1.2 mWh/cm$^2$ has been irreversibly lost, approximately 2.5 volts of energy may be generated where 3 mAh/cm$^2$ of capacity is realized.

In various embodiments, FIG. 36 is intended to show recovered energy, and FIG. 37 is intended to show that which is consumed or invested.

Based on FIGS. 36 and 37, energy associated with effectively extracting lithium may be recoupled via a reclamation step.

Figure 38:
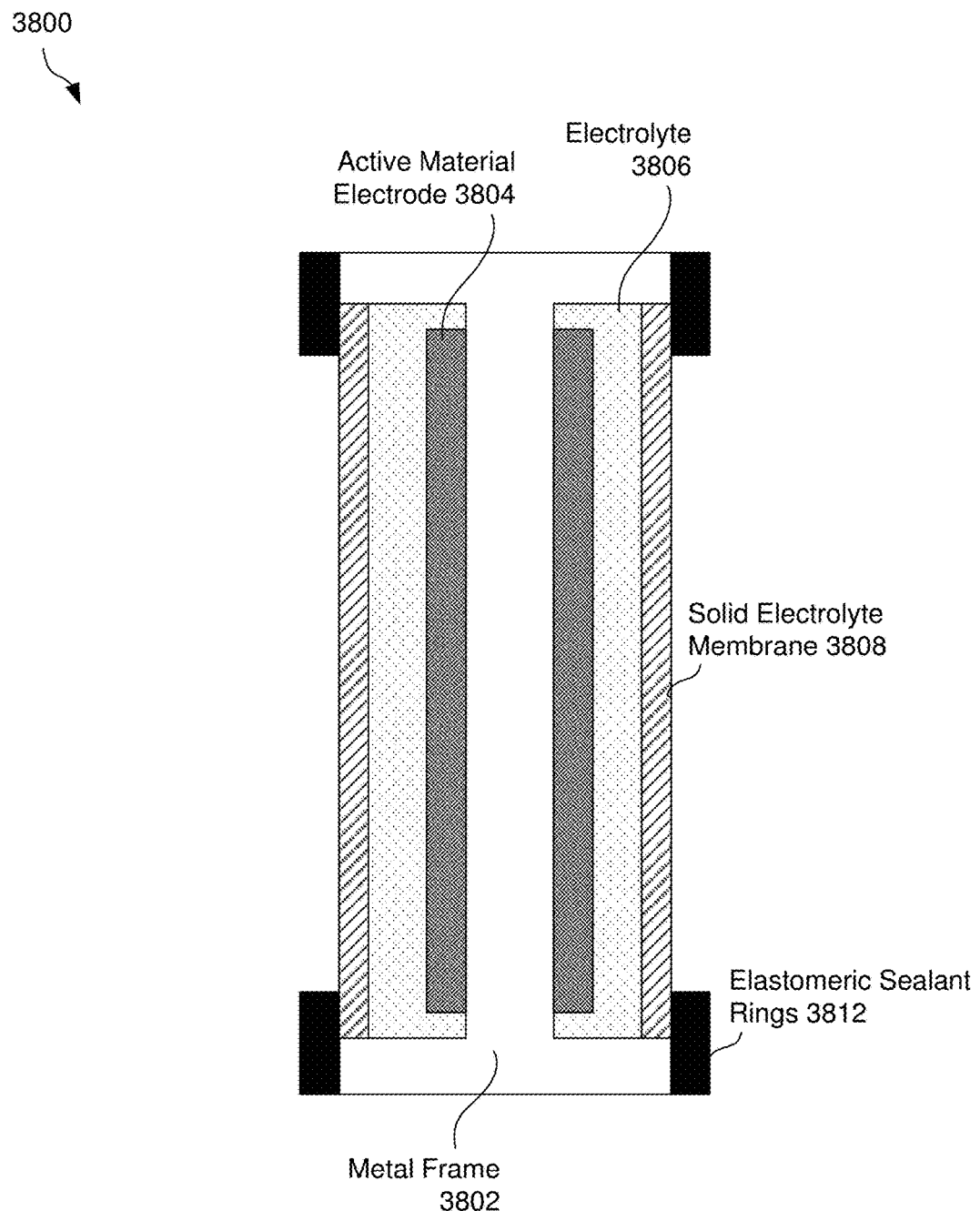
FIG. 38 illustrates an exemplary electrode module, in accordance with one embodiment.

FIG. 38 illustrates an exemplary electrode module 3800, in accordance with one embodiment. As an option, the exemplary electrode module 3800 may be implemented in the context of any one or more of the embodiments set forth in any previous and/or subsequent figure(s) and/or description thereof. Of course, however, the exemplary electrode module 3800 may be implemented in the context of any desired environment. Further, the aforementioned definitions may equally apply to the description below.

As shown, the electrode module 3800 may comprise a solid electrolyte membrane 3808, an interstitial liquid electrolyte 3806, and an active material electrode 3804, all encased by and in direct contact with a metal frame 3802. Additionally, the electrode module 3800 may include elastometric sealant rings 3812 to bind the electrode module 3800 casing. It is to be appreciated that, in order to function as a redox system, both an anode and a cathode would be needed. For simplicity, the redox electrode module is presented in a singular form (a single module electrode) to describe the elements of the module that are consistent for either and/or both of the anode module and the cathode module.

In one embodiment, the solid electrolyte membrane 3808 may interface with a feed solution. Additionally, the electrolyte 3806 may function as an anolyte on the anode side of the electrode module 3800 and as a catholyte on the cathode side of the electrode module 3800. In addition, the interstitial liquid electrolyte 3806 may comprise one or more electroactive solutes. In one embodiment, each electroactive solute may be characterized by its ability to adopt multiple oxidation states whose relative concentrations within the electrolyte may be manipulated through the addition or removal of charge (electrons) from the interstitial liquid electrolyte 3806. Further, the interstitial liquid electrolyte 3806 may include one or more dissolved alkali metal cations. Further, the interstitial liquid electrolyte 3806 may include one or more dissolved anions to balance the charge of cations in the solution. The current collector may be in direct contact with the interstitial liquid electrolyte 3806.

In a related embodiment, the metal frame 3802 may be comprised of stainless steel, aluminum, and/or a hybrid of both metals.

In operation, the electrode module 3800 may be used to separate lithium from a feed solution (via the solid electrolyte membrane 3808). Additional details relating to the separation of lithium via the solid electrolyte membrane 3808 may be found in relation to the disclosure of FIG. 1-FIG. 6 hereinabove. In practice, the solid electrolyte membrane may interface directly with the interstitial liquid electrolyte 3806, on one side, and a feed solution on the other side. The feed solution may comprise ions which may be effectively separately from the feed solution via the solid electrolyte membrane 3808. The solid electrolyte membrane 3808 may be tuned to selectively separate desired ions from the feed solution. In other words, the solid electrolyte membrane 3808 may be configured to allow selective passage of a specific alkali metal cation.

Further, the electrode module 3800 may be used to reclaim energy used during the separation process. For example, as lithium is extracted, it may be stored in the form of electrochemical energy which may be subsequently released.

Figure 39:
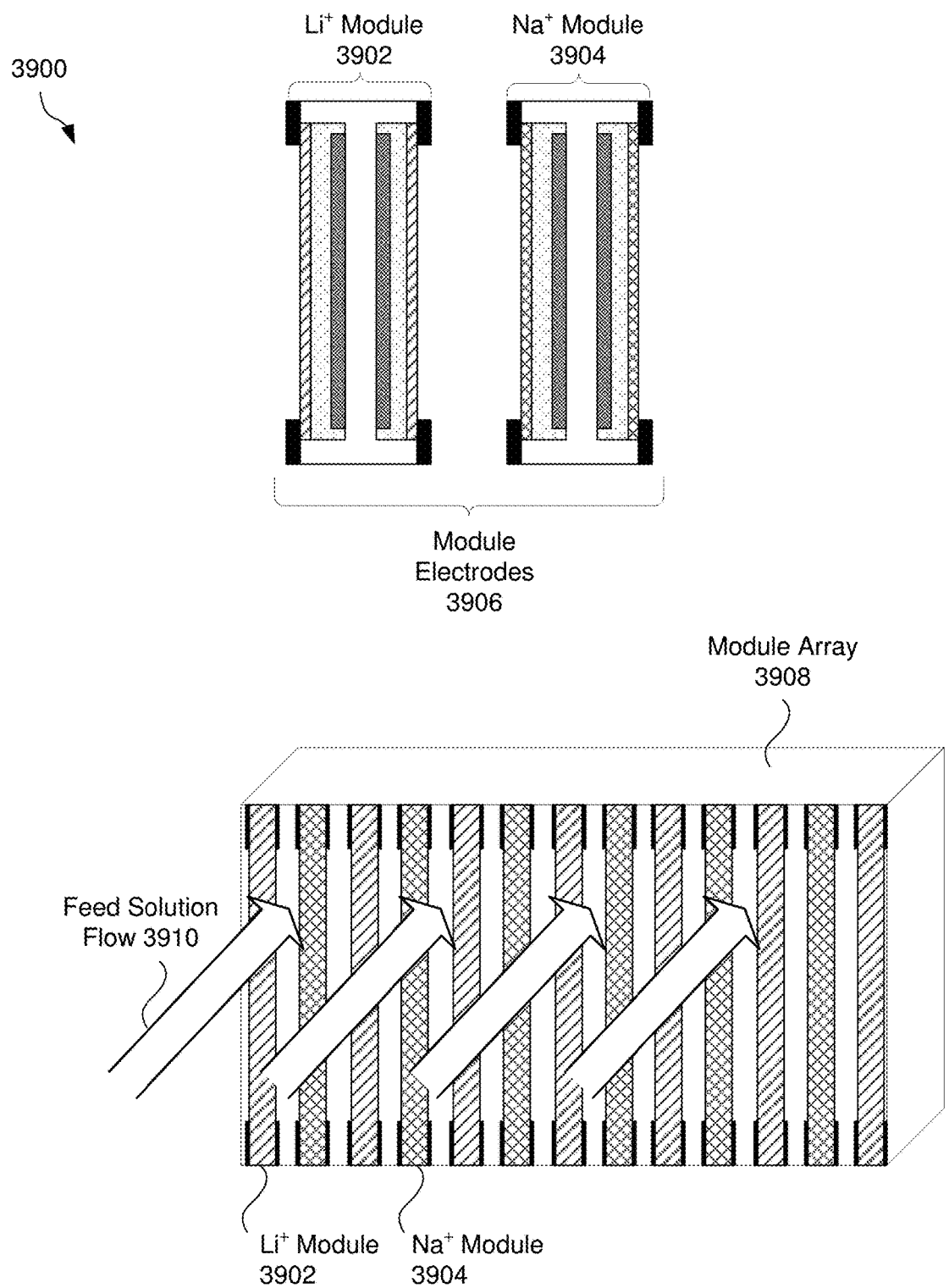
FIG. 39 illustrates an electrode module array, in accordance with one embodiment.

FIG. 39 illustrates an electrode module array 3900, in accordance with one embodiment. As an option, the electrode module array 3900 may be implemented in the context of any one or more of the embodiments set forth in any previous and/or subsequent figure(s) and/or description thereof. Of course, however, the electrode module array 3900 may be implemented in the context of any desired environment. Further, the aforementioned definitions may equally apply to the description below.

As shown, the module electrodes 3906 may include a lithium ion (Li+) module 3902 functioning as an anode and a sodium ion (Na+) module 3904 functioning as a cathode. It is to be appreciated that, in order to function as a redox system, both an anode and a cathode would be needed.

As shown, a module array 3908 may comprise two or more sets of module electrodes 3906 organized into a collection and designed to provide maximum battery storage capacity. In operation, a feed solution 3910 may flow through the module array 3908 with the intention that the feed solution 3910 completely envelop all lithium ion (Li+) module 3902 and sodium ion (Na+) module 3904 pairs.

In one embodiment, the feed solution flow 3910 may comprise ions which may be effectively separated from the feed solution via the solid electrolyte membrane. To facilitate separation of ions from the feed solution flow 3910, a solid electrolyte membrane 3808 may be tuned to selectively separate desired ions (lithium ions and/or sodium ions, for example) from the feed solution. In other words, the solid electrolyte membrane 3808 may be configured to allow selective passage of a specific alkali metal ions. For example, the lithium ion module 3902 may be configured to allow passage of lithium ions, and the sodium module 3904 may be configured to allow passage of sodium ions.

Figure 40:
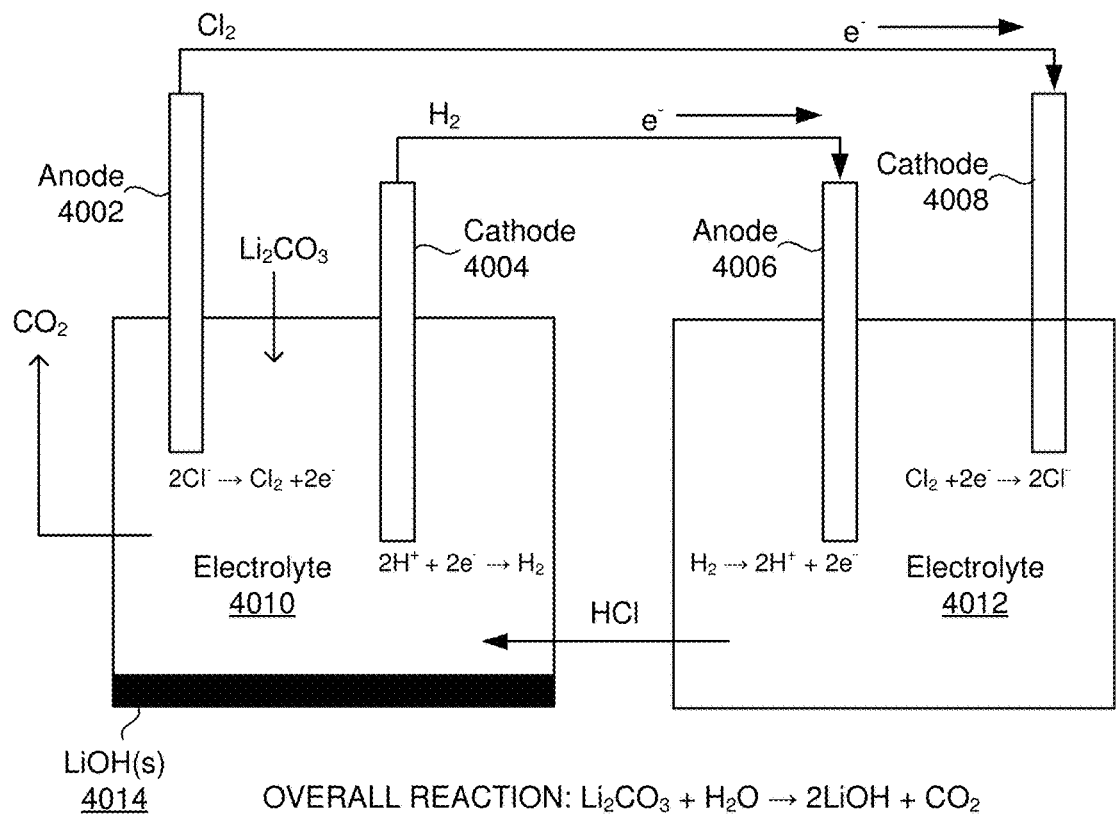
FIG. 40 illustrates an exemplary system for conversion to lithium hydroxide, in accordance with one embodiment.

FIG. 40 illustrates an exemplary system 4000 for conversion to lithium hydroxide, in accordance with one embodiment. As an option, the exemplary system 4000 may be implemented in the context of any one or more of the embodiments set forth in any previous and/or subsequent figure(s) and/or description thereof. Of course, however, the exemplary system 4000 may be implemented in the context of any desired environment. Further, the aforementioned definitions may equally apply to the description below.

As shown, a first anode 4002 and a first cathode 4004 are in direct contact with a first electrolyte 4010 to comprise a first battery cell. In addition, a second anode 4006 and a second cathode 4008 are in direct contact with a second electrolyte 4012 to comprise a second battery cell. In operation, the conversion process first goes through a neutralization reaction phase where lithium carbonate ($Li_2CO_3$) is fed into the first electrolyte 4010 of the first battery cell where the lithium carbonate reacts with hydrogen chloride (HCl). In addition, the conversion process goes through an electrolysis reaction phase from which lithium hydroxide (LiOH), hydrogen ($H_2$) and chlorine ($C_{12}$) gases are produced. Additionally, the resulting hydrogen gas may be transferred from the first cell to the second cell via the second anode 4006 by way of the first cathode 4004. Likewise, the resulting chlorine gas may be transferred to the second cell via the second cathode 4008 by way of the first anode 4002. Further, the conversion process includes a hydrogen chloride reclamation reaction phase in which the resultant hydrogen and chlorine gases combine amidst the second electrolyte 4012 to form hydrogen chloride atoms that are ultimately fed back into the first cell to continue to react with lithium carbonate. Further still, a net result of the conversion process yields a mass of solid lithium hydroxide precipitate 4014 as well as a volume of both water ($H_2O$), which may be filtered out of the first electrolyte 4010, and carbon dioxide ($CO_2$) gas, which may be vented as byproduct waste.

In one embodiment, the exemplary system 4000 may include the overall reaction: $Li_2CO_3+H_2O \rightarrow 2LiOH+CO_2$.

Figure 41:
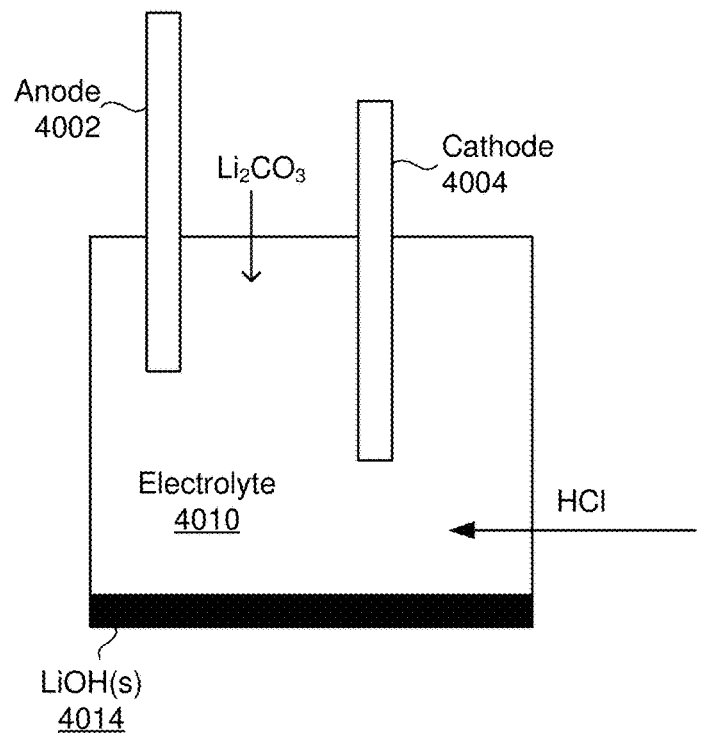
FIG. 41 illustrates a subset of the exemplary system for conversion to lithium hydroxide, in accordance with one embodiment.

FIG. 41 illustrates a subset 4100 of the exemplary system 4000 for conversion to lithium hydroxide, in accordance with one embodiment. As an option, the subset 4100 may be implemented in the context of any one or more of the embodiments set forth in any previous and/or subsequent figure(s) and/or description thereof. Of course, however, the subset 4100 may be implemented in the context of any desired environment. Further, the aforementioned definitions may equally apply to the description below.

In operation, the neutralization reaction may include lithium carbonate ($Li_2CO_3$) being fed into the first electrolyte 4010 of the first battery cell where the lithium carbonate reacts with hydrogen chloride (HCl), ultimately producing a mass of solid lithium hydroxide (LiOH) precipitate 4014 (as a result, in one embodiment, of the Cl-anions being removed at the anode, etc.).

In one embodiment, the neutralization reaction may include: $Li_2CO_3+2HCl \rightarrow 2LiCl+H_2CO_3$.

Figure 42:
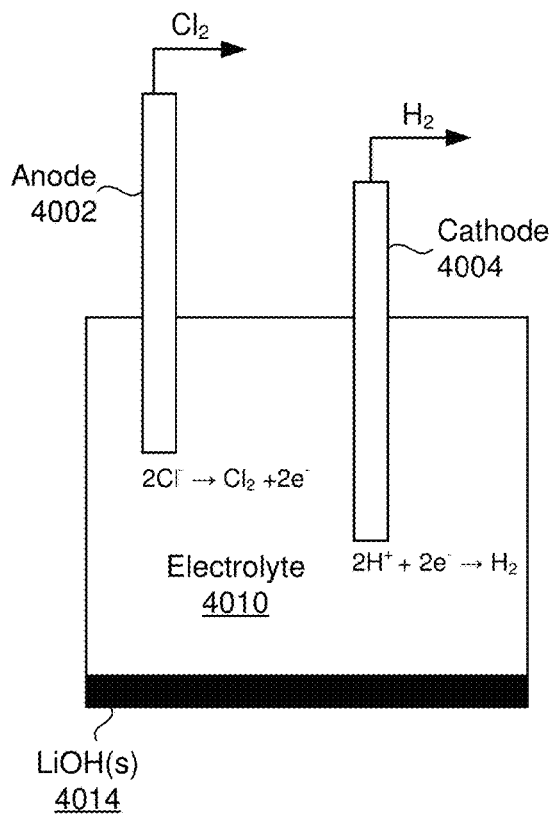
FIG. 42 illustrates a subset of the exemplary system for conversion to lithium hydroxide, in accordance with one embodiment.

FIG. 42 illustrates a subset 4200 of the exemplary system 4000 for conversion to lithium hydroxide, in accordance with one embodiment. As an option, the subset 4200 may be implemented in the context of any one or more of the embodiments set forth in any previous and/or subsequent figure(s) and/or description thereof. Of course, however, the subset 4200 may be implemented in the context of any desired environment. Further, the aforementioned definitions may equally apply to the description below.

In operation, the electrolysis reaction from which solid lithium hydroxide precipitate 4014 and hydrogen ($H_2$) and chlorine ($Cl_2$) gases are produced may include the resulting hydrogen gas being transferred from the first electrolyte 4010 to the second cell via the first cathode 4004. Likewise, the resulting chlorine gas may be transferred to the second cell via the first anode 4002.

In one embodiment, the electrolysis reaction may include $2LiCl+2H_2O \rightarrow 2LiOH+H_2+Cl_2$.

It should be noted that cell corresponding with the subset 4200 may include a decomposition reaction wherein a volume of both water ($H_2O$), which may be filtered out of the first electrolyte 4010, and carbon dioxide ($CO_2$) gas, which may be vented as byproduct waste, may be produced.

Figure 43:
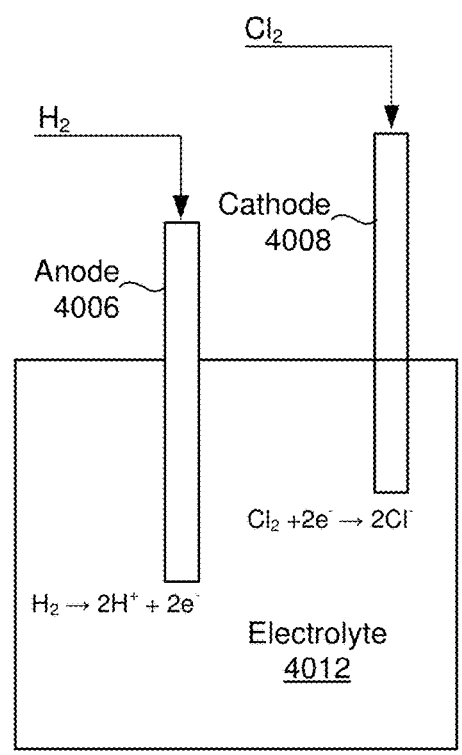
FIG. 43 illustrates a subset of the exemplary system for conversion to lithium hydroxide, in accordance with one embodiment.

FIG. 43 illustrates a subset 4300 of the exemplary system 4000 for conversion to lithium hydroxide, in accordance with one embodiment. As an option, the subset 4300 may be implemented in the context of any one or more of the embodiments set forth in any previous and/or subsequent figure(s) and/or description thereof. Of course, however, the subset 4300 may be implemented in the context of any desired environment. Further, the aforementioned definitions may equally apply to the description below.

In operation, the hydrogen chloride reclamation reaction may include hydrogen and chlorine gases entering the second cell via anode 4006 and cathode 4008, respectively, and combining with one another in the second electrolyte 4012 to form hydrogen chloride atoms that are ultimately fed back into the first cell to continue to react with lithium carbonate.

In one embodiment, the HCl reclamation reaction may include $H_2+Cl_2 \rightarrow 2HCl$. Additionally, the decomposition reaction may include $H_2CO_3 \rightarrow H_2O+CO_2$.

Figure 44:
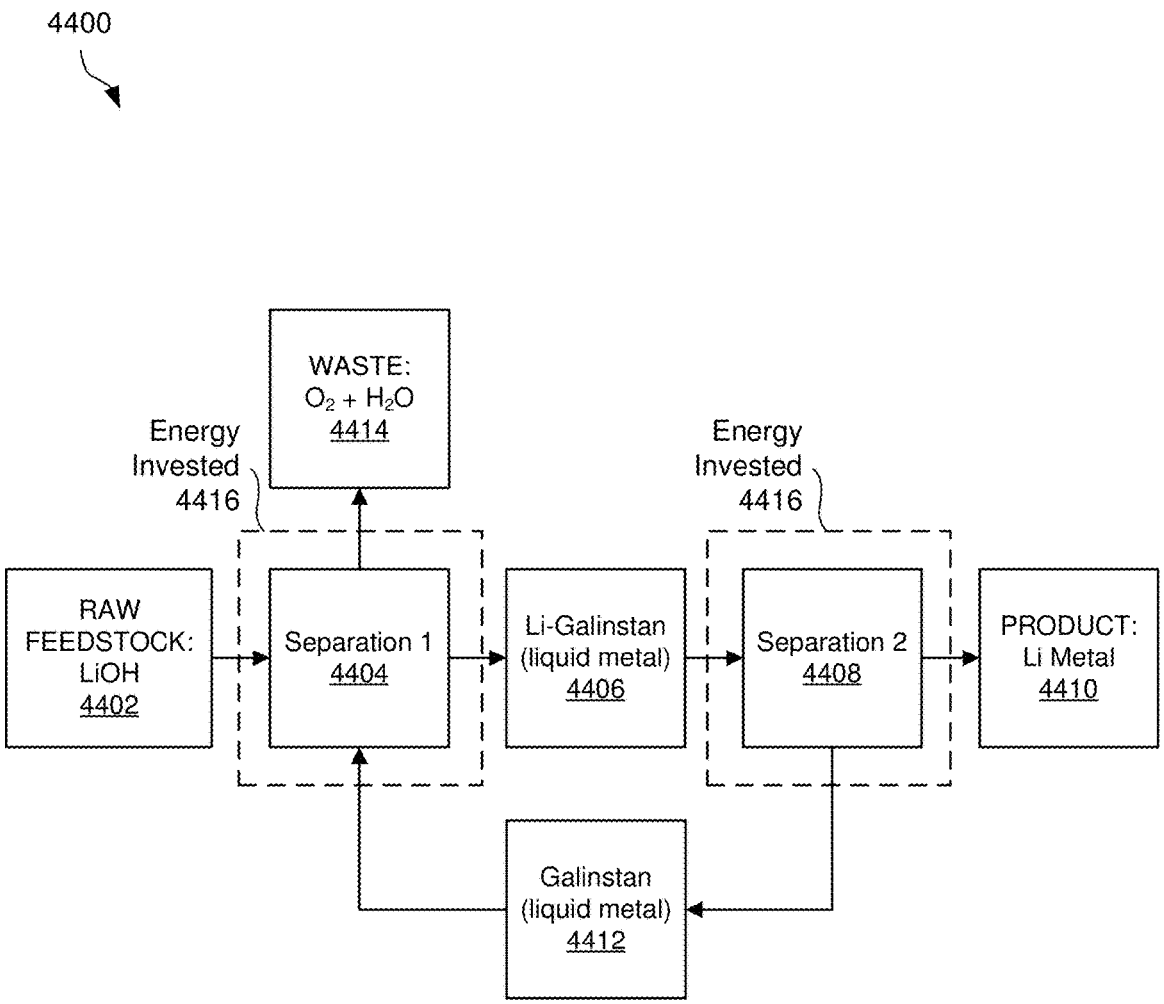
FIG. 44 illustrates an exemplary process for lithium metal production, in accordance with one embodiment.

FIG. 44 illustrates an exemplary process 4400 for lithium metal production, in accordance with one embodiment. As an option, the exemplary process 4400 may be implemented in the context of any one or more of the embodiments set forth in any previous and/or subsequent figure(s) and/or description thereof. Of course, however, the exemplary process 4400 may be implemented in the context of any desired environment. Further, the aforementioned definitions may equally apply to the description below.

In operation, a raw feedstock 4402 of lithium hydroxide (LiOH) may feed lithium hydroxide into a separation subprocess 4404 to yield a concentration of lithiated galinstan liquid metal 4406. In addition, the lithiated galinstan liquid metal 4406 may be passed from separation subprocess 4404 into a second separation subprocess 4408, ultimately resulting in a lithium metal salt product 4410 and a concentration of galinstan liquid metal 4412, which may be passed back through the separation subprocess 4404, yielding a measure of $O_2$ and/or $H_2O$ waste 4414.

In one embodiment, the measure of energy invested 4416 into the process 4400 for lithium metal production may be quantified by measuring the energy levels required to perform separation subprocess 4404 and second separation subprocess 4408.

In one embodiment, the exemplary process 4400 may include: $4LiOH \rightarrow 4Li+O_2+2H_2O$.

Figure 45:
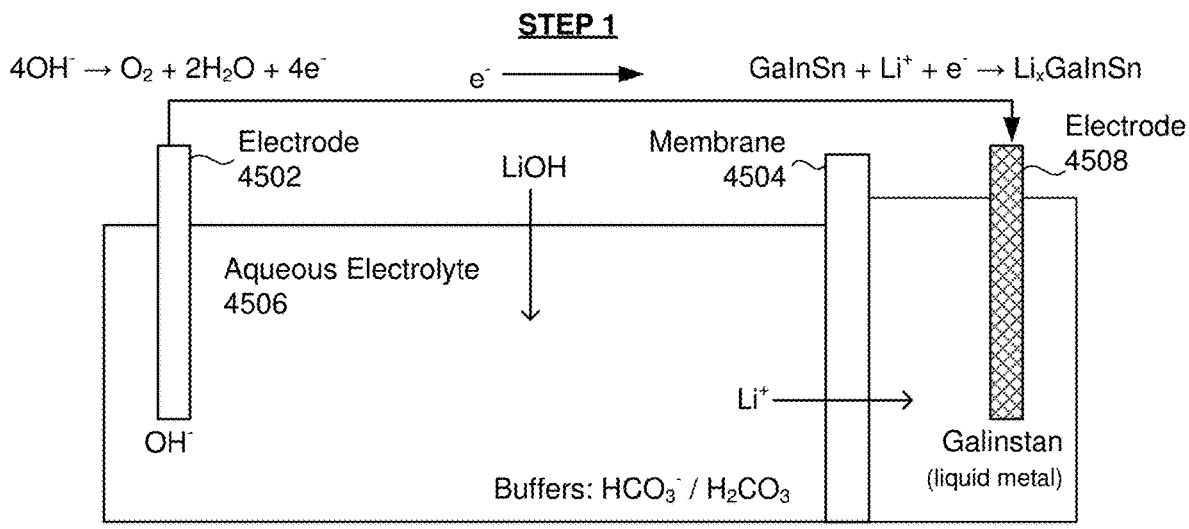
FIG. 45 illustrates an exemplary process for lithium metal production, in accordance with one embodiment.
Figure 45:
Figure 45:
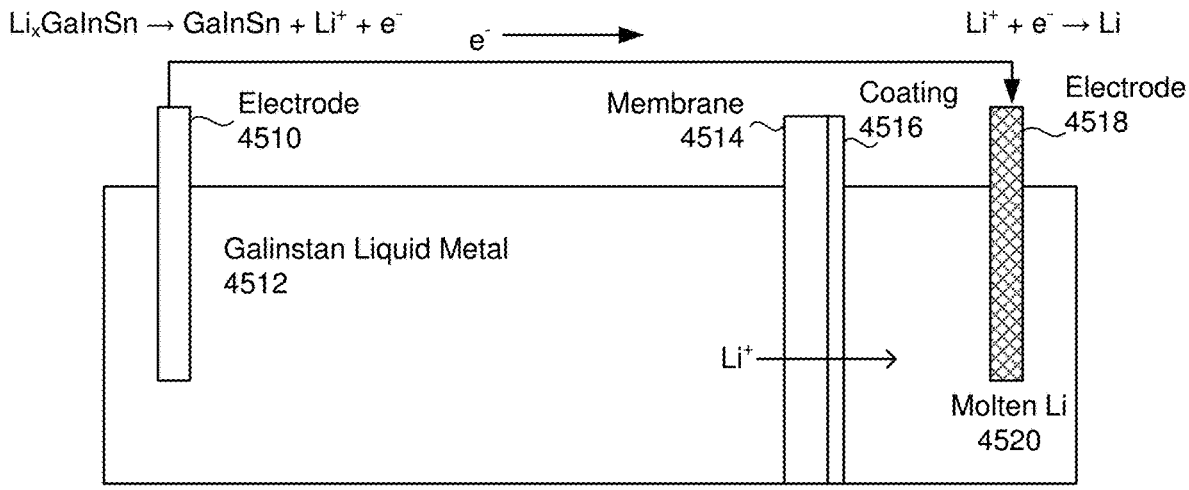
Figure 45:
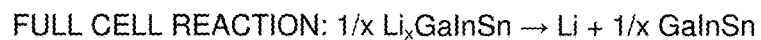

FIG. 45 illustrates an exemplary process 4500 for lithium metal production, in accordance with one embodiment. As an option, the exemplary process 4500 may be implemented in the context of any one or more of the embodiments set forth in any previous and/or subsequent figure(s) and/or description thereof. Of course, however, the exemplary process 4500 may be implemented in the context of any desired environment. Further, the aforementioned definitions may equally apply to the description below.

As shown in step 1, lithium ions ($Li^+$) may pass from an anode comprised of aqueous electrolyte 4506 through a lithium ion-selective solid electrolyte membrane 4504 to a cathode comprised of lithiated galinstan (Ga—In—Sn) liquid metal. In operation, lithium hydroxide atoms may be continuously fed into (if not already present in an adequate volume in) the aqueous electrolyte 4506 and may break apart into positively-charged lithium ions and negatively-charged hydroxide ($OH^-$) atoms. In addition, the lithium ions may then be drawn across the lithium ion-selective solid electrolyte membrane 4504 into the cathode containing the lithiated galinstan liquid metal. Additionally, the lithium metal production may simultaneously combine the actions of reduction of galinstan at a cathode-side electrode 4508, resulting in the recombination of lithium ions and electrons to form a lithiated galinstan liquid metal, and oxidation of OH– at an anode-side electrode 4502, producing oxygen gas ($O_2$), water ($H_2O$), and electrons. Further, to prevent corrosion and degradation of the effectiveness of the lithium ion-selective solid electrolyte membrane 4504, a suitable buffer may be used to coat the lithium ion-selective solid electrolyte membrane 4504 in the case of contact with the aqueous electrolyte 4506. By way of example, the compound used to comprise the buffer in the aqueous electrolyte 4506 may include bicarbonate ($HCO_3^-$) and/or carbonic acid ($H_2CO_3$).

In one embodiment, the full cell reaction for step 1 may include: LiOH+ GaInSn→¼ $O_2$+½ $H_2O$+1/x$Li_x$GaInSn.

In one embodiment, the resulting alkali metal may be in solid and/or liquid metal form upon completion of the alkali metal production process.

As shown in step 2, at a system temperature of 250 degrees Celsius, lithium ions ($Li^+$) may pass from an anode comprised of lithiated galinstan (Ga—In—Sn) alloy 4512 through a lithium ion-selective solid electrolyte membrane 4514 with a lithium-stable coating 4516 to a cathode comprised of molten lithium 4520. In operation, lithiated galinstan alloy may be continuously fed into the anode (if an adequate amount of such lithiated galinstan alloy is not already present) where lithium ions may then be drawn across the lithium ion-selective solid electrolyte membrane 4514 into the cathode comprised of molten lithium 4520. Additionally, the lithium metal production process may simultaneously combine the actions of oxidation of galinstan-Li at an anode-side electrode 4510, resulting in lithium ions and electrons, and reduction at a cathode-side electrode 4518 where lithium ions are recombined with electrons to form the new lithium metal.

In one embodiment, the lithium ion-selective solid electrolyte membrane 4514 may comprise a layer of $Li_{10}GeP_2S_{12}$ (LGPS) with a lithium-stable coating 4516 of, for example, lithium fluoride (LiF) and/or lithium oxide ($Li_2O$).

In one embodiment, the full cell reaction for step 2 may include: 1/x $Li_x$GaInSn→Li+1/x GaInSn.

Figure 46:
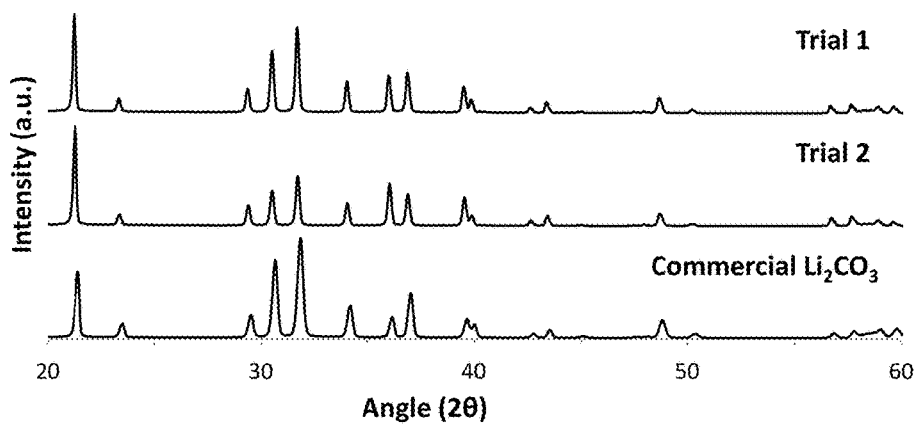
FIG. 46 illustrates results using redox electrode modules, in accordance with one embodiment.
Figure 46:
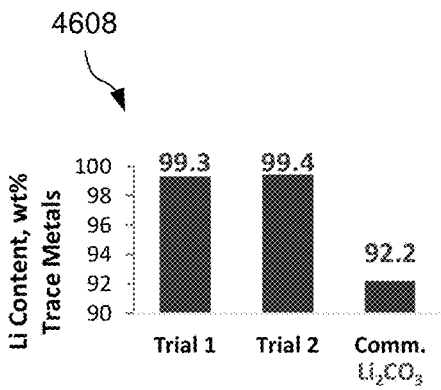
Figure 46:
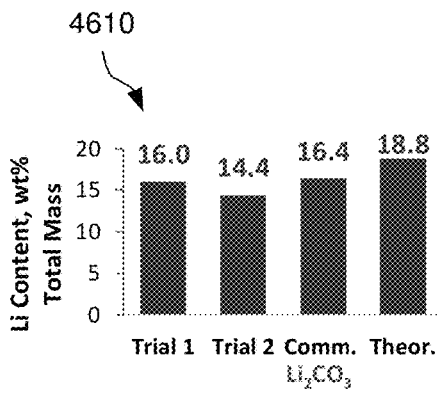

FIG. 46 illustrates results 4600 using redox electrode modules, in accordance with one embodiment. As an option, the results 4600 may be implemented in the context of any one or more of the embodiments set forth in any previous and/or subsequent figure(s) and/or description thereof. Of course, however, the results 4600 may be implemented in the context of any desired environment. Further, the aforementioned definitions may equally apply to the description below.

As shown, the results 4600 include preliminary data. For example, catholyte 4602 and anolyte 4604 show composition of electrolytes used for LCE precipitation test (specifically for Li2CO3). Additionally, graph 4606 shows XRD spectra of product confirming identity of precipitate as Li2CO3 in two separate trials. A graph 4608 shows a purity of Li2CO3 (wt % trace metals basis) analyzed via ICP-OES in two separate trials. Further, graph 4610 shows Li content (wt % total mass) in precipitation based on ICP-OES results compared to theoretical value of 18.8 wt % Li in pure Li2CO3. Commercial Li2CO3 from Sigma-Aldrich was used as a reference where indicated.

Figure 47:
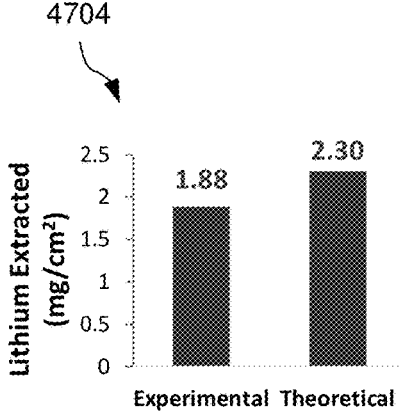
FIG. 47 illustrates results using redox electrode modules, in accordance with one embodiment.
Figure 47:
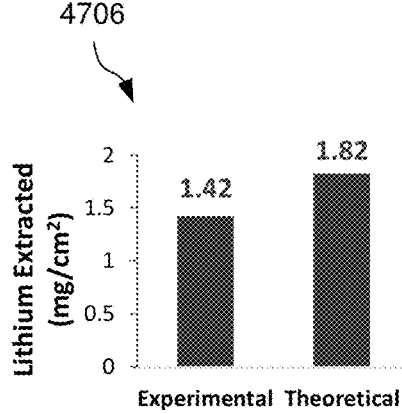

FIG. 47 illustrates results 4700 using redox electrode modules, in accordance with one embodiment. As an option, the results 4700 may be implemented in the context of any one or more of the embodiments set forth in any previous and/or subsequent figure(s) and/or description thereof. Of course, however, the results 4700 may be implemented in the context of any desired environment. Further, the aforementioned definitions may equally apply to the description below.

As shown, the results 4700 include preliminary data. For example, composition 4702 shows compositions of electrolytes used in two selectivity test trials compared to Salton Sea geothermal brine. A graph 4704 shows lithium extracted using Trial 1 electrolyte. Further, a graph 4706 shows lithium extracted using Trial 2 electrolyte. In one embodiment, theoretical values calculated assumed 100% of charge transferred is Li. Additionally, for each trial, the starting catholyte/anolyte were identical.

Figure 48:
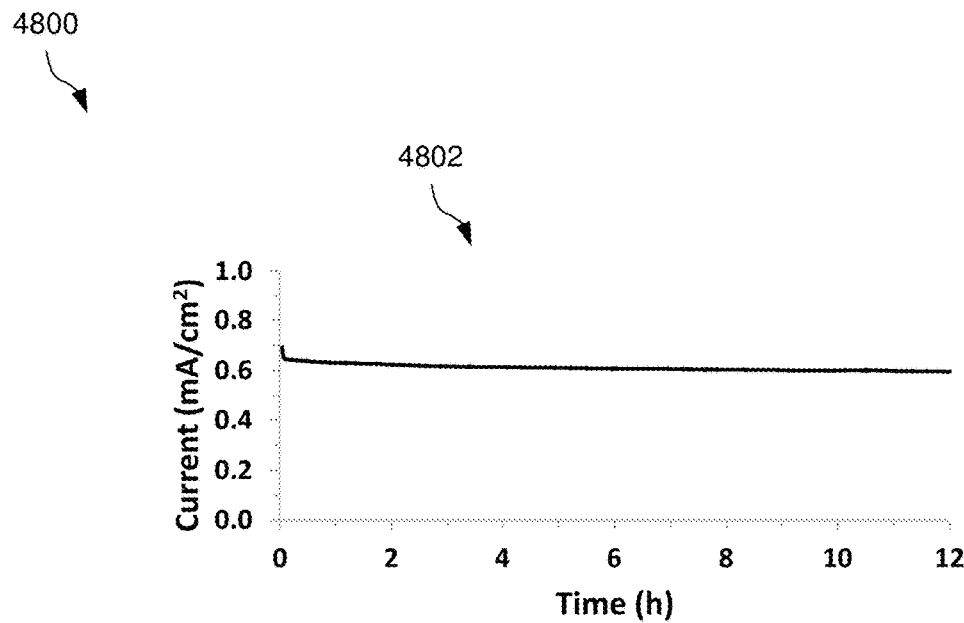
FIG. 48 illustrates results using redox electrode modules, in accordance with one embodiment.

FIG. 48 illustrates results 4800 using redox electrode modules, in accordance with one embodiment. As an option, the results 4800 may be implemented in the context of any one or more of the embodiments set forth in any previous and/or subsequent figure(s) and/or description thereof. Of course, however, the results 4800 may be implemented in the context of any desired environment. Further, the aforementioned definitions may equally apply to the description below.

As shown, the results 4800 include preliminary data. For example, the graph 4802 shows a sample current vs time profiles of ion flow from anolyte to catholyte under constant potential of 0.4 V for 12 h. Additionally, the metrics 4804 show performance metrics calculated from data (associated with the graph 4802). In one embodiment, the estimated energy per cycle assumed a constant power for total of 24 h (12 h extraction, 12 h reclamation). Additionally, the energy cost per LCE produced was estimated using $0.25/kWh.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An alkali metal extraction system, comprising:
   an anode;
   a cathode, wherein the anode is configured for oxidation and the cathode is configured for reduction, and wherein migration of a predetermined alkali metal ion through an ion-selective solid electrolyte membrane is driven by a potential across the anode and the cathode, wherein the ion-selective solid electrolyte membrane is selectively permeable to the predetermined alkali metal ion, and wherein the predetermined alkali metal ion migrates through a single particle of the solid electrolyte of the layer;
   at least one active material;
   a first solution comprising the predetermined alkali metal ion; and
   a second solution comprising the migrated predetermined alkali metal ion.

2. The alkali metal extraction system of claim 1, wherein the first solution includes an anolyte, and the second solution includes a catholyte.

3. The alkali metal extraction system of claim 2, wherein each of the anolyte and the catholyte includes:
   an active material or one or more electroactive solutes or an electrode coating immersed in each of the anolyte and the catholyte,
   one or more dissolved alkali metal cations, including the predetermined alkali metal ion,
   one or more dissolved anions, and
   a solvent.

4. The alkali metal extraction system of claim 3, wherein the active material includes one or more of:
   H2, Na+, Li metal, LFP, LMO, NCA, NMC, graphite,
   Na-based active materials including Prussian Blue,
   ferricyanide, ferrocyanide, or a redox state ferricyanide or ferrocyanide ([Fe(CN)6]3−/[Fe(CN)6]4−),
   ferrocene (Fe(C5H5)2, ferrocenium Fe(C5H5)2+, cobaltocene (Co(C5H5)2, cobaltocenium Co(C5H5)2+, or any organic derivatives thereof,
   vanadium-containing ions or vanadium coordination complexes, including one or more of pervanadyl ($VO_2^+$), vanadyl ($VO_2^+$), V2+, V3+,
   phosphotungstic acid, or a redox state of phosphotungstic acid ([PW12O40]3−/[P2W21O71]6−/[PW11O39]7−, etc.),
   phosphomolybdic acid, or a redox state of phosphomolybdic acid,
   silicotungstic acid, or a redox state of slicotungstic acid, or
   an ion of any common redox state of Fe, Co, Ni, or Cu, including one or more of Fe2+, Fe3+, Co2+, Co3+, Ni2+, Ni3+, Cu2+, Cu+, or any coordination complex thereof.

5. The alkali metal extraction system of claim 1, further comprising a first current collector in contact with the first solution, and a second current collector in contact with the second solution.

6. The alkali metal extraction system of claim 5, wherein each of the first current collector and the second current collector is electronically conductive, and made of at least one of aluminum, nickel, copper, titanium, stainless steel, graphite felt, or carbon fiber.

7. The alkali metal extraction system of claim 1, wherein the anode has a first mean potential, and the cathode has a second mean potential wherein the first mean potential is less than or equal to the second mean potential such that the anode receives electronic charge as the predetermined alkali metal migrates from the first solution to the second solution.

8. The alkali metal extraction system of claim 1, wherein the first solution includes one or more secondary ions.

9. The alkali metal extraction system of claim 8, wherein a first concentration of the one or more secondary ions in the first solution is greater than a second concentration of the one or more secondary ions in the second solution.

10. The alkali metal extraction system of claim 1, wherein the configuration of the ion-selective solid electrolyte membrane includes a solid electrolyte particle with a predetermined pore size corresponding with the predetermined metal ion.

11. The alkali metal extraction system of claim 1, wherein the first solution is a geothermal brine or a salar brine.

12. The alkali metal extraction system of claim 1, wherein the first solution comprises at least one of lithium minerals, lithium-containing brines, recycled lithium batteries, or seawater.

13. The alkali metal extraction system of claim 1, wherein the second solution comprises a first electroactive solute, wherein the reduction of the first electroactive solute coincides with the migration of the predetermined alkali metal ion, and the first solution comprises a second electroactive solute, wherein oxidation of the second electroactive solute coincides with the migration of the predetermined alkali metal ion.

14. The alkali metal extraction system of claim 13, wherein a first concentration of at least one H+ ion or at least one Na+ ion decreases in the second solution, and a second concentration of the at least one H+ ion or the at least one Na+ ion increases in the first solution.

15. The alkali metal extraction system of claim 1, wherein the first solution includes LiOH at a first solubility, and the second solution includes an organic solution with second solubility, wherein the second solubility is lower than the first solubility.

16. The alkali metal extraction system of claim 15, wherein the organic solution comprises $H_2O$, wherein the $H_2O$ is configured to facilitate formation of an alkali salt.

17. The alkali metal extraction system of claim 1, wherein the migrated predetermined alkali metal ion is configured to recombine with a hydroxyl group to precipitate.

18. The alkali metal extraction system of claim 1, wherein input energy used to migrate the predetermined metal alkali ion is stored and recovered, at least in part, as electrochemical energy of the migrated predetermined metal alkali ion at the cathode.

19. The alkali metal extraction system of claim 18, wherein the input energy corresponds with an electric charging at an electrode with the predetermined metal alkali ion and the electrochemical energy corresponds with an electric discharge at the electrode of the predetermined metal alkali ion.

20. The alkali metal extraction system of claim 18, wherein the recovery of the input energy reduces a carbon footprint of a manufacturing facility.

\* \* \* \* \*